US012686950B2

(12) United States Patent　　　　(10) Patent No.:　　US 12,686,950 B2
　　　Burgess　　　　　　　　　　　　　(45) Date of Patent:　　　　　Jul. 21, 2026

(54) MICROARRAYS

(71) Applicant: Polymer Forge, Inc., Madison, WI (US)

(72) Inventor: Daniel L. Burgess, Madison, WI (US)

(73) Assignee: POLYMER FORGE, INC., Madison, WI (US)

( * ) Notice: Subject to any disclaimer, the term of this patent is extended or adjusted under 35 U.S.C. 154(b) by 992 days.

(21) Appl. No.: 17/800,459

(22) PCT Filed: Feb. 8, 2021

(86) PCT No.: PCT/US2021/017026
　　　§ 371 (c)(1),
　　　(2) Date: Aug. 17, 2022

(87) PCT Pub. No.: WO2021/167807
　　　PCT Pub. Date: Aug. 26, 2021

(65) Prior Publication Data

US 2023/0083189 A1　　　Mar. 16, 2023

Related U.S. Application Data

(60) Provisional application No. 62/978,597, filed on Feb. 19, 2020.

(51) Int. Cl.
　　　*C40B 50/06*　　　　(2006.01)
　　　*B01J 19/00*　　　　(2006.01)
(52) U.S. Cl.
　　　CPC ........... *C40B 50/06* (2013.01); *B01J 19/0046* (2013.01)
(58) Field of Classification Search
　　　None
　　　See application file for complete search history.

(56) References Cited

U.S. PATENT DOCUMENTS

| | | | |
|---|---|---|---|
| 5,143,854 | A | 9/1992 | Pirrung et al. |
| 5,445,934 | A | 8/1995 | Fodor et al. |
| 6,375,903 | B1 | 4/2002 | Cerrina et al. |
| 6,506,558 | B1 | 1/2003 | Fodor et al. |
| 7,667,032 | B2 | 2/2010 | Hah et al. |
| 7,737,088 | B1 | 6/2010 | Stahler et al. |
| 7,935,822 | B2 | 5/2011 | Arden-Jacob et al. |
| 9,375,903 | B2 | 6/2016 | Matsunaga et al. |
| 10,079,158 | B2 | 9/2018 | Kong et al. |
| 10,525,436 | B2 | 1/2020 | Maurer et al. |
| 10,872,924 | B2 | 12/2020 | Ku et al. |
| 2003/0003486 | A1 | 1/2003 | Sauer et al. |
| 2003/0050438 | A1 | 3/2003 | Montgomery |
| 2005/0070009 | A1 | 3/2005 | Klapproth et al. |
| 2006/0179585 | A1 | 8/2006 | Zilles et al. |

(Continued)

FOREIGN PATENT DOCUMENTS

CN　　　　101104954 A　　　1/2008

OTHER PUBLICATIONS

European Patent Office Extended Search Report for Application No. 21756368.3 dated Feb. 20, 2024 (10 pages).

(Continued)

*Primary Examiner* — Christian C Boesen
(74) *Attorney, Agent, or Firm* — MICHAEL BEST & FRIEDRICH LLP

(57)　　　　　　　　ABSTRACT

Provided herein is technology relating to microarrays and particularly, but not exclusively, to microarray devices and systems, methods for producing microarrays, and methods of using microarrays.

17 Claims, 29 Drawing Sheets

(56) References Cited

U.S. PATENT DOCUMENTS

| | | |
|---|---|---|
| 2009/0023609 A1 | 1/2009 | Jung et al. |
| 2009/0270279 A1 | 10/2009 | Serafinowski et al. |
| 2011/0172420 A1 | 7/2011 | Zilles et al. |
| 2011/0190486 A1 | 8/2011 | Zilles et al. |
| 2011/0223677 A1 | 9/2011 | Arden-Jacob et al. |
| 2019/0165039 A1 | 5/2019 | Ku et al. |

OTHER PUBLICATIONS

Agbavwe et al., "Efficiency, error and yield in light-directed maskless synthesis of DNA microarrays", J. Nanobiotechnology, 2011, vol. 9, No. 57, pp. 1-17.

Baum et al., "Validation of a novel, fully integrated and flezible microarray benchtop facility for gene expression profiling", Nucleic Acids Res., 2003, vol. 31, No. 23, e151.

Blair et al., "A scalable method for multiplex LED-controlled synthesis of DNA in capillaries", Nucleic Acid Res., 2006, vol. 34, No. 16, pp. e110.

Blair et al., Corrigendum, Epub 2006, Erratum in: Nucleic Acids Res., 2007, vol. 35, No. 2, 703.

Bower et al., "Emissive dispalys with transfer-printed assemblies of 8 um and 15 um inorganic light-emitting diodes", Photon. Res., 2017, vol. 23, pp. A23-A29.

Chen et al., "Controlling oligonucleotide surface density in light-directed DNA array fabrication", Langmuir, 2009, vol. 25, No. 11, pp. 6570-6575.

De Stefano et al., "Aminosilane functionalizations of mesoporous oxidized silicon for oligonucleotide synthesis and detection", J R Soc Interface, 2013, vol. 10, No. 83, pp. 1-7.

Forsstrom et al., "Proteome-wide epitope mapping of antibodies using ultra-dense peptide arrays", Mol Cell Proteomics, 2014, vol. 13, No. 6, pp. 1585-1597.

Franssen van Hal et al., "Optimized light-directed synthesis of aptamer microarrays", Anal Chem., 2013, vol. 85, No. 12, pp. 5950-5957.

Garland et al., "Effects of stray light on the fidelity of photodirected oligonucleotide array synthesis", Nucleic Acids Res., 2002, vol. 30, e99.

Gudapati et al., "A Comprehensive review on droplet-based bioprinting: Past, present, and future", Biomaterials, 2016, vol. 102, pp. 20-42.

Hensel et al., "Analytical and Clinical Validity Study of FirstStepDx Plus: A Chromosomal Microarray Optimized for Patients with Neurodevelopmental Conditions", PLoS Curr., 2017, 24 pages.

Holz et al., "High-Efficiency Reverse (5' → 3') Synthesis of Complex DNA Microarrays", Sci Rep., 2018, vol. 8, No. 1, 15099.

Holz et al., "High-Power 365 nm UV LED Mercury Arc Lamp Replacement for Photochemistry and Chemical Photolithogrpahy", ACS Sustain Chem Eng., 2017, vol. 5, No. 1, pp. 828-834.

Hughes et al., "Expression profiling using microarrays fabricated by an inkjet oligonucleotide synthesizer", Nat Biotechnol., 2001, vol. 19, No. 4, pp. 342-347.

International Search Report and Written Opinion for Application No. PCT/US21/17026 dated Jul. 23, 2021 (13 pages).

Kosuri et al., "Large-scale de novo DNA syhtnesis: technologies and applications", Nat Methods, 2014, vol. 11, No. 5, pp. 499-507.

Kretschy, "Next-Generation o-Nitrobenzyl Photolabile Groups for Light-Directed Chemistry and Microarray Synthesis", Angew Chem Int Ed Engl., 2015, vol. 54, No. 29, pp. 8555-8559.

Lackey et al., Acetal levulinyl ester (ALE) groups for 2'-hydroxyl protection of ribonucleosides in the synthessi of oligoribonucleotides on glass and microarrays, J Am Chem Soc., 2009, vol. 131, No. 24, pp. 8496-8502.

Lee et al., "Monolithic Flexible Vertical GaN Light-Emitting Diodes for a Transparent Wireless Brain Optical Simulator", Adv Mater, 2018, vol. 30, No. 28, e1800649.

Lu et al., "Assessing genome-wide copy number variation in the Han Chinese population", J Med Genet., 2017, vol. 54, No. 10, pp. 685-692.

Marion et al., "A Room Temperature Flip-Chip Technology for High Pixel Count Micro-Dispalys and Imaging Arrays", IEEE Electronic Components and Technology Conference, 2016, pp. 929-935.

Michael et al., "Randomly ordered addressable high-density optical sensor arrays", Anal Chem., 1998, vol. 70, No. 7, pp. 1242-1248.

Mikkelsen et al., "Photolabile Linkers for Solid-Phase Synthesis", ACS Comb Sci., 2018, vol. 20, No. 7, pp. 377-399.

Pirrung et al., "Historical Review: The Genesis of Microarrays", Biochem Mol Biol Education, 2013, vol. 42, No. 2, pp. 106-113.

Raje et al., "A Review on Electrohydrodynamic inkjet Printing Technology", International J. of Emerging Tech and Advanced Engineering, 2014, vol. 4, Issue 5, pp. 174-183.

Schrader et al., "Surface chemical heterogeneity modulates silica surface hydration", PNAS USA, 2018, vol. 115, No. 12, pp. 2890-2895.

Shchepinov et al., "Steric factors influencing hybridisation of nucleic acids to oligonucleotide arrays", Nuclecic Acids Res., 1997, vol. 25, No. 6, pp. 1155-1161.

Singh-Gasson et al., "Maskless fabrication of light-directed oligonucleotide microarrays using a digital micromirror array", Nat Biotechnol., 1999, vol. 17, No. 10, pp. 974-978.

Sneh et al., "Thermal Stability of Hydroxyl Groups on a Well-Defined Silica Surface", J Phys Chem, 1995, vol. 99, No. 13, pp. 4639-4647.

Sojka et al., "A Novel phosphoramidite method for automated synthesis of oligonucleotides on glass supports for biosensor development", Appl Biochecm Biotechnol., 2000, vol. 89, No. 1, pp. 85-103.

Southern, "DNA Microarrays", Methods in Molecular Biology, vol. 170, 2001, 15 pages.

Strickland, "The Future of MicroLED Dispalys Using Next-Generation Technologies", SID Symposium Digest of Technical Papers, 2018, vol. 49, pp. 696-697.

Taniguchi et al., "Database of Absorption and Fluorescence Spectra of >300 Common Compounds for use in Photo chem CAD", Photochem Photobiol., 2018, vol. 94, No. 2, pp. 290-327.

Templier et al., "High-resolution active-matrix 10-um pixel-pitch GaN LED microdisplays for augmented reality applications", Proceedings vol. 10556, Advances in Display Technologies VIII, 2018, 1055601.

Tian et al., "Fabrication, characterization and applications of flexible vertical InGaN micro-light emitting diode arrays", Opt Express, 2016, vol. 24, No. 1, pp. 669-707.

Wu et al., "Mini-LED and Micro-LED: Promising Candidates for the Next Generation Display Technology", Appl. Sci., 2018, vol. 8, No. 9, 1557.

Zhang et al., "Monochromatic Active Matrix Micro-LED Micro-Displays with >5,000 dpi Pixel Density Fabricated using Monolithic Hybrid Integration Process", SID Symposium Digest of Technical Papers, 2018, vol. 49, pp. 333-336.

Canadian Patent Office Action for Application No. 3172763 dated Feb. 23, 2026 (5 pages).

A.

B.

MICROARRAYS

CROSS-REFERENCE TO RELATED APPLICATIONS

This patent application is the United States national stage entry, under 35 U.S.C. § 371, of International Application Number PCT/US2021/017026, filed Feb. 8, 2021, which claims priority to U.S. provisional patent application Ser. No. 62/978,597, filed Feb. 19, 2020, the entire contents of each of which are hereby incorporated by reference.

FIELD

Provided herein is technology relating to microarrays and particularly, but not exclusively, to microarray devices and systems, methods for producing microarrays, and methods of using microarrays.

BACKGROUND

Technologies for synthesizing large, complex sets of heteropolymers (e.g., nucleic acids, peptides, heteroglycans) arrayed in high density on a physical support, commonly referred to as a "microarray", have great value for a wide range of applications, particularly in the fields of medicine, biotechnology and materials science. Typically, that value is correlated with the technical characteristics of the microarray itself, e.g., the absolute number of different heteropolymers that are represented on the microarray ("feature diversity"); the number of different heteropolymers that are represented per unit area on the microarray ("feature density"); and/or the quality of the heteropolymer molecules relative to the preferred specification (e.g., average error rate or sequence fidelity). While it is reasonable to infer that the method used to manufacture a microarray can determine or influence its intrinsic technical characteristics, the manufacturing method also impacts the economic value of microarrays for the end user, including, e.g., the customizability of microarray content (e.g., fixed by the manufacturer or customer defined); flexibility of manufacturing runs and lot sizes, including the per-unit cost structure; and the turnaround time from specification of microarray content (for customer specified orders) to completion of manufacture.

Microarray discovery, development, and commercialization began in the late 1980s (see, e.g., Southern E M. DNA microarrays. History and overview. Methods Mol Biol. 2001; 170: 1-15; Pirrung M C, Southern E M. The genesis of microarrays. Biochem Mol Biol Educ. 2014 March-April; 42(2): 106-13, each of which is incorporated herein by reference) and over the past 40 years, several approaches have been developed to manufacture microarrays of various designs for various applications and these have enjoyed significant commercial success. However, further increases in microarray performance and manufacturing efficiency and flexibility remain highly desirable, e.g., to provide for the development of new useful applications.

Some previous attempts to improve microarrays have included developing and optimizing technologies for placing polymers (e.g., oligonucleotides) on a microarray and synthesizing polymers directly on the microarray surface.

For many applications in which microarrays are useful, the availability of a high diversity and high density of polymers is particularly advantageous and, consequently, producing high-diversity and high-density microarrays has been a goal addressed by considerable development resources. Increasing feature diversity in a microarray increases the number of different targets that can be evaluated in a sample. In particular, each microarray feature comprising a distinct polymer can interrogate at least one target within a sample. Thus, a microarray with a feature diversity of 1,000 can interrogate at least 1,000 different targets in a sample, while a microarray with a feature diversity of 1,000,000 can interrogate at least 1,000,000 different targets in that same sample. This relationship holds true for most applications. For example, a DNA oligonucleotide microarray used in a hybridization assay might interrogate multiple targets that are DNA sequence polymorphisms in a genomic DNA sample or gene transcripts in an RNA sample. A peptide microarray used in an immunoprofiling assay might target multiple elements of the proteome that are candidates in the etiology of a suspected autoimmune disorder. Accordingly, greater feature diversity on a microarray yields more data and potentially greater analytical power for a similar cost. The value of greater feature diversity on a microarray is further increased when sample availability limits the number of assays that can be performed to gather data on the sample.

The capability to provide higher absolute feature number on a microarray is valuable because it provides users the option of higher feature diversity, increased feature redundancy (which can be desirable, e.g., to strengthen statistical confidence in assay results), or some combination of these. However, it is also desirable to constrain and/or minimize the overall physical dimensions of a microarray because increasing microarray size increases material costs for manufacture, increases reagent costs for end users, and can impact the size and cost of instrumentation used with the microarray. Providing higher absolute feature number without increasing microarray size is thus associated with an increase in feature density (see, e.g., FIG. 1). An increase in feature density is thus associated with a decrease in feature size because a minimum gap is maintained to prevent interference or contamination ("cross-talk") among adjacent features during synthesis by the manufacturer and later during data acquisition and analysis by the end user. Cross-talk among adjacent features during synthesis is a major problem in microarray design and manufacturing due to its negative impact on microarray quality and performance. This problem can manifest itself in two ways: "feature-creep" and "sequence-shuffling" (FIG. 2). Increasing microarray feature number and density while avoiding performance degradation due to feature-creep and sequence-shuffling is a difficult problem that researchers have attempted to solve using a variety of microarray designs and manufacturing techniques, with varying degrees of success. A robust and effective solution to this problem remains highly desirable.

Conventional microarrays can be manufactured using a variety of extant technologies. These technologies are generally divided into "spotting" methods and "in situ synthesis" methods. Spotting methods, which were the earliest to be adopted, begin with individually synthesized, full-length polymers that are subsequently deposited onto a solid support to produce the microarray. The transfer is accomplished either by contact deposition (e.g., using fine pins to pick up heteropolymers in solution from holding wells and deposit them by physical contact onto a solid support) or by non-contact deposition (e.g., using a modified inkjet printer). The manufacture of microarrays using spotting methods can be easily customizable and relatively low-cost compared to other methods. This approach also minimizes and/or eliminates sequence-shuffling artifacts because the polymers are individually and separately synthesized. However, the use of mechanical pins or modified ink-jet printing results in relatively large features (e.g., having a feature width of approximately 100-150 μm), which consequently limits feature densities to be below the feature densities provided by in situ synthesis methods (e.g., providing a feature width of approximately 10-20 μm).

Another technology for manufacturing microarrays that can be considered to be a version of a spotting method uses small silica beads that are individually coated with a polymer (e.g., DNA oligonucleotides) before being mixed and randomly deposited into photolithographically etched wells on a support to form an array (see, e.g., Michael K L, Taylor L C, Schultz S L, Walt D R. Randomly ordered addressable high-density optical sensor arrays. Anal Chem. 1998 Apr. 1; 70(7):1242-8, incorporated herein by reference). However, the identity of each bead must be determined post-manufacturing for each separate array (e.g., by reading a unique tag sequence identifying the bead and/or polymers on a bead) because of the randomness of the deposition/assembly process. This characteristic of bead arrays restricts the types of standardization that can be implemented during manufacturing and by the end user. Furthermore, while the use of 3-micron beads distributed with a spacing of approximately 5.7 microns between wells provides for high feature density, the overall feature diversity is limited by the level of feature redundancy required to ensure that each distinct bead and/or polymer is represented at least once on the microarray. Moreover, the need to synthesize each of the polymers individually before mixing and depositing the beads onto the array adds complexity, manufacturing time and cost, especially for the manufacture of customer-defined microarrays, and so supported applications typically are limited to genotyping, gene transcription quantification, and cytosine methylation analysis. This technology was commercialized by Illumina Inc. as the BeadArray/BeadChip Platform.

In situ methods of microarray manufacturing use technologies related to ink-jet printing, electrochemistry using microelectrode arrays, photolithography using static masks, or photolithography using dynamic masking. All these methods begin with a solid support. The solid support is usually silicon-based, often a glass microscopic slide, but it may be made of plastic, metal, or other materials. Typically, the solid support is coated or seeded with an activated (or activatable) chemical moiety that can serve to initiate synthesis of the heteropolymers while also anchoring the growing polymers to the support. Monomer (or, occasionally, oligomer) subunits of specified polymers are added one at a time. Spatial control of the synthesis of distinct sequences is provided in one of two ways: In the first approach, every polymer in every feature on the microarray can incorporate any monomer contacted with it, but monomers are delivered only to those features where they are desired to be incorporated in that round of monomer addition. This is the approach used by the ink-jet method (see, e.g., FIG. 3; see, e.g., Hughes et al. Expression profiling using microarrays fabricated by an inkjet oligonucleotide synthesizer. Nat Biotechnol. 2001 April; 19(4):342-7, incorporated herein by reference). In the second approach, monomers are delivered to every feature on the microarray, but are incorporated only into those features that have been previously activated to become competent to bind them, typically by removal (or "deprotection") of a blocking (or "protecting") group on the growing end of the polymer. This is the approach used by electrochemical and photolithographic methods, the most common versions of which use electrically-generated protons and ultraviolet light, respectively, to remove the blocking moieties and permit polymer and/or heteropolymer extension (see, e.g., FIG. 4 and FIG. 5). Greater detail on electrochemical microarray synthesis is provided by U.S. Pat. App. Pub. No. 2003/0050438, incorporated herein by reference. Greater detail on the photolithographic microarray synthesis method is provided by U.S. Pat. Nos. 5,143, 854; 5,445,934; and 6,375,903, each of which is incorporated herein by reference. See also Singh-Gasson S, Green R D, Yue Y, Nelson C, Blattner F, Sussman M R, Cerrina F. Maskless fabrication of light-directed oligonucleotide microarrays using a digital micromirror array. Nat Biotechnol. 1999 October; 17(10):974-8, incorporated herein by reference.

The approaches previously developed to provide spatial control over the synthesis of polymer libraries on microarrays can perhaps most easily be exemplified by methods currently used to manufacture commercial DNA oligonucleotide microarrays (see, e.g., FIG. 1-5). Similar approaches may be used to synthesize other types of polymers (RNA, PNA, LNA, peptides, proteins, glycopeptides, heteroglycans, and the like).

Although design and manufacturing improvements have increased microarray feature number and density while maintaining polymer and/or heteropolymer sequence quality and a small overall microarray size, each of the current methods for producing high density microarrays (inkjet, electrochemical, photolithographic/optical) is constrained by fundamental technical and physical limits that challenge or prevent their improvement.

Further developments in ink-jet-based microarray manufacturing methods have included efforts to reduce feature size and increase feature density by using printhead nozzles with increasingly smaller apertures. However, ink-jet-based microarray manufacturing methods are hindered by physical limits related to surface tension, fluid dynamics, and electrostatic effects. For example, commercial microarrays comprising 1,000,000 features printed on a 1-inch×3-inch glass slide, with features 30 μm in diameter, can be produced using piezoelectric inkjet technology (e.g., Agilent Technologies SurePrint G3), but despite demand for further increased feature density, it has not been forthcoming. While newer electrohydrodynamic jet printing technologies can produce droplets as small as 5 μm in diameter in research environments, high manufacturing costs, low print speeds, and an inability to eject single droplets have so far been a barrier to commercialization (see, e.g., Raje P V, Murmu N C. A Review on Electrohydrodynamic-inkjet Printing Technology. International Journal of Emerging Technology and Advanced Engineering; Gudapati, H., Dey, M. & Ozbolat, I. A comprehensive review on droplet-based bioprinting: Past, present and future. Biomaterials 102, 20-42 (2016), each of which is incorporated herein by reference).

Present electrochemical-based microarray manufacturing methods have produced 94,000 features on a surface for commercial microarrays (CustomArray, Inc., B3 Synthesizer). The prospect of basing a microarray manufacturing platform on rapidly evolving semiconductor technologies like this is attractive, particularly for leveraging future advances in scalability in that field. However, the dependence of the electrochemical method on confining pH changes to a small volume of liquid that is coincident with each feature imposes an upper limit on feature density for this method. In particular, the increased diffusion of protons between adjoining "on" and "off" features during the deprotection step of the synthesis cycle increases error rates in polymer sequences to a level that is counterproductive. While some technologies have attempted to use buffering or scavenging solutions to prevent chemical crosstalk between electrodes (e.g., due to diffusion of electrochemically generated reagents) to address this issue (see, e.g., U.S. Pat. App. Pub. No. 2003/0050438, incorporated herein by reference), the effectiveness of this strategy at higher feature densities remains unclear.

In comparison to inkjet and electrochemical-based methods, optical methods of microarray synthesis are particularly attractive for their potential to achieve very high feature density because the deprotection step that defines feature area, density, and pitch is regulated by electromagnetic radiation (e.g., light, UV, etc.) Light can be tightly controlled in terms of wavelength and intensity, and it can be directed with extremely high precision using lenses, mirrors, filters, and masks. Furthermore, the wide range of photolabile linkers available for solid-phase synthesis, which do not require acidic, basic, or metal-assisted activation for cleavage, has increased the diversity of compounds that can be synthesized on solid supports (see, e.g., Mikkelsen R J T, Grier K E, Mortensen K T, Nielsen T E, Qvortrup K. Photolabile Linkers for Solid-Phase Synthesis. ACS Comb Sci. 2018 Jul. 9; 20(7):377-399, incorporated herein by reference). The capabilities of using light to produce high-feature-density microarray synthesis are evident in commercial products that have been developed using optical methods. For example, the Affymetrix CytoScanHD array (sold under the Applied Biosystems brand by Thermo Fisher Scientific, Inc.), based on using photolithographic static masking to pattern the light used for monomer deprotection (see, e.g., U.S. Pat. No. 5,445,934, incorporated herein by reference), comprises 2.7 million individual DNA oligonucleotide probes (e.g., comprises 2.7 million features) designed for human genome analysis applications, e.g., to detect genomic DNA copy number, loss of heterozygosity (LOH), regions identical-by-descent, and uniparental isodisomy (UPD) on a single array. While static photomasking can deliver a resolution appropriate for manufacturing high-feature-density custom microarrays (Hensel C, Vanzo R, Martin M, Dixon S, Lambert C, Levy B, Nelson L, Peiffer A, Ho K S, Rushton P, Serrano M, South S, Ward K, Wassman E. Analytical and Clinical Validity Study of First-StepDx PLUS: A Chromosomal Microarray Optimized for Patients with Neurodevelopmental Conditions. PLoS Curr. 2017 Feb. 27; 9, incorporated herein by reference), static photomasking is not economical for many applications due to the expense of fabricating static photomasks. Each different microarray design requires a new set of photomasks and, for typical designs, the number of photomasks in a set is equal to the length of the longest polymer synthesized (e.g., DNA oligonucleotide heteropolymers in the case of the CytoScanHD array) in the design multiplied by the number of different monomer subunits specified for the set of heteropolymers being synthesized. Thus, for DNA microarrays containing 10-mer oligonucleotides, with 4 possible monomers at each position along their length, 40 static photomasks are required. The costs of using static photomasks are much less favorable for manufacturing complex peptide arrays, assuming at least 20 amino acid monomers are possible at each position along the length of the peptide. As a result, microarrays manufactured using photomasking methods are most affordable when the polymer and/or heteropolymer length is kept short and the number of replicate microarrays produced and sold for a specific design is high enough to amortize the initial investment of fabricating the photomasks. The need to fabricate photomasks prior to manufacturing the microarrays themselves adds additional turnaround time to custom manufacturing orders.

Together, these factors reduce the flexibility and commercial value of the photomasking method.

Microarrays produced by Roche Nimblegen rely on a photolithographic-like method called "maskless" array synthesis (MAS) (see, e.g., U.S. Pat. No. 6,375,903, incorporated herein by reference; see also, e.g., Agbavwe C, Kim C, Hong D, Heinrich K, Wang T, Somoza M M. Efficiency, error and yield in light-directed maskless synthesis of DNA microarrays. J Nanobiotechnology. 2011 Dec. 8; 9:57, incorporated herein by reference). These technologies were able to achieve synthesis of 4.2 million DNA features (each approximately 10 μm in diameter) on a 1×3 inch glass slide for use in genome analysis applications such as comparative genomic hybridization (see, e.g., Lu et al. Assessing genome-wide copy number variation in the Han Chinese population. J Med Genet. 2017 October; 54(10):685-692, incorporated herein by reference). Application of the MAS technology for synthesis of other types of heteropolymers has been demonstrated (see, e.g., Lackey et al. Acetal levulinyl ester (ALE) groups for 2'-hydroxyl protection of ribonucleosides in the synthesis of oligoribonucleotides on glass and microarrays. J Am Chem Soc. 2009 Jun. 24; 131(24):8496-502; Forsström et al. Proteome-wide epitope mapping of antibodies using ultra-dense peptide arrays. Mol Cell Proteomics. 2014 June; 13(6):1585-97, each of which is incorporated herein by reference). In particular, Lackey produced 786,000-feature microarrays containing RNA heteropolymers and Forsström used a modified version of MAS technology to construct microarrays containing 2.1 million overlapping peptides covering all known human proteins.

Because the MAS method utilizes a programmable digital micromirror device (DMD) to reflect patterned UV light onto the surface of the microarray to effect deprotection, the economic constraints associated with the use of permanent photomasks (e.g., shorter polymer length, minimum lot size, and slower turnaround time) are avoided. Another benefit of MAS technology, reminiscent of the electrochemical synthesis method, is that efforts to improve capability and performance can leverage advances in the massive consumer electronics industry. DMDs are primarily manufactured for use in digital light projectors (DLPs) used in the film industry and for high-end projection entertainment systems. As those systems evolved since their introduction from XGA (1024×768 pixels) to WXGA (1280×800 pixels) to HD (1920×1080 pixels) to 4K (4096×2160 pixels), the maximum feature density of microarrays produced using the MAS method has also increased. Although future increases in the resolution and pixel number of consumer video DMDs may continue to provide a path for improvements in microarray feature density, MAS technology has an important foundational physical limitation—The complexity of the mirrors, lenses, and filters required to translate the light from a solitary UV source into a complex image of millions of independent features projected on a microarray, and the intrinsic difficulty in keeping such a system free of contaminants and aligned within necessary tolerances, increases the occurrence of light-scattering (e.g., stray light) and leads to a high background of sequence errors ("sequence-shuffling") in the polymers. These problems dramatically limit the utility of DMD technologies for applications that require higher fidelity heteropolymers (see, e.g., Garland P B, Serafinowski P J. Effects of stray light on the fidelity of photodirected oligonucleotide array synthesis. Nucleic Acids Res. 2002 Oct. 1; 30(19): e99; Agbavwe C, Kim C, Hong D, Heinrich K, Wang T, Somoza M M. Efficiency, error and yield in light-directed maskless synthesis of DNA microarrays. J Nanobiotechnology. 2011 Dec. 8; 9:57. doi: 10.1186/1477-3155-9-57, each of which is incorporated herein by reference).

For example, one exemplary apparatus (see, e.g., U.S. Pat. No. 6,375,903) includes seven optical elements between the light source and the synthesis substrate (a band-pass filter, condenser lens, beam splitter, two-dimensional micro-mirror array device, adjustable iris, and two lenses (lens 1 and lens 2)) with an estimated minimum light path length of 50 cm. The predicted effects of stray light on the fidelity of DNA microarray synthesis in this system indicated that, under conservative assumptions of a system contrast ratio of approximately 400, only 36% of 20-mer DNA oligonucleotides synthesized would contain the correct sequence and the remainder of oligonucleotides would comprise one or more random nucleotide insertion errors (see, e.g., Garland P B, Serafinowski P J. Effects of stray light on the fidelity of photodirected oligonucleotide array synthesis. Nucleic Acids Res. 2002 Oct. 1; 30(19):e99, incorporated herein by reference). Subsequent experimental results indicated that stray light reduced the fraction of correct 20-mer oligonucleotides from a baseline of 99% (e.g., for conventional non-photolithographic synthesis) to 64% (e.g., for realistic MAS operating conditions with stray light). The fraction of correct oligonucleotides would be expected to drop significantly when synthesizing longer oligonucleotides because errors are compounded at each coupling step. An independent study of a later generation of a MAS system used to synthesize DNA microarrays estimated a stepwise coupling efficiency of 98.5%, predicting that only 55% of 40-mers would contain the correct sequence and concluding that "flare" (e.g., light scattering from dust and imperfections in the optical system) and diffraction (e.g., a property intrinsic to all imaging systems) were the most significant barriers to improving the overall quality of MAS microarrays (see, e.g., Agbavwe C, Kim C, Hong D, Heinrich K, Wang T, Somoza M M. Efficiency, error and yield in light-directed maskless synthesis of DNA microarrays. J Nanobiotechnology. 2011 Dec. 8; 9:57, incorporated herein by reference).

Another maskless microarray manufacturing system has been developed and commercialized (Febit Biomed GmbH Geniom platform) that uses digital micromirrors and patterned UV light to direct photochemical deprotection for the in situ synthesis of heteropolymers (see, e.g., Baum et al. Validation of a novel, fully integrated and flexible microarray benchtop facility for gene expression profiling. Nucleic Acids Res. 2003 Dec. 1; 31(23): e151, incorporated herein by reference). However, unlike the Roche Nimblegen system that synthesized heteropolymers on the external surface of a planar support (e.g., a glass slide) to create microarrays, the Geniom system synthesizes heteropolymers on the inside surface of three-dimensional channels winding back and forth within a transparent substrate (see, e.g., U.S. Pat. No. 7,737,088, incorporated herein by reference). While this technology reduced the volume of reagents needed to synthesize heteropolymers, increases in feature number are limited because of the substantially lower surface area provided by the supporting material between the channels. Perhaps more problematic is that the three-dimensional channels used in the Geniom system introduce a complex system of refractory and/or reflecting interfaces that produce significant light-scattering during UV deprotection, thus resulting in widespread sequence errors in the heteropolymers. This additional light scattering further contributes to the other problematic stray light contributed by components in a MAS, such as the digital micromirror device used to pattern the light.

In sum, while prior solutions have produced commercially successful microarray products and continuous improvements have been made to earlier versions of microarray designs and manufacturing methods, progress has slowed considerably in recent years despite demands for increased performance and decreased costs. In particular, existing manufacturing methods are approaching fundamental limits that make further improvements difficult. In some cases, these limits are technically and/or practically insurmountable barriers that will prevent further improvements. Specifically, ink-jet technologies (e.g., used either in spotting or in situ synthesis microarray manufacturing methods) are close to physical limits imposed by surface tension, fluid dynamics, and electrostatic effects, which hamper efforts to reduce feature size and boost feature density by using printhead nozzles with increasingly smaller apertures. Electrochemical-based microarray manufacturing methods depend on confinement of pH changes to a small volume of liquid coincident with each feature, and so diffusion processes and fluid dynamics impose limits on feature gap distances and feature density. Photolithographic methods require the design and manufacture of numerous static masks for each array, which causes static mask technologies to be exceedingly expensive, to require a long manufacturing turnaround time, and to be practically limited in the polymer length. Maskless photolithographic-like methods are limited by issues related to stray light due to complicated optics and long light paths, which result in lower quality heteropolymers (e.g., having high sequence error rates) that are inadequate for some applications. The sequence quality of heteropolymers is a major factor in limiting the utility of maskless technologies for many desirable applications.

Accordingly, prior methods for the in situ synthesis of high-feature-density polymer and/or heteropolymer microarrays using light-driven processes are limited by the weaknesses inherent in the photolithographic/photochemical microarray synthesis methods, e.g., the effects of stray light that reduce polymer and/or heteropolymer quality. For the reasons discussed above, including unmet demand for increased technical performance, scalability and cost-efficiency, it is evident that improved methods and apparatus for synthesizing high-feature-density polymer and/or heteropolymer libraries on microarrays are needed.

SUMMARY

There is a compelling need for improved polymer microarrays and improved methods of producing polymer microarrays. Maskless photolithographic in situ microarray synthesis methods currently provide the leading technology for making very high-density polymer and/or heteropolymer microarrays with custom content specification and flexible lot sizes. However, previous methods are limited by a major shortcoming related to using expensive optics systems to conduct light from a source to a separate synthesis substrate. These previous designs increase manufacturing costs for capital equipment and maintenance and produce scattered (stray) light artifacts that create sequence errors in the heteropolymers synthesized on the microarrays, thus reducing and limiting microarray quality.

The present technology comprises synthesis of polymers directly on the surface of high-density micro-LED arrays. In some embodiments, the technology is coupled with the use of light-quenching materials in the reaction chamber during deprotection. These technologies provide an improved and unique form of maskless photolithographic in situ microarray synthesis that addresses the issues of cost and sequence errors associated with previous technologies.

The majority of maskless synthesis methods utilize ultra-violet light produced by mercury arc lamps to drive the chemical reactions. LED lamps provide significant advantages relative to mercury lamps. For example, mercury is highly toxic and considered a problematic environmental pollutant. Mercury lamps also have short lifetimes, requiring frequent replacement. Lastly, because many photochemistry applications require light having a wavelength close to 365 nm, the majority of the light output from a mercury lamp is filtered and discarded, resulting in a major decrease in energy efficiency.

In contrast, LED lamps are not limited by these problems and high power 365 nm UV LED sources have found use in synthesizing microarrays (see, e.g., Holz K, Lietard J, Somoza M M. High-Power 365 nm UV LED Mercury Arc Lamp Replacement for Photochemistry and Chemical Photolithography. ACS Sustain Chem Eng. 2017 Jan. 3; 5(1): 828-834, incorporated herein by reference). While using LED light sources provided an advance in array technologies, previous technologies remained dependent on a complex optical imaging system centered around a digital micromirror device (DMD) to pattern and direct the light to the synthesis substrate. Accordingly, the use of an LED light source, by itself, does little to solve the issue of stray light artifacts. Prior solutions have attempted to address stray light artifacts within the context of existing photolithography instrument designs by applying incremental improvements in the current technologies for producing lenses, mirrors, filters, and light-absorbent coatings, but this has not achieved the desired outcome.

It has also previously been suggested that multiplex LED systems or LED arrays could potentially be used as a light source for maskless microarray synthesis. The arguments for this approach were that, in addition to the intrinsic benefits of LEDs over mercury light sources, the ability to produce light that was already patterned, by virtue of individual LED elements in the array being independently addressable, would avoid the need for the complex and expensive DMD-based system and reduce the cost of oligonucleotide synthesis. For example, a simple (but technically still multiplex) system of three LEDs spaced 10 mm apart has been used to synthesize two 40-mer DNA oligonucleotides on the interior of a capillary tube that provided the substrate/support (see, e.g., Blair S, Richmond K, Rodesch M, Bassetti M, Cerrina F. A scalable method for multiplex LED-controlled synthesis of DNA in capillaries. Nucleic Acids Res. 2006; 34(16): e110. Epub 2006 Sep. 8. Erratum in: Nucleic Acids Res. 2007; 35(2):703, incorporated herein by reference). Sequence analysis of the products, however, revealed significant DNA error rates (mutations per base pair). Thus, use of an LED light source and avoidance of using a DMD are insufficient to solve the problem of poor sequence quality frequently associated with the use of light-directed synthesis methods. Furthermore, although the synthesis of "arrays" of polymers within capillary tubes has desirable applications, many fewer have been suggested or demonstrated than currently exist for microarrrays synthesized on traditional planar supports.

A similar microarray manufacturing system synthesized heteropolymers on the interior of capillary tubes, but with a clever adaptation to make it more practical for use in existing applications, which was to form the channels (within which the heteropolymers were synthesized) on the inside of a transparent planar support (see, e.g., U.S. Pat. No. 7,737,088, incorporated herein by reference). Among the light sources contemplated for use in that previous technology were "microdiode arrays" (e.g., a version of a micro-LED array). In contrast to the present technology, light emitted from a microdiode array as used in previous technologies was conducted to a separate support on which the heteropolymers were synthesized. As a result, optical elements such as masks, microlenses, and/or fused fiber optic tapers were deemed necessary, which contribute to increased stray light and thus decrease the quality of the polymers and, consequently, decrease microarray quality. Furthermore, previous technologies comprising microdiode arrays may not be commercially feasible because commercial devices comprising microdiode arrays have not been marketed. In particular, the commercial version (Febit Biomed GmbH "Geniom" platform) of the technology described in the '088 patent relied on a UV point light source with DMD-based optics and a complex light path.

As described herein, the present technology provides several advantages over previous array technologies that use photolithographic or photochemical polymer and/or heteropolymer microarray synthesis. In particular, the present technology uses a single component comprising an integrated light source and synthesis substrate, in contrast to previous technologies comprising a separate (e.g., non-integrated) light source and synthesis substrate. Thus, according to the present technology, the light driving the photochemical reactions is conducted from light source to synthesis site without use of lenses, mirrors, filters, tapers, or masks because the substrate comprises the surface of the light source itself. Accordingly, the technology minimizes and/or eliminates stray light (e.g., produced by light scattering) and, consequently, improves polymer fidelity and microarray quality relative to previous technologies. In some embodiments, stray light is further minimized and/or eliminated by providing light-quencher molecules into the reaction chamber during the photo-deprotection process.

Accordingly, provided herein is technology for increasing the performance of microarrays and/or reducing the cost of microarrays by providing an improved microarray design and manufacturing method. In particular, the technology for manufacturing high-quality microarrays described herein comprises photochemical synthesis of polymers and/or heteropolymers (e.g., a biomolecule (e.g., a nucleic acid, a polypeptide, an oligosaccharide, etc.)) directly on a surface of a high-density micro-LED array. Embodiments of the present technology simultaneously address the desirable goals of producing high-density and high-quality polymer microarrays with flexible custom content specification and efficient production methodology.

The present technology provides embodiments of a microarray of polymer molecules (e.g., heteropolymer molecules); embodiments of methods, apparatuses, and systems for the manufacture of a microarray of polymer molecules (e.g., heteropolymer molecules); and embodiments of methods, apparatuses, and systems for the use of a microarray of polymer molecules (e.g., heteropolymer molecules). According to the technology described herein, a microarray is fabricated by photochemical synthesis of polymers (e.g., heteropolymers) directly on the surface of the light source providing the photic energy for the reactions.

This approach provides advantages over existing photochemical and photolithographic methods of microarray manufacture, all of which specify a light source that is separate and distinct from the substrate on which the heteropolymers are synthesized. In previous technologies, the distance between the light source and the site of polymer synthesis is typically more than 50 cm.

In contrast to previous technologies, the technology described herein integrates the light source and the substrate to share a common surface (e.g., by providing a substrate comprising an integrated light source). Accordingly, in further contrast with previous technologies, embodiments of the technology described herein obviate the need for large, complex, and expensive systems of lenses, masks, and/or mirrors to split, focus, magnify, demagnify, collimate, and/or convey light to reaction sites on a remote target substrate. Thus, embodiments described herein are, e.g., "lens-free", "mirror-free", and/or "mask-free" technologies. The present technology thus eliminates primary sources of light scattering that are intrinsic to other photochemical synthesis technologies and reduces the adverse impact of stray light artifacts on polymer synthesis fidelity and microarray quality.

Embodiments of the present technology comprising the integrated substrate and light source provide a path between light source and the target substrate that is negligible in any practical terms. For example, in some embodiments, the light path has a length from source to the reaction site that is substantially and/or essentially equivalent to the length of the polymer and/or heteropolymer itself as it extends from the surface during synthesis. Accordingly, in some embodiments, the light path is, e.g., less than 200 nm in length (e.g., less than 200, 195, 190, 185, 180, 175, 170, 165, 160, 155, 150, 145, 140, 135, 130, 125, 120, 115, 110, 105, 100, 95, 90, 85, 80, 75, 70, 65, 60, 55, 50, 45, 40, 35, 30, 25, 20, 15, 10, or 5 nm) even for long DNA oligonucleotides (e.g., up to 500 bases long (e.g., 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 55, 60, 65, 70, 75, 80, 85, 90, 95, 100, 105, 110, 115, 120, 125, 130, 135, 140, 145, 150, 155, 160, 165, 170, 175, 180, 185, 190, 195, 200, 205, 210, 215, 220, 225, 230, 235, 240, 245, 250, 255, 260, 265, 270, 275, 280, 285, 290, 295, 300, 305, 310, 315, 320, 325, 330, 335, 340, 345, 350, 355, 360, 365, 370, 375, 380, 385, 390, 395, 400, 405, 410, 415, 420, 425, 430, 435, 440, 445, 450, 455, 460, 465, 470, 475, 480, 485, 490, 495, or 500 bases long) or long peptides (e.g., up to approximately 150 to 500 amino acids long (e.g., 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 55, 60, 65, 70, 75, 80, 85, 90, 95, 100, 105, 110, 115, 120, 125, 130, 135, 140, 145, 150, 155, 160, 165, 170, 175, 180, 185, 190, 195, 200, 205, 210, 215, 220, 225, 230, 235, 240, 245, 250, 255, 260, 265, 270, 275, 280, 285, 290, 295, 300, 305, 310, 315, 320, 325, 330, 335, 340, 345, 350, 355, 360, 365, 370, 375, 380, 385, 390, 395, 400, 405, 410, 415, 420, 425, 430, 435, 440, 445, 450, 455, 460, 465, 470, 475, 480, 485, 490, 495, or 500 amino acids long), depending on the amino acid composition of the polypeptide). Minimizing the length and complexity of the light path between the light source and the target substrate where polymer synthesis occurs minimizes and/or eliminates sources of light scattering.

Further, in some embodiments of the technology described herein, residual stray light (e.g., resulting from local reflection and diffraction within the reaction chamber itself) is minimized and/or eliminated by introducing light quenching molecules into the reaction chamber during the photochemical reaction.

In some embodiments, the light source comprises a high-density micro-light emitting diode (micro-LED) array, which provides both: 1) the programmable light used to control the photochemical polymer synthesis reactions; and 2) the solid support (substrate) on which the reactions occur. Micro-LED arrays have several unique features which make them particularly useful for this application. For example, the LEDs of the micro-LED arrays are durable solid-state light sources that produce light within nanoseconds of activation (e.g., essentially instantaneously). Because LEDs are highly efficient in converting electrical current to light, LEDs can be made extremely small (e.g., less than approximately 1 μm in diameter) and yet produce adequate light for many applications, including photochemistry, while producing little waste heat. LEDs are semiconducting p-n junctions primarily comprising gallium nitride (GaN), which produces deep blue to near-ultraviolet light. Doping of GaN with other elements, such as aluminum (Al) or indium (In), widens the ranges of wavelengths that are produced by LEDs. Accordingly, LEDs are commercially available that emit the wavelengths of light used by existing photochemical methods to effect polymer and/or heteropolymer synthesis.

In some embodiments, the technology relates to LEDs producing light at approximately 365 nm, which corresponds to the shortest wavelength spectral line of a high-pressure mercury (Hg) lamp, e.g., as used in some previous technologies and that is appropriate for photolabile protecting groups that have been developed for removal by light produced by a Hg lamp. However, the present technology comprising use of LEDs is not constrained by the limitations of Hg lamps and, accordingly, embodiments comprise LEDs that produce wavelengths within a broader range. The technology thus provides the advantage of finding use with a wider option of wavelengths relative to some previous technologies. In some embodiments, the technology comprises use of NPPOC-based photolabile protecting groups absorb light efficiently at wavelengths lower than or greater than 365 nm. For example, Sph-NPPOC has a peak absorbance at about 345 nm (see, e.g., Kretschy (2015) "Next-Generation o-Nitrobenzyl Photolabile Groups for Light-Directed Chemistry and Microarray Synthesis" Angew Chem Int Ed Engl. 54(29): 8555-8559, incorporated herein by reference). In some embodiments, the wavelength is greater than approximately 300 nm to minimize and/or eliminate damage to the polymers themselves (e.g., DNA is particularly sensitive to wavelengths of 280-290 nm) and is less than approximately 400 nm to maximize deprotection of NPPOC-based groups. For example, in some embodiments, the technology relates to LEDs producing light having a wavelength of 300-400 nm (e.g., 300, 301, 302, 303, 304, 305, 306, 307, 308, 309, 310, 311, 312, 313, 314, 315, 316, 317, 318, 319, 320, 321, 322, 323, 324, 325, 326, 327, 328, 329, 330, 331, 332, 333, 334, 335, 336, 337, 338, 339, 340, 341, 342, 343, 344, 345, 346, 347, 348, 349, 350, 351, 352, 353, 354, 355, 356, 357, 358, 359, 360, 361, 362, 363, 364, 365, 366, 367, 368, 369, 370, 371, 372, 373, 374, 375, 376, 377, 378, 379, 380, 381, 382, 383, 384, 385, 386, 387, 388, 389, 390, 391, 392, 393, 394, 395, 396, 397, 398, 399, or 400 nm).

The basic properties of LEDs (e.g., self-emission of light, small size, high durability, low latency, high luminosity, and high efficiency), when manufactured as individually addressable components arranged in a high-density array format (e.g., to provide a micro-LED array), provide a technology for use as flat panel display screens and flexible display screens in consumer electronic applications. Accordingly, a variety of semiconductor chip production methods have been developed to integrate micro-LEDs with driver circuitry in a high-density format, including epitaxic growth of micro-LEDs on sapphire or silicon wafers prior to bonding with a separate wafer containing complementary metal-oxide semiconductor (CMOS) integrated circuitry (IC); and growth of micro-LEDs directly on a backplane of driver circuitry ("monolithic" methods). Using these methods, researchers have achieved reproducible fabrication of 873× 500 (436,500) pixel displays with a micro-LED diameter of 5 μm and a pitch of 10 μm in a total array footprint of only 8.7×5 mm (see, e.g., Templier et al. High-resolution active-matrix 10-μm pixel-pitch GaN LED microdisplays for augmented reality applications. Proceedings Volume 10556, Advances in Display Technologies VIII (2018); 105560I, incorporated herein by reference). Further, experiments have demonstrated the feasibility of GaN micro-LED arrays with pitches less than 4 μm for individual micro-LEDs that are 2 μm wide. These technical milestones support the practicality of producing polymer and/or heteropolymer microarrays on the surface of micro-LED arrays with a feature diameter, complexity, and density that improve upon the state of the art under current manufacturing methods.

Embodiments of the technology described herein comprise and/or make use of a custom-designed high-density micro-LED array that: 1) emits light of the desired wavelength (e.g., to control polymer synthesis); and 2) comprises a functionalized surface (e.g., to provide a substrate upon polymer synthesis occurs). In some embodiments, the surface of the micro-LED array is functionalized by coating the light-emitting surface with a material capable of supporting in situ synthesis of the desired polymers. This material has at its surface functional groups that form a chemical bond with a component of the specified polymer and anchor it to surface of the micro-LED array. In some embodiments, the functionalized micro-LED array is then secured within a flow-cell apparatus that provides for the delivery of liquid reagents to and from a reaction chamber that is formed over the light-emitting surface of the array. In some embodiments, the liquid reagents are delivered to the reaction chamber using a liquid reagent handling system connected to the flow-cell apparatus. In some embodiments, a computer is used to control and coordinate the activity of the liquid reagent handling system and/or the emission of light from each individual micro-LED in the micro-LED array to synthesize the desired polymers in situ on the functionalized surface of the micro-LED array, thus producing a polymer (e.g., heteropolymer) microarray.

In some embodiments, synthesis of polymers comprises a series of in situ chemical and photochemical reactions (e.g., provided in cycles and wherein, in some embodiments, the number of cycles is determined by the length of the polymers). For example, in some embodiments, the functionalized micro-LED array is secured within a flow-cell apparatus. In some embodiments, the functional groups on the micro-LED array surface are capable of coupling with polymer subunits provided to the functional groups on the surface. Accordingly, in some embodiments, methods comprise a step (e.g., a first step) of blocking (e.g., "protecting") the reactive moieties and/or binding sites on these functional groups (e.g., to prevent functional groups from participating in reactions until a synthetic step is desired). In some embodiments, blocking the functional groups comprises delivering to the micro-LED surface a blocking chemical that binds and/or reacts with the functional groups on the micro-LED surface and renders them incapable of coupling with polymer and/or heteropolymer subunits until said blocking chemical is removed. The blocking chemical utilized in the present technology is photolabile and is removed from the functional group by illuminating it with light of a specific wavelength emitted by the micro-LED array, in a process known as photo-deprotection. Photo-deprotection removes the blocking material from the functional groups on the micro-LED surface so that the functional groups able to react with polymer subunits.

In some embodiments, the technology provides for synthesizing polymers and/or heteropolymers comprising different subunit sequences in parallel on the same microarray. Accordingly, in some embodiments, photo-deprotection is performed selectively by activating micro-LEDs only at locations where a particular subunit is desired to be added to a polymer (e.g., the photo-deprotection occurs only at locations where a subsequent subunit addition will occur). In some embodiments, light quenchers (e.g., aromatic molecules (e.g., anthracene)) are included during the photo-deprotection step to absorb and dampen the effects of stray light within the reaction chamber (e.g., caused by back-reflection or diffraction). A fluid comprising the next subunit is delivered to the reaction chamber and the subunit is distributed over the entire light-emitting surface of the array; however, the subunit is incorporated only where photo-deprotection previously removed the blocking chemicals to re-activate functional groups. Importantly, the incorporated polymer subunits comprise photolabile blocking moieties (e.g., that were added to them when they were originally synthesized). While this does not interfere with their binding to photo-deprotected sites on the array, it prevents them from coupling uncontrollably with each other (e.g., by concatamerizing) and forming long homopolymers. Each photo-deprotection step and subsequent subunit coupling step provides a synthesis cycle. In some embodiments, synthesis cycles include activation, oxidation, heating, cooling, drying, and/or washing steps to promote or inhibit the coupling and/or photo-deprotection reactions. Synthesis cycles are iterated as often as necessary, activating different subsets of micro-LEDs and coupling different subunits to the growing heteropolymers on their surface until synthesis is completed. At that point, the array can be used for its intended application.

The present technology finds use to fabricate microarrays comprising a wide range of different types of heteropolymers, using existing reagents and reaction conditions that are widely used and understood. For example, the technology may be applied to fabricate microarrays comprising organic heteropolymers such as DNA, RNA, peptide nucleic acid (PNA), locked nucleic acid (LNA), peptides, peptidomimetics, glycopeptides, heteroglycans, and the like, including heteropolymers with non-natural subunits and/or backbone linkages. The technology finds use to fabricate microarrays containing a variety of inorganic and hybrid organic-inorganic heteropolymers. In some embodiments, the resulting combinatorial library of polymers remains attached to the surface of the microarray where synthesized. In some embodiments, the resulting combinatorial library of polymers is cleaved (e.g., transferred) from the array into solution for use in a diversity of subsequent applications.

Accordingly, in some embodiments, the technology provided herein relates to a microarray comprising a micro-LED array light source comprising an integrated substrate; and a plurality of polymers attached to said substrate. In some embodiments, the polymers are heteropolymers. In some embodiments, the polymers are oligonucleotides. In some embodiments, the polymers are oligopeptides. In some embodiments, the polymers comprise a nucleomimetic, a peptide nucleic acid, a peptidomimetic, a glycopeptide, or a porphyrin. In some embodiments, the polymers comprise a heteroglycan. Embodiments provide various modes of attaching the polymers to the substrate. For example, in some embodiments, the polymers are attached directly to the integrated substrate; attached to the integrated substrate by linker molecules; or attached to a material deposited on the integrated substrate.

In some embodiments, the micro-LED array comprises a plurality of micro-LEDs that emit light having a wavelength greater than approximately 10 nm. In some embodiments, the micro-LED array comprises a plurality of micro-LEDs that emit light having a wavelength between approximately 100 nm and 10 μm. In some embodiments, the micro-LED array comprises a plurality of micro-LEDs that emit light having a wavelength between approximately 300 nm and 500 nm (e.g., 300, 305, 310, 315, 320, 325, 330, 335, 340, 345, 350, 355, 360, 365, 370, 375, 380, 385, 390, 395, 400, 405, 410, 415, 420, 425, 430, 435, 440, 445, 450, 455, 460, 465, 470, 475, 480, 485, 490, 495, or 500 nm). In some embodiments, the micro-LED array comprises a plurality of micro-LEDs that emit light having a wavelength of 365 nm. In some embodiments, the micro-LED array comprises micro-LEDs that emit light having different wavelengths. In some embodiments, the microarray further comprises a wavelength converting material that converts light having one wavelength into light having a different wavelength. In some embodiments, the microarray further comprises a filter material that selectively passes light of a range of wavelengths from said micro-LED array light source to said integrated substrate.

As described herein, embodiments of the technology provide microarrays having improved feature numbers and/or feature densities. For example, in some embodiments, the technology provides a microarray comprising at least 1 feature (e.g., 1-100 features (e.g., 1, 2, 3, 4, 5, 6, 7, 8, 9, 10, 15, 20, 25, 30, 35, 40, 45, 50, 55, 60, 65, 70, 75, 80, 85, 90, 95, or 100 features)); at least 100 features (e.g., 100-1000 features (e.g., 100, 150, 200, 250, 300, 350, 400, 450, 500, 550, 600, 650, 700, 750, 800, 850, 900, 950, or 1000 features)); at least 1,000 features (e.g., 1,000-10,000 features (e.g., 1000; 1500; 2000; 2500; 3000; 3500; 4000; 4500; 5000; 5500; 6000; 6500; 7000; 7500; 8000; 8500; 9000; 9500; or 10,000 features)); or at least 10,000 features (e.g., 10,000-100,000 features (e.g., 10,000; 15,000; 20,000; 25,000; 30,000; 35,000; 40,000; 45,000; 50,000; 55,000; 60,000; 65,000; 70,000; 75,000; 80,000; 85,000; 90,000; 95,000; or 100,000 features)). In some embodiments, the technology provides a microarray comprising 100,000 or more features (e.g., 100,000 to 5,000,000 or more features (e.g., 100,000; 200,000; 300,000; 400,000; 500,000; 600,000; 700,000; 800,000; 900,000; 1,000,000; 2,000,000; 3,000,000; 4,000,000; or 5,000,000 features or more).

As described herein, embodiments of the technology provide microarrays having improved feature numbers and/or feature densities. For example, in some embodiments, the technology provides a microarray comprising at least 10 features (e.g., 10-100 features (e.g., 10, 15, 20, 25, 30, 35, 40, 45, 50, 55, 60, 65, 70, 75, 80, 85, 90, 95, or 100 features)); at least 100 features (e.g., 100-1000 features (e.g., 100, 150, 200, 250, 300, 350, 400, 450, 500, 550, 600, 650, 700, 750, 800, 850, 900, 950, or 1000 features)); at least 1,000 features (e.g., 1,000-10,000 features (e.g., 1000; 1500; 2000; 2500; 3000; 3500; 4000; 4500; 5000; 5500; 6000; 6500; 7000; 7500; 8000; 8500; 9000; 9500; or 10,000 features)); or at least 10,000 features (e.g., 10,000-100,000 features (e.g., 10,000; 15,000; 20,000; 25,000; 30,000; 35,000; 40,000; 45,000; 50,000; 55,000; 60,000; 65,000; 70,000; 75,000; 80,000; 85,000; 90,000; 95,000; or 100,000 features)). In some embodiments, the technology provides a microarray comprising 100,000 or more features (e.g., 100,000 to 5,000,000 or more features (e.g., 100,000; 200,000;

300,000; 400,000; 500,000; 600,000; 700,000; 800,000; 900,000; 1,000,000; 2,000,000; 3,000,000; 4,000,000; or 5,000,000 features or more).

In some embodiments, the technology provides a microarray comprising 1,000,000 or more features. In some embodiments, the technology provides a microarray comprising 5,000,000 or more features.

In some embodiments, the technology provides a microarray comprising a feature density of at least 10 features/cm$^2$ (e.g., 10-100 features/cm$^2$ (e.g., 10, 15, 20, 25, 30, 35, 40, 45, 50, 55, 60, 65, 70, 75, 80, 85, 90, 95, or 100 features/cm$^2$)); at least 100 features/cm$^2$ (e.g., 100-1000 features/cm$^2$ (e.g., 100, 150, 200, 250, 300, 350, 400, 450, 500, 550, 600, 650, 700, 750, 800, 850, 900, 950, or 1000 features/cm$^2$)); at least 1,000 features/cm$^2$ (e.g., 1,000-10,000 features/cm$^2$ (e.g., 1000; 1500; 2000; 2500; 3000; 3500; 4000; 4500; 5000; 5500; 6000; 6500; 7000; 7500; 8000; 8500; 9000; 9500; or 10,000 features/cm$^2$)); or at least 10,000 features/cm$^2$ (e.g., 10,000-100,000 features/cm$^2$ (e.g., 10,000; 15,000; 20,000; 25,000; 30,000; 35,000; 40,000; 45,000; 50,000; 55,000; 60,000; 65,000; 70,000; 75,000; 80,000; 85,000; 90,000; 95,000; or 100,000 features/cm$^2$)). In some embodiments, the technology provides a microarray comprising 100,000 or more features/cm$^2$ (e.g., 100,000 to 5,000,000 or more features/cm$^2$ (e.g., 100,000; 200,000; 300,000; 400,000; 500,000; 600,000; 700,000; 800,000; 900,000; 1,000,000; 2,000,000; 3,000,000; 4,000,000; or 5,000,000 features/cm$^2$ or more). In some embodiments, the technology provides a microarray comprising a feature density of at least 100,000 features/cm$^2$ (e.g., 100,000; 150,000; 200,000; 250,000; or 300,000 features/cm$^2$). In some embodiments, the technology provides a microarray comprising a feature density of at least 300,000 features/cm$^2$. In some embodiments the microarray provided herein comprises polymers comprising at least 10 monomer units, at least 25 monomer units, at least 50 monomer units, at least 100 monomer units, and/or at least 500 monomer units.

As described herein, the technology provides improved microarrays and improved methods for producing microarrays by minimizing the distance light travels from the light source to the site of synthesis of the polymers on the substrate. For example, in some embodiments, the microarray comprises a micro-LED array light source that is less than 200 nm from said integrated substrate, that is less than 100 nm from said integrated substrate, that is less than 50 nm from said integrated substrate, or that is less than 10 nm from said integrated substrate. In some embodiments, the microarray comprises a micro-LED array light source that is less than 200 nm from the polymers on the substrate, that is less than 100 nm from the polymers on the substrate, that is less than 50 nm from the polymers on the substrate, or that is less than 10 nm from the polymers on the substrate.

In some embodiments, one or more polymers comprises a detectable label (e.g., a fluorescent label) or a photo-cross-linker moiety.

As described herein, the technology increases the fidelity of polymer synthesis, which minimizes and/or eliminates errors in the synthesized polymers. For instance, embodiments provide a microarray comprising polymers comprising sequence errors at a rate of less than 1 error per 10$^2$ monomers incorporated into a polymer, less than 1 error per 103 monomers incorporated into a polymer, less than 1 error per 104 monomers incorporated into a polymer, less than 1 error per 105 monomers incorporated into a polymer, or less than 1 error per 10$^6$ monomers incorporated into a polymer.

In related embodiments, the technology provides methods of producing a microarray. For example, in some embodiments, methods comprise providing a micro-LED array light source comprising an integrated substrate; and synthesizing a plurality of polymers on the integrated substrate. In some embodiments, the micro-LED array light source emits light to control polymer synthesis. In some embodiments, each micro-LED of said micro-LED array is controlled independently. In some embodiments, synthesizing polymers comprises activating a molecule at a synthesis site using light emitted from said micro-LED array. In some embodiments, activating a molecule at a synthesis site comprises removing a photolabile protecting group from said molecule at said synthesis site. In some embodiments, methods comprise providing a composition comprising polymer subunits comprising a photolabile protecting group. In some embodiments, methods further comprise removing unincorporated polymer subunits. In some embodiments, the polymers are oligonucleotides. In some embodiments, the polymers are oligopeptides. In some embodiments, the polymers comprise a nucleomimetic, a peptide nucleic acid, a peptidomimetic, a glycopeptide, a heteroglycan, or a porphyrin. In some embodiments, the photolabile protecting group comprises 2-(2-nitrophenyl)propoxycarbonyl (NPPOC) or a derivative thereof as described herein. In some embodiments, methods further comprise providing a composition comprising a light quenching molecule, e.g., in some embodiments, methods comprise minimizing and/or eliminating stray light using a light quenching molecule.

In some embodiments, the technology provides a system for microarray synthesis. For example, in some embodiments, the system comprises a micro-LED array light source comprising an integrated substrate; a fluid control component; and a computer configured to control the flow of fluids to the substrate and to control emission of light from the micro-LED array. In some embodiments, systems comprise a plurality of said micro-LED array light sources comprising an integrated substrate connected in series or in parallel and sharing said fluid control component. In some embodiments, the computer controls the synthesis of polymers on each substrate independently to produce a plurality of different microarrays. In some embodiments, the systems further comprise a light quenching molecule, e.g., an aromatic hydrocarbon. In some embodiments, the light quenching molecule absorbs light at a wavelength between approximately 300 to 400 nm (e.g., 300, 301, 302, 303, 304, 305, 306, 307, 308, 309, 310, 311, 312, 313, 314, 315, 316, 317, 318, 319, 320, 321, 322, 323, 324, 325, 326, 327, 328, 329, 330, 331, 332, 333, 334, 335, 336, 337, 338, 339, 340, 341, 342, 343, 344, 345, 346, 347, 348, 349, 350, 351, 352, 353, 354, 355, 356, 357, 358, 359, 360, 361, 362, 363, 364, 365, 366, 367, 368, 369, 370, 371, 372, 373, 374, 375, 376, 377, 378, 379, 380, 381, 382, 383, 384, 385, 386, 387, 388, 389, 390, 391, 392, 393, 394, 395, 396, 397, 398, 399, or 400 nm), e.g., 365 nm.

In some embodiments, the technology provides a method of making a polymer and/or heteropolymer array comprising the steps of providing a substrate comprising a micro-LED array and a surface comprising photoreactive molecules; triggering at least one micro-LED in the micro-LED array to emit light that activates at least one of the photoreactive molecules to become able to bind at least one component of a specified set of heteropolymers; and contacting the activated molecules with at least one component of a specified set of heteropolymers so that at least one activated molecule binds with said at least one component and tethers it to the substrate. In some embodiments, the photoreactive molecules are attached directly to the surface of the micro-LED array, are attached to the micro-LED array via linker molecules, are attached to the micro-LED via a layer of material overlaying the micro-LED array, or are attached to the micro-LED via a previously bound component of the specified set of heteropolymers. In some embodiments, at least one component of the specified set of heteropolymers is a linker molecule, a monomer, or a pre-synthesized polymer. In some embodiments, at least one component of the specified set of heteropolymers is photoreactive and can be activated by light to become able to bind at least one further component of the specified set of heteropolymers. In some embodiments, the photoreactive molecules are activated by removing a photolabile protecting group, e.g., 2-(2-nitrophenyl) propoxycarbonyl (NPPOC) or a related derivative as described herein. In some embodiments, synthesis steps (e.g., triggering and contacting steps) are repeated to produce at least two separate heteropolymers of a desired length and sequence on the surface of the substrate. In some embodiments, the monomer is a nucleotide, a ribonucleotide, a peptide nucleic acid monomer, an amino acid, an amino acid with a modified side chain. a nucleomimetic monomer, a peptidomimetic monomer, or a carbohydrate. In some embodiments, the pre-synthesized polymer is an oligonucleotide, a nucleic acid, a nucleomimetic, a peptide nucleic acid, a peptide, a peptidomimetic, a glycopeptide, a heteroglycan, a protein, or a porphyrin. In some embodiments, the micro-LEDs emit light having a wavelength greater than approximately 10 nm, between approximately 100 nm and 10 μm, between approximately 300 nm and 500 nm, or at approximately 365 nm. In some embodiments, the micro-LED array comprises at least two different kinds of micro-LEDs that emit light having different wavelengths. In some embodiments, the micro-LED array comprises a layer of converting material between the micro-LEDs and the photoreactive molecules at the surface that converts light having one wavelength into light having a different wavelength. In some embodiments, the micro-LED array comprises a layer of filter material between the micro-LEDs and the photoreactive molecules at the surface that receives light from the micro-LEDs and selectively passes only desired wavelengths through to the photoreactive molecules.

In some embodiments, the technology provides a method of making a nucleic acid array. For example, in some embodiments, methods comprise providing a substrate comprising a micro-LED array and a surface comprising photoreactive anchor molecules; triggering at least one micro-LED in the micro-LED array to emit light that activates at least one of the photoreactive anchor molecules to become an activated anchor molecule able to bind at least one nucleotide; binding a first nucleotide to at least one of the activated anchor molecules on the substrate, wherein said first nucleotide is photoreactive and can subsequently be activated by light to become able to bind another nucleotide; triggering at least one micro-LED in the micro-LED array to emit light that activates at least one of the photoreactive molecules on the micro-LED array to become an activated molecule, wherein said activated molecule is an activated anchor molecule or a previously bound nucleotide; binding a next nucleotide to at least one of the activated molecules on the micro-LED array, wherein said next nucleotide is photoreactive and can subsequently be activated by light to become able to bind another nucleotide; and repeating synthesis steps (e.g., the last two steps of the aforementioned method) to produce at least two separate oligonucleotides of the desired length and nucleotide sequence on the surface of the substrate. In some embodiments, the photoreactive anchor molecules are attached directly to the surface of the micro-LED array, are attached to the micro-LED array via linker molecules, or are attached to the micro-LED via a layer of material overlaying the micro-LED array. In some embodiments, nucleotide monomers are replaced for at least one binding step by nucleotide dimers, nucleotide trimers, or polymers comprising more than three nucleotides, wherein said dimers, timers, and polymers are photoreactive and can subsequently be activated by light to become able to bind another nucleotide monomer, dimer, trimer, or polymer. In some embodiments, the nucleotides are deoxyribonucleotides, ribonucleotides, or peptide nucleic acid subunits.

In some embodiments, the technology provides a method of making a peptide array. For example, in some embodiments, the methods comprise providing a substrate comprising a micro-LED array and a surface comprising photoreactive anchor molecules; triggering at least one micro-LED in the micro-LED array to emit light that activates at least one of the photoreactive anchor molecules to become an activated anchor molecule able to bind at least one amino acid; binding a first amino acid to at least one of the activated anchor molecules on the substrate, wherein said first amino acid is photoreactive and can subsequently be activated by light to become able to bind another amino acid; triggering at least one micro-LED in the micro-LED array to emit light that activates at least one of the photoreactive molecules on the micro-LED array to become an activated molecule, wherein said activated molecule is an anchor molecule or a previously bound amino acid; binding a next amino acid to at least one of the activated molecules on the micro-LED array, wherein said next amino acid is photoreactive and can subsequently be activated by light to become able to bind another amino acid; and repeating synthesis steps (e.g., the last two steps of the aforementioned method) to produce at least two separate peptides of the desired length and amino acid sequence on the surface of the substrate. In some embodiments, the photoreactive anchor molecules are attached directly to the surface of the micro-LED array, are attached to the micro-LED array via linker molecules, or are attached to the micro-LED via a layer of material overlaying the micro-LED array. In some embodiments, amino acid monomers are replaced for at least one binding steps by amino acid dimers, amino acid trimers, or polymers comprising more than three amino acids, wherein said dimers, timers, and polymers are photoreactive and can subsequently be activated by light to become able to bind another amino acid monomer, dimer, trimer, or polymer. In some embodiments, the amino acids are proteinogenic, non-proteinogenic, modified proteinogenic amino acids, or modified nonproteinogenic amino acids.

In some embodiments, the technology provides a method of converting a micro-LED array into a functionalized substrate that can be used for making a polymer and/or heteropolymer array. For example, in some embodiments, methods comprise providing a micro-LED array; and coating the light-emitting surface of said micro-LED array with at least one layer of material to produce a reactive layer comprising surface anchor molecules that can bind at least one other molecule and tether it to the micro-LED array. In some embodiments, at least one chemical bond between the surface of the micro-LED array and at least one other molecule tethered to it can be cleaved to release the said at least one other molecule and any molecules attached to it from the micro-LED array. In some embodiments, the anchor molecules are photoreactive and can be activated by light to become able to bind at least one component of a specified set of heteropolymers and tether said at least one component to the micro-LED array. In some embodiments, the anchor molecules are bound to at least one other kind of molecule that is photoreactive and can be activated by light to become able to bind at least one component of a specified set of heteropolymers and tether said at least one component to the micro-LED array. In some embodiments, at least one linker molecule is incorporated between said anchor molecules on the surface of the micro-LED array and said at least one other kind of molecule that is photoreactive.

In some embodiments, the technology provides a method of synthesizing a microarray by identifying functional micro-LEDs of a micro-LED array, e.g., by a method comprising connecting a computer to a micro-LED array to provide signals to control the emission of light from individual micro-LEDs in the micro-LED array; triggering micro-LEDs in the micro-LED array to emit light; imaging the light-emitting surface of the micro-LED array to identify micro-LEDs that are functional; using the collected imaging data to identify functional micro-LEDs of the micro-LED array; and synthesizing polymers using the functional micro-LEDs of the micro-LED array to produce a microarray (e.g., and not synthesizing polymers using the non-functional micro-LEDs or using micro-LEDs having suboptimal functioning). In some embodiments, synthesizing a microarray by identifying functional micro-LEDs of a micro-LED array and synthesizing polymers using (e.g., using only) the functional micro-LEDs provides a synthesizing step that provides a 100% synthesis yield of the polymers on the microarray. In some embodiments, synthesizing a microarray by identifying functional micro-LEDs of a micro-LED array and synthesizing polymers using (e.g., using only) the functional micro-LEDs provides a synthesizing step that provides at least a 95% (e.g., 95.0%, 95.1%, 95.2%, 95.3%, 95.4%, 95.5%, 95.6%, 95.7%, 95.8%, 95.9%, 96.0%, 96.1%, 96.2%, 96.3%, 96.4%, 96.5%, 96.6%, 96.7%, 96.8%, 96.9%, 97.0%, 97.1%, 97.2%, 97.3%, 97.4%, 97.5%, 97.6%, 97.7%, 97.8%, 97.9%, 98.0%, 98.1%, 98.2%, 98.3%, 98.4%, 98.5%, 98.6%, 98.7%, 98.8%, 98.9%, 99.0%, 99.1%, 99.2%, 99.3%, 99.4%, 99.5%, 99.6%, 99.7%, 99.8%, or 99.9%) synthesis yield of the polymers on the microarray. In some embodiments, the technology provides a method of producing a microarray, the method comprising identifying functional micro-LEDs of a micro-LED array (e.g., as described above) and synthesizing a specified set of heteropolymers using one or more functional micro-LEDs of said micro-LED array.

In some embodiments, the technology provides a system for producing a polymer and/or heteropolymer array. In some embodiments, the system comprises a substrate comprising a micro-LED array and a light-emitting surface comprising photoreactive molecules; a sealed reaction chamber comprising a flow-cell in fluid communication with the micro-LED array, wherein said sealed reaction chamber encloses the light-emitting surface of the micro-LED array and comprising inlet and outlet ports for providing polymer and/or heteropolymer synthesis reagents to and from the light-emitting surface of the micro-LED array; a computer connected to the micro-LED array to provide signals to control the emission of light from individual micro-LEDs in the micro-LED array; and a fluid delivery system to control the transport of polymer and/or heteropolymer synthesis reagents to and from the reaction chamber. In some embodiments, the emission of light from individual micro-LEDs in the micro-LED array and the transport of polymer and/or heteropolymer synthesis reagents to and from the reaction chamber are synchronized by at least one computer. In some embodiments, multiple flow-cell-array assemblies are connected in series to share a common flow of polymer and/or heteropolymer synthesis reagents. In some embodiments, multiple flow-cell-array assemblies are connected in parallel to share a common flow of polymer and/or heteropolymer synthesis reagents. In some embodiments, a single flow-cell forms a sealed reaction chamber enclosing the light-emitting surfaces of multiple micro-LED arrays to share a common flow of polymer and/or heteropolymer synthesis reagents. In some embodiments, the computer is simultaneously connected to multiple micro-LED arrays to synthesize different sets of heteropolymers. In some embodiments, the flow-cell can be detached from a micro-LED array for re-use. In some embodiments, the flow-cell can remain attached to the micro-LED array after polymer and/or heteropolymer array synthesis for use in subsequent applications.

As described herein, some embodiments of the technology provide a method of regulating the light provided to a photochemical reaction comprising providing a material that inhibits the transmission of light. In some embodiments, the material that inhibits the transmission of light inhibits the transmission of light by absorbing light. In some embodiments, the material that inhibits the transmission of light inhibits the transmission of light by absorbing light of a designated wavelength. In some embodiments, the designated wavelength is between 300-400 nm (e.g., 300, 301, 302, 303, 304, 305, 306, 307, 308, 309, 310, 311, 312, 313, 314, 315, 316, 317, 318, 319, 320, 321, 322, 323, 324, 325, 326, 327, 328, 329, 330, 331, 332, 333, 334, 335, 336, 337, 338, 339, 340, 341, 342, 343, 344, 345, 346, 347, 348, 349, 350, 351, 352, 353, 354, 355, 356, 357, 358, 359, 360, 361, 362, 363, 364, 365, 366, 367, 368, 369, 370, 371, 372, 373, 374, 375, 376, 377, 378, 379, 380, 381, 382, 383, 384, 385, 386, 387, 388, 389, 390, 391, 392, 393, 394, 395, 396, 397, 398, 399, or 400 nm). In some embodiments, the material that inhibits the transmission of light is an aromatic hydrocarbon. In some embodiments, the designated wavelength is approximately 365 nm.

In some embodiments, the technology relates to use of a microarray as described herein to assay a sample. In some embodiments, the technology relates to use of a microarray as described herein to identify a biomarker (e.g., a deoxyribonucleic acid, ribonucleic acid, metabolite, lipid, phospholipid, steroid, carbohydrate, sugar, polysaccharide, signaling molecule, hormone, neurotransmitter, cofactor, protein, or glycoprotein; and/or a derivative or chemical modification of any of the foregoing). In some embodiments, the technology relates to use of a microarray as described herein to identify a combination (e.g., 2, 3, 4, 5, 6, 7, or 8 or more) of two or more biomarkers (e.g., two or more of a deoxyribonucleic acid, ribonucleic acid, metabolite, lipid, phospholipid, steroid, carbohydrate, sugar, polysaccharide, signaling molecule, hormone, neurotransmitter, cofactor, protein, or glycoprotein; and/or a derivative or chemical modification of any of the foregoing; and/or a combination of any of the foregoing). In some embodiments, the technology relates to use of a microarray as described herein to identify a biomarker that is a derivative or chemical modification of a deoxyribonucleic acid, ribonucleic acid, metabolite, lipid, phospholipid, steroid, carbohydrate, sugar, polysaccharide, signaling molecule, hormone, neurotransmitter, cofactor, protein, or a glycoprotein. In some embodiments, the technology relates to use of a microarray as described herein to identify a plurality of biomarkers (e.g., to provide a biomarker panel comprising a plurality (e.g., 2, 3, 4, 5, 6, 7, 8, 9, 10, or more) of a deoxyribonucleic acid, ribonucleic acid, metabolite, lipid, phospholipid, steroid, carbohydrate, sugar, polysaccharide, signaling molecule, hormone, neurotransmitter, cofactor, protein, or glycoprotein; and/or a combination of any of the foregoing; and/or a derivative and/or chemical modification of one or more of the foregoing).

In some embodiments, the technology relates to use of a microarray as described herein to identify materials that interact with polymers synthesized on the microarray surface. In some embodiments, the technology relates to use of a method as described herein to produce a microarray. In some embodiments, the technology relates to use of a system as described herein to produce a microarray.

As described herein, the technology provides advantages over prior microarray technologies. In particular, the present technology makes use of a component comprising a light source and a synthesis substrate that are integrated into a single structure, which is in contrast to previous photolithographic or photochemical polymer and/or heteropolymer microarray technologies in which the light source and synthesis substrate are separate and require a complicated light path (e.g., comprising lenses, mirrors, filters, tapers, masks, etc.). In the present technology, the light controlling the photochemical reactions is provided to the synthesis substrate without the use of lenses, mirrors, filters, tapers, or masks between the surface of the light source and the substrate because the substrate comprises the surface of the light source itself.

Accordingly, the technology minimizes and/or eliminates deleterious stray light (e.g., produced by light scattering) that decreases polymer and/or heteropolymer fidelity and microarray quality in other, previous technologies. In some embodiments of the present technology, residual stray light is further restricted by optionally providing light-quencher molecules in the reaction chamber during the photo-deprotection process. The present technology thus provides a technology for high-density, high-quality polymer microarrays with flexible custom content specification and efficient production methodology. Other features and embodiments of the present technology will be apparent to those persons skilled in the art as provided by the teachings of the drawings, detailed description, and claims provided herein.

BRIEF DESCRIPTION OF THE DRAWINGS

These and other features, aspects, and advantages of the present technology will become better understood with regard to the following drawings.

"Feature number" refers to the absolute number of spatially distinct features on the microarray. (feature number=3 in the example shown). "Feature density" is defined as the number of features divided by the functional area of the microarray. Accordingly, "feature density" does not describe the absolute number of molecules on the microarray, the total number of different sequences represented on the microarray, or the number of copies of each molecule per feature. "Feature diversity" refers to the absolute number of different sequences that are represented on a microarray (e.g., a measure of information complexity) and is partially independent of the absolute number of features. For example, while a microarray comprises a minimum feature number to support a given feature diversity, two microarrays may have the same feature numbers but different feature diversities if one microarray comprises a greater redundancy of sequence representation among its features. The same terminology defined here applies to microarrays comprising other types of polymer and/or heteropolymer molecules (e.g., RNA oligonucleotides, peptides, peptidomimetics, heteroglycans, and other biological and non-biological polymers, etc.)

Figure 1:
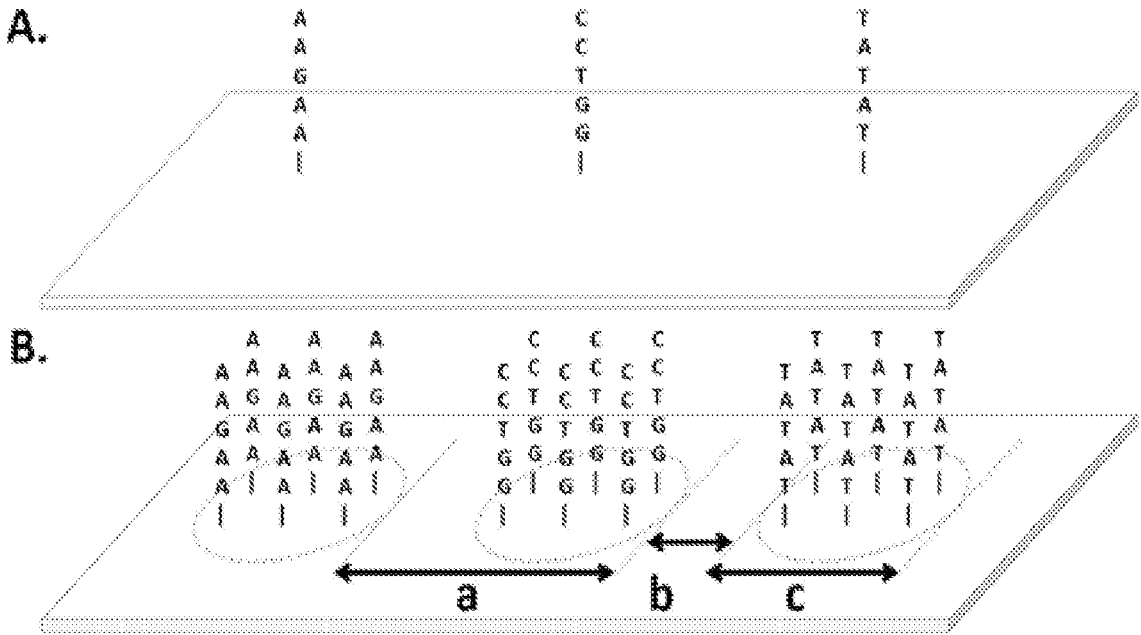
FIG. 1 is a schematic drawing of a microarray illustrating terminology used to describe microarrays, e.g., relating to microarray feature number and density. Panel A depicts an exemplary microarray comprising three different 5-mer DNA oligonucleotide molecules, each comprising a different nucleotide sequence. Each of the three oligonucleotides can be referred to as distinct "features" of the microarray. In practice, however, each feature comprises a plurality (e.g., a clustered plurality) of several thousands or millions of copies of the same oligonucleotide occupying a discrete feature. Panel B shows three dashed circles indicating three features of a microarray where, for simplicity, only six copies of each different oligonucleotide molecule are drawn. The distance between the same point on adjacent features is referred to as the "feature pitch" (arrow a); the distance between the closest point on adjacent features is referred to as the "feature gap" (arrow b); the width of a feature is referred to as the "feature width" (arrow c). In some embodiments, features are circular, substantially circular, or effective circular, but need not be circular and embodiments provide microarrays comprising features having a variety of shapes, e.g., elliptical, linear, polygonal, and/or irregular.
Figure 2:
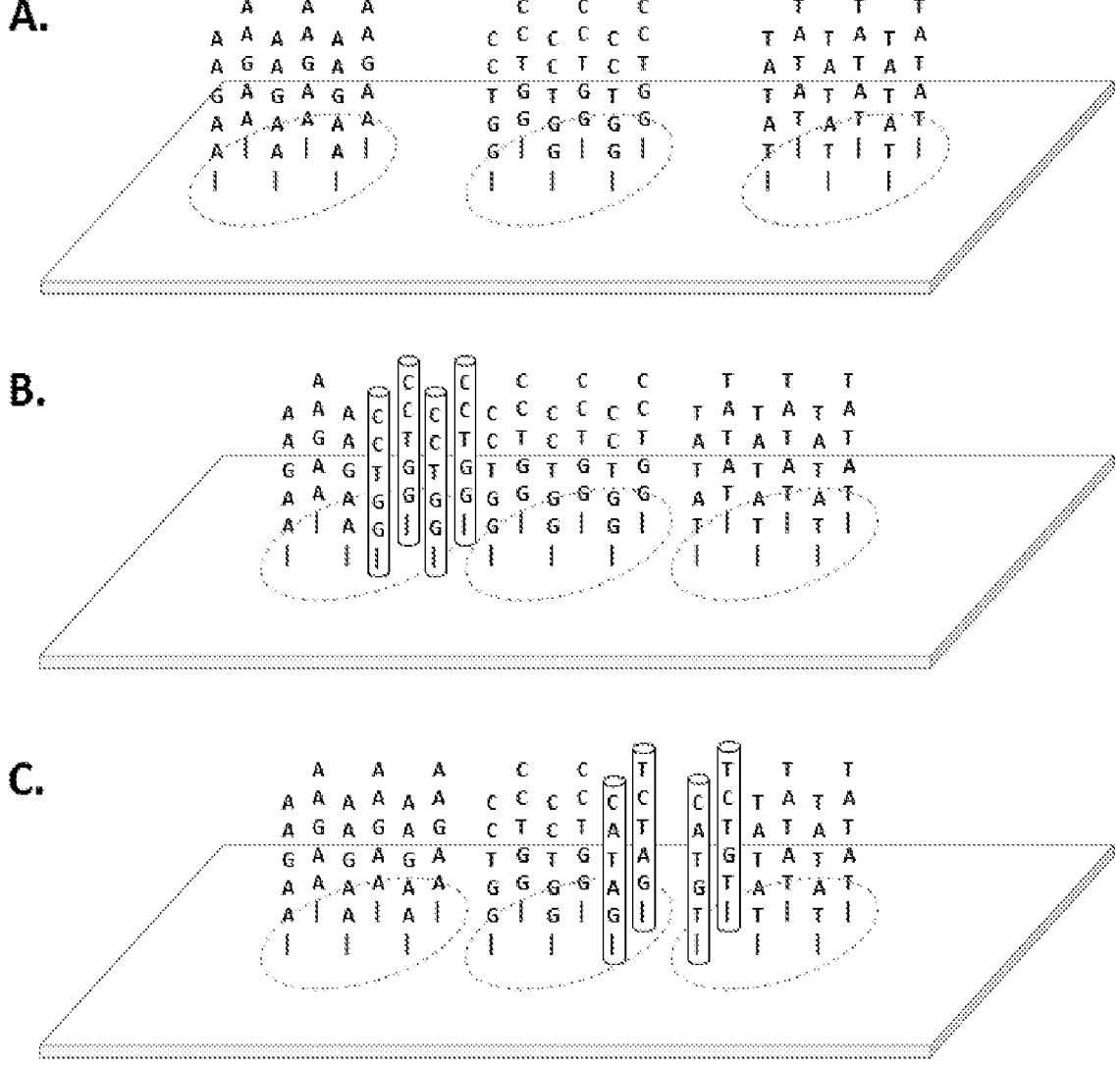

FIG. 2 is a schematic drawing of a microarray to illustrate the problems of cross-talk, feature creep, and sequence shuffling. A microarray comprising three features is depicted, each feature comprising multiple copies of a distinct 5-mer DNA oligonucleotide (the same arrangement is shown in FIG. 1, Panel B). As feature density is increased by reducing the gap between features (compare Panel A with Panels B and C) the risk of cross-talk increases. In Panel B, heteropolymers that were specified for the center feature intrude into the area intended for the feature at the left. The errant heteropolymers (indicated by cylinders) retain their original sequence and function, but are located within an incorrect feature. Accordingly, signals produced by these errant heteropolymers when the microarray is used in an assay could be interpreted to originate from the left-most feature and result in a false positive. This type of cross-talk is more frequently associated with microarrays produced by present mechanical spotting technologies using pre-synthesized molecules and can be referred to as "feature-creep". Panel C depicts the effect of cross-talk on heteropolymers manufactured using in situ microarray synthesis methods. In this example, as individual monomers are incorporated sequentially into growing heteropolymers, the monomers specified for incorporation into molecules of the center feature are instead incorporated into molecules of the right-most feature, and vice-versa, resulting in sequence errors and an overall degradation of polymer and/or heteropolymer sequence quality. The resulting heteropolymers (indicated by cylinders) comprise a sequence that is different from the sequence intended for either the center or the right feature. Accordingly, signals produced by these errant heteropolymers when the microarray is used in an assay can produce a false negative signal or a gain-of-function false positive signal. This type of cross-talk can be referred to as "sequence-shuffling".

Figure 3:
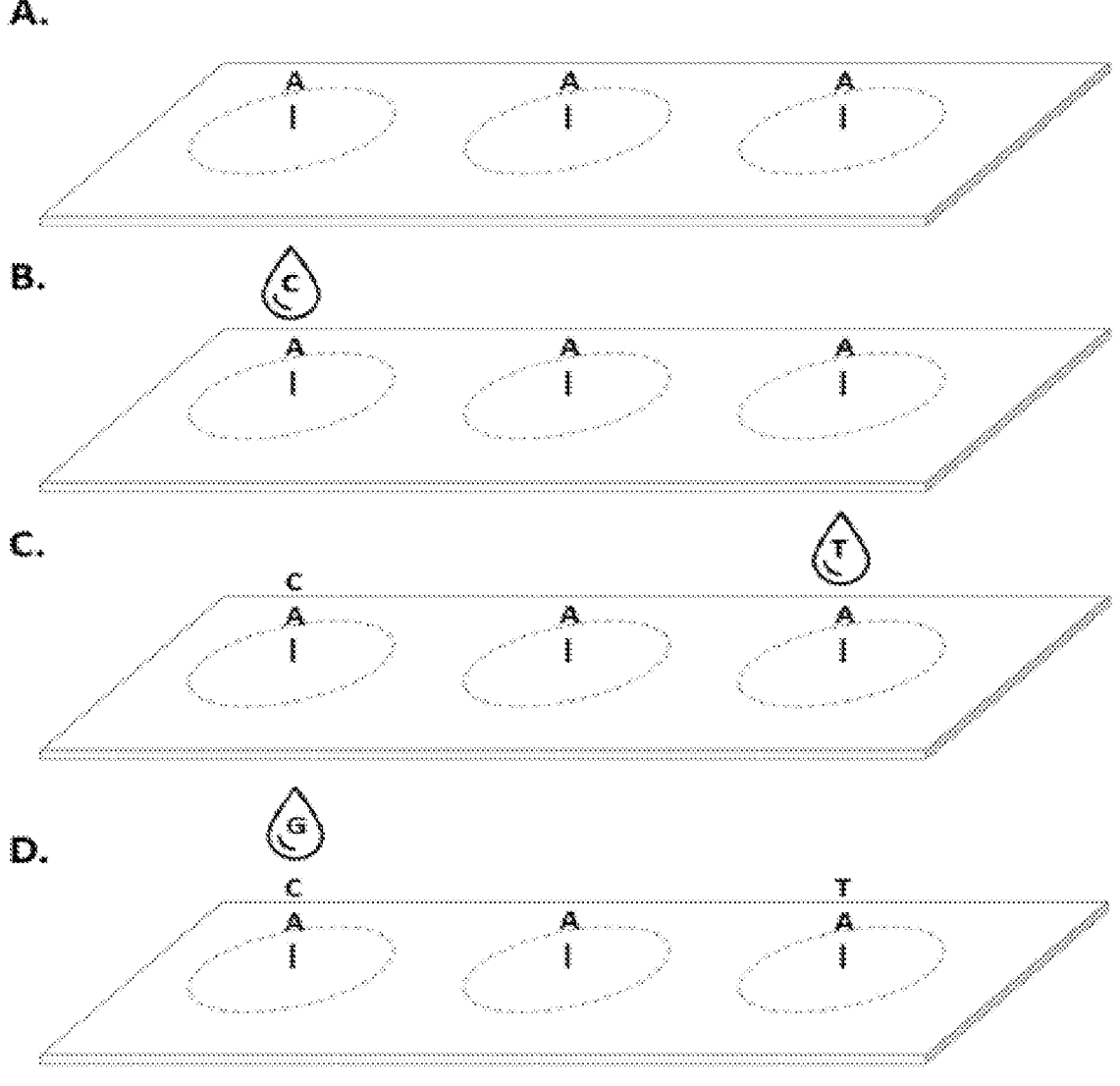

FIG. 3 is a schematic drawing illustrating in situ synthesis of polymers (e.g., heteropolymers) on a microarray using a conventional ink-jet technology. A microarray comprising three features is depicted, with one polymer and/or heteropolymer (e.g., a DNA oligonucleotide in this example) shown per feature for simplicity. In Panel A, each DNA oligonucleotide begins as a single anchored adenine monomer [A] after the first synthesis cycle. Each anchored monomer is capable of bonding with the next DNA monomer it contacts, so sequence specification in the growing oligonucleotide is accomplished by delivering the next DNA monomer only to those features where it is desired to be incorporated using modified ink-jet printing technology. In Panel B, a droplet comprising cytosine monomers [C] is delivered only to the left-most feature for incorporation in the second synthesis cycle. In Panel C, a droplet comprising thymine monomers [T] is delivered only to the right-most feature for incorporation in the third synthesis cycle. In Panel D, a droplet comprising guanine monomers [G] is delivered only to the left-most feature in the fourth synthesis cycle. Washing and other steps occur between each cycle of monomer incorporation (not shown). The process is repeated until synthesis is completed for all DNA oligonucleotides on the microarray.

Figure 4:
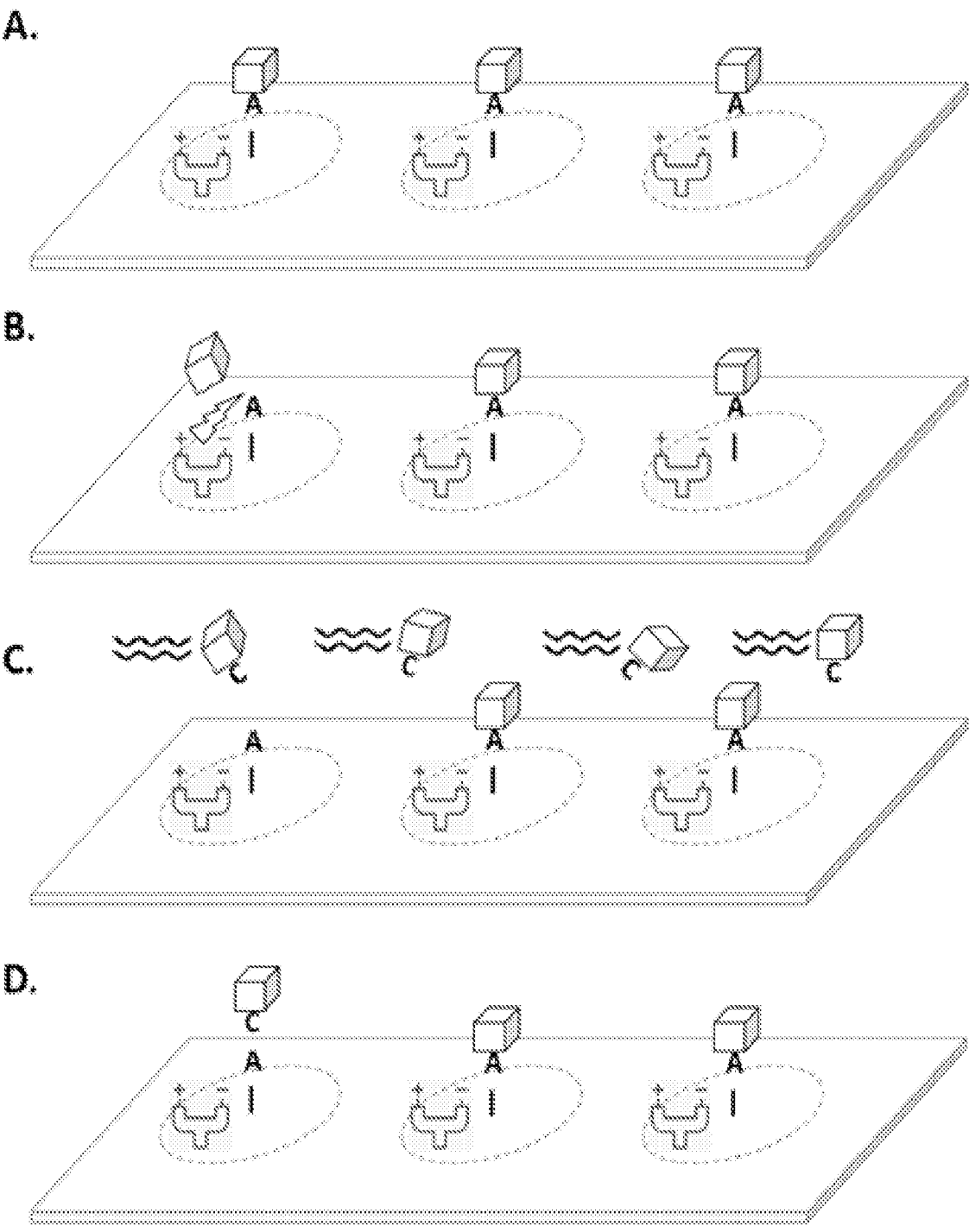

FIG. 4 is a schematic drawing illustrating in situ synthesis of polymers (e.g., heteropolymers) on a microarray using a conventional electrochemical technology. A microarray comprising three features is depicted, with one polymer and/or heteropolymer (e.g., a DNA oligonucleotide in this example) shown per feature for simplicity. In electrochemical synthesis of microarray heteropolymers, the substrate/support is a microchip and each feature area comprises an individually addressable microelectrode. In Panel A, each DNA oligonucleotide begins as a single anchored adenine monomer [A] capped by a protecting group (represented by cubes in the figure) that prevents the monomers from bonding with introduced monomers until the protecting group is removed. Activation of a microelectrode (Panel B, left-most feature) causes acidification of the buffer in the local volume immediately surrounding the electrode, which cleaves off proton-sensitive protecting groups near the electrode and activates the underlying nascent oligonucleotide for bonding with the next monomer encountered. In Panel C, cytosine monomers [C] capped by their own protecting groups are distributed over the entire surface of the substrate, but the cytosine monomers are incorporated only in features where electrochemical de-protection occurred (result shown in Panel D). Washing and other steps occur between each cycle of monomer incorporation (not shown). The process is repeated until synthesis is completed for all DNA oligonucleotides on the microarray.

Figure 5:
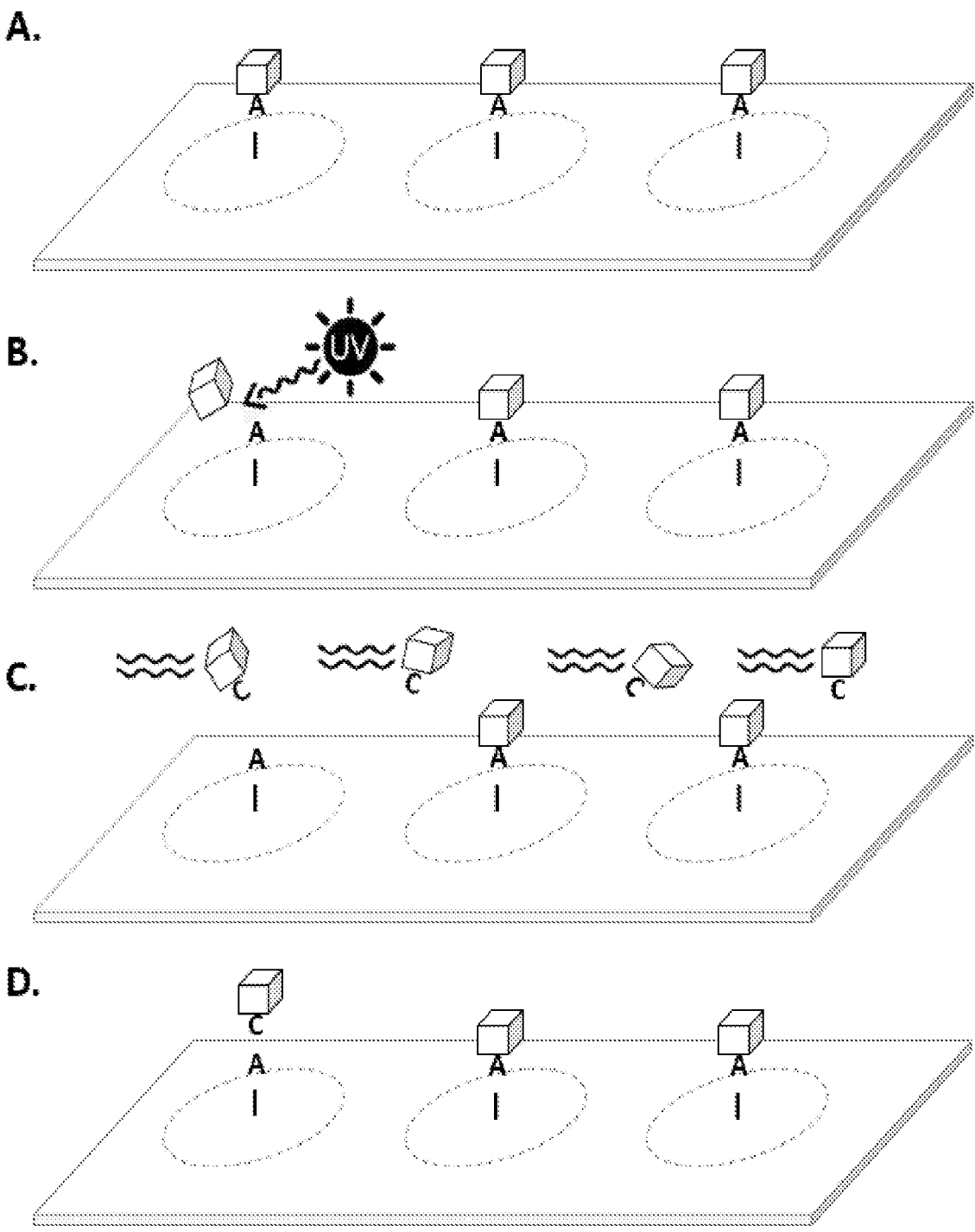

FIG. 5 is a schematic drawing showing in situ synthesis of polymers (e.g., heteropolymers) on a microarray using a conventional photolithographic technology. The photolithographic method is similar to the electrochemical method depicted in FIG. 4 in terms of using selective de-protection to control the synthesis of specified polymer and/or heteropolymer sequences on the microarray, but photolithographic methods instead use focused ultraviolet light to cleave photolabile protecting groups and thus enable polymer and/or heteropolymer extension.

Figure 6:
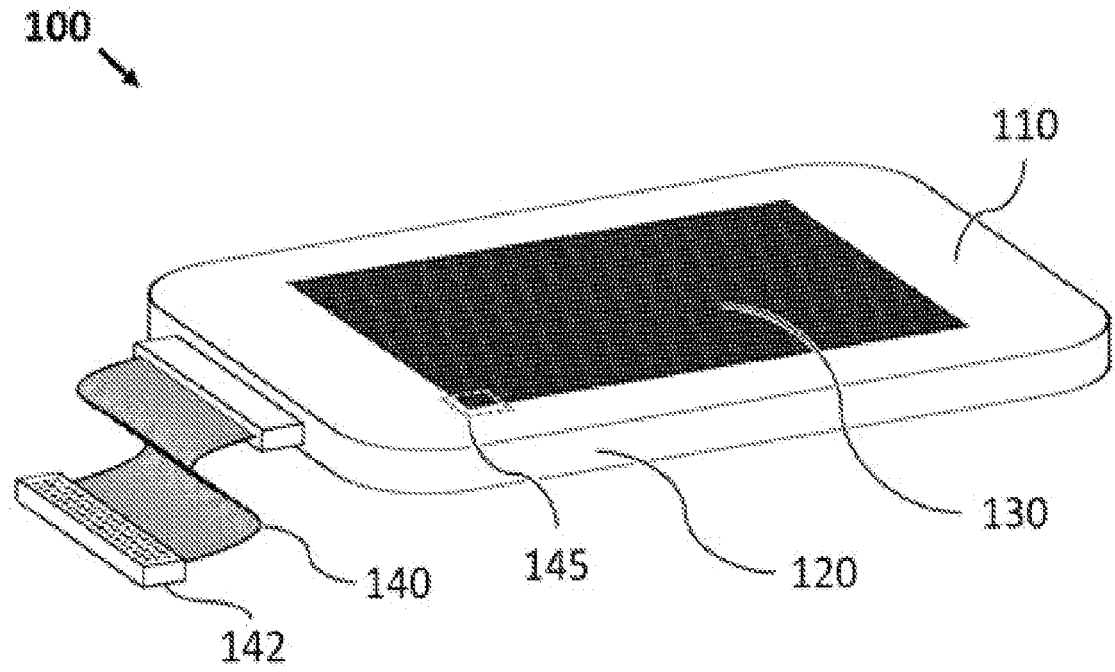

FIG. 6 is a schematic drawing of a micro-LED array (e.g., comprising a protective enclosure, data cable, and connector) that finds use in embodiments of the present technology.

Figure 7:
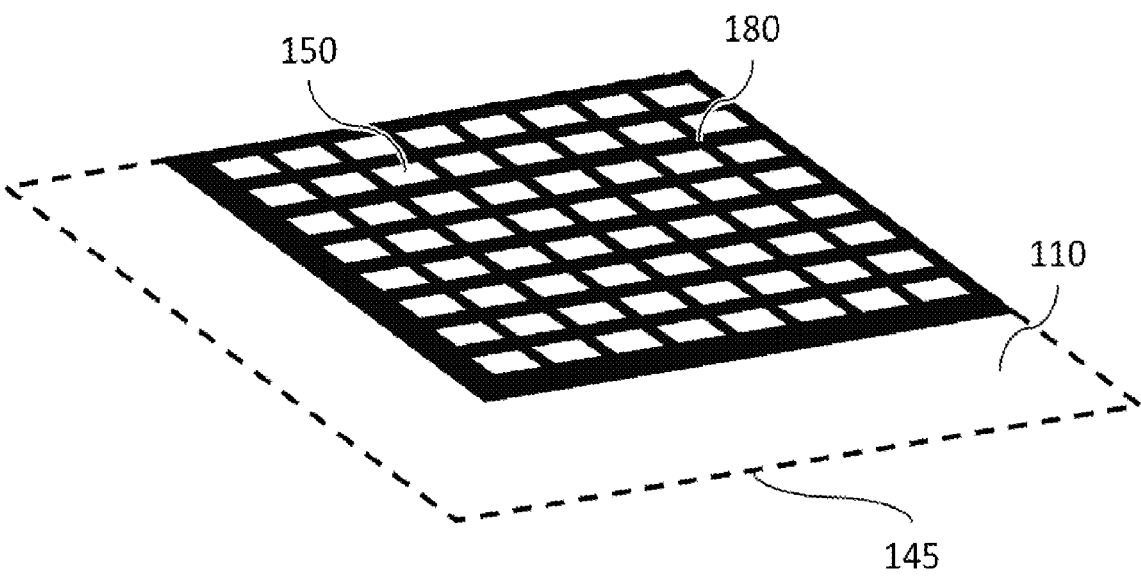

FIG. 7 shows a magnified view of a portion of the light-emitting surface of the micro-LED array shown in FIG. 6, revealing the distribution of individual pixels.

Figure 8:
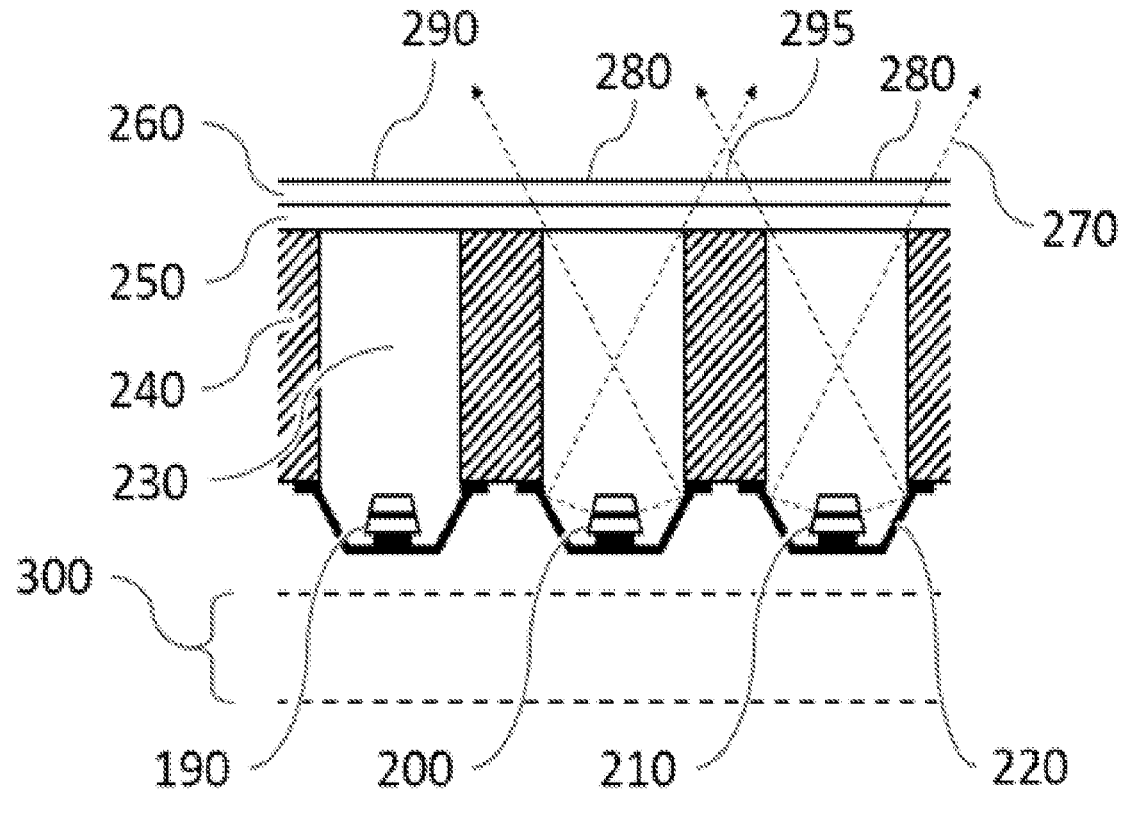

FIG. 8 shows an illustrative, magnified, cross-sectional view through a portion of the micro-LED array of FIG. 6, highlighting the major surface and sub-surface elements of three adjacent micro-LED light-emitting units.

Figure 9:
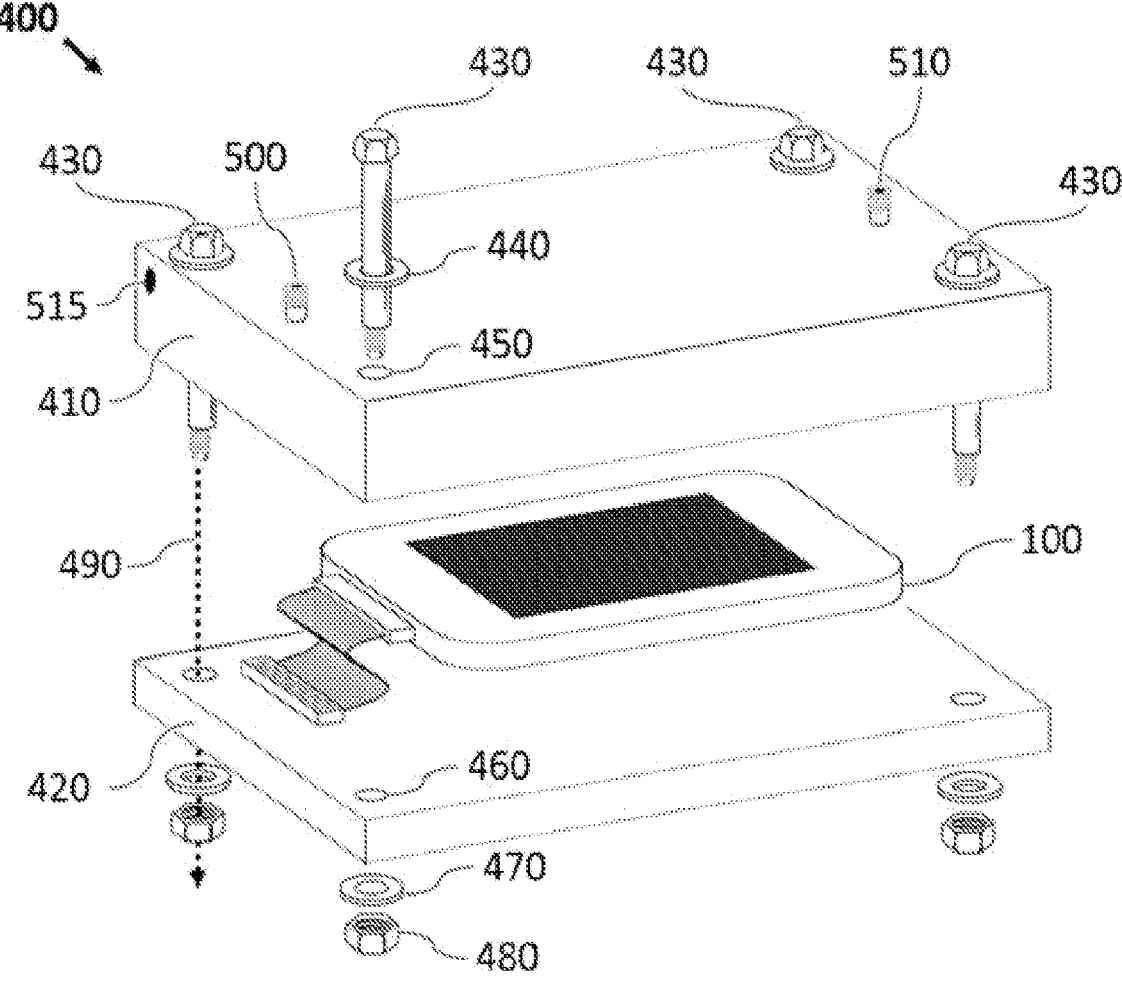

FIG. 9 is a schematic view of an embodiment of a flow-cell assembly that encloses the light-emitting surface of the micro-LED array of FIG. 6 to provide a chemical reaction chamber (e.g., comprising inlet and outlet ports to deliver liquid reagents to and from the chamber) for in situ synthesis of heteropolymers as described herein.

Figure 10:
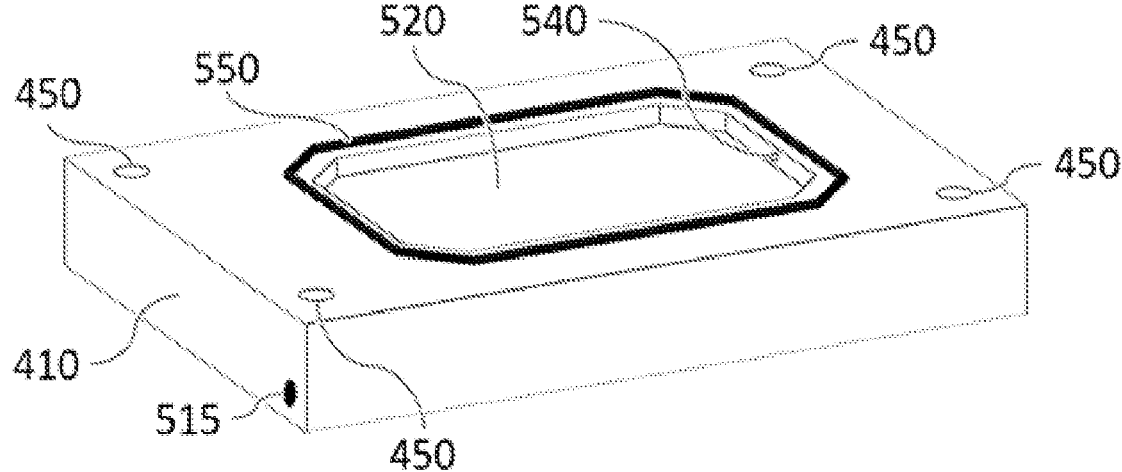

FIG. 10 is an inverted view of the upper part of the flow-cell apparatus shown in FIG. 9 indicating a cavity that provides the reaction chamber around the light-emitting surface of the micro-LED array and the gasket that provides a leak-proof seal around it.

Figure 11:
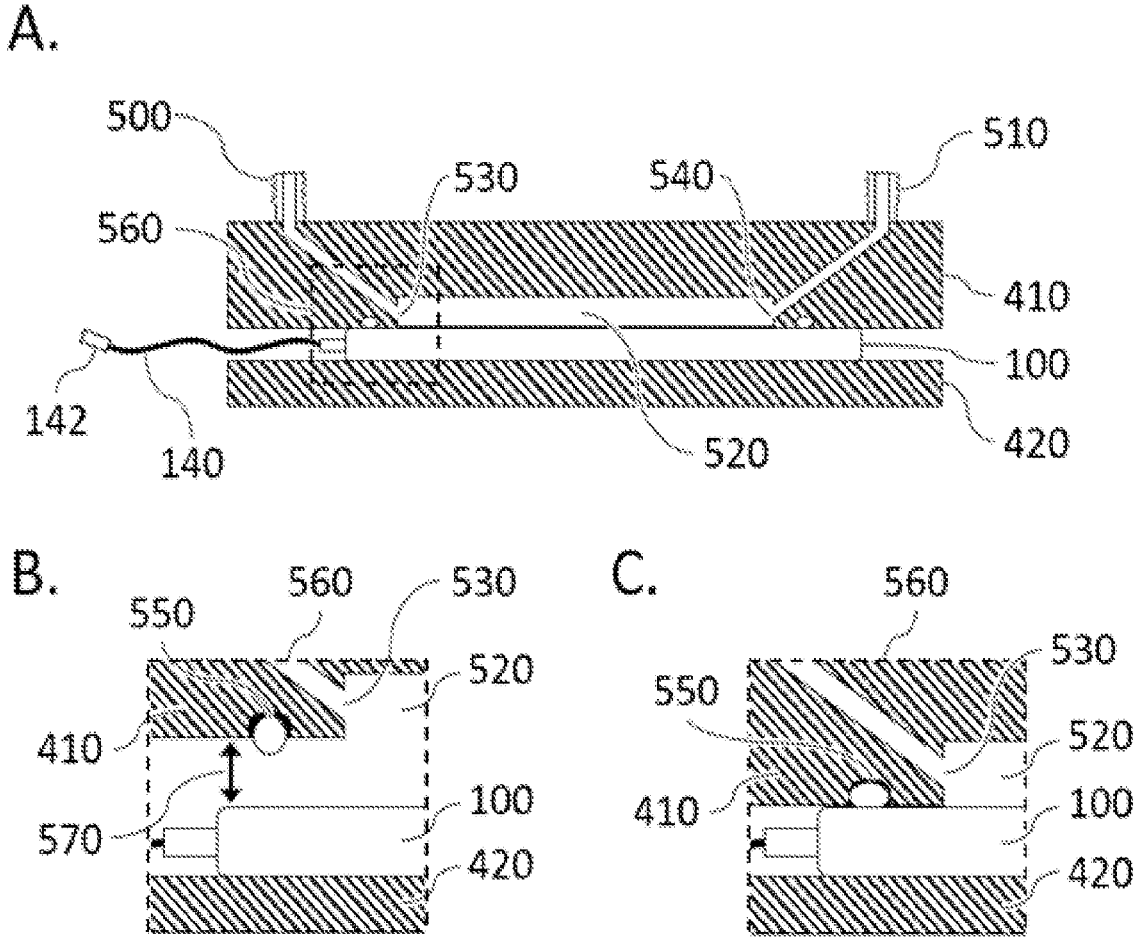

FIG. 11 is a cross-sectional view through the long axis of the flow-cell assembly of FIG. 9, showing (Panel A) the relationship of the micro-LED array to the reaction chamber and the reagent inlet and outlet channels in the assembled state and (Panels B and C) a magnified view illustrating the structure and function of the gasket.

Figure 12:
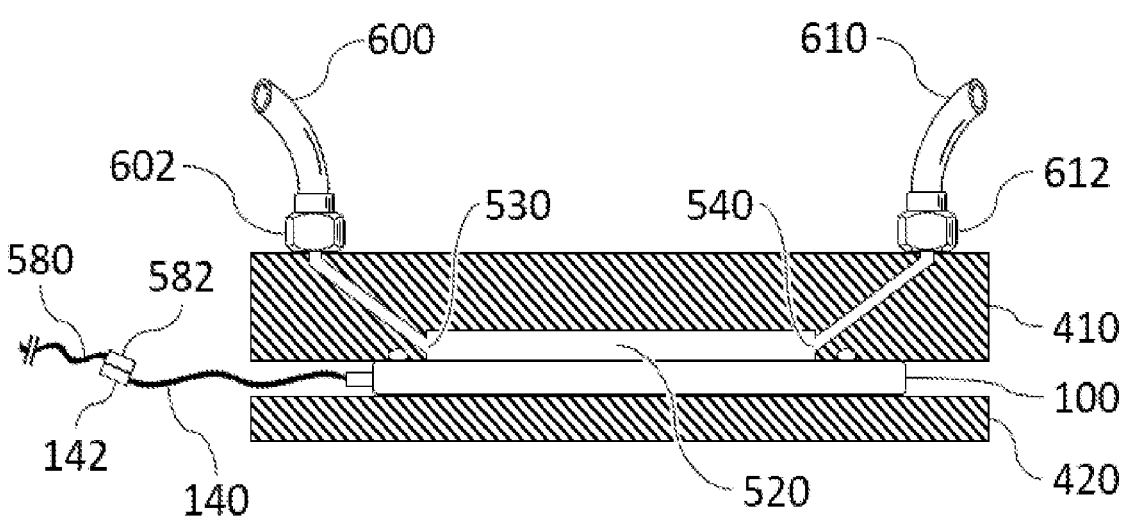

FIG. 12 is a cross-sectional view through the long axis of the flow-cell assembly of FIG. 9, showing the connection of tubes to convey liquid reagents to and from the flow-cell assembly, and the connection of a data cable to provide control of the micro-LED array by a computer according to embodiments described herein.

Figure 13:
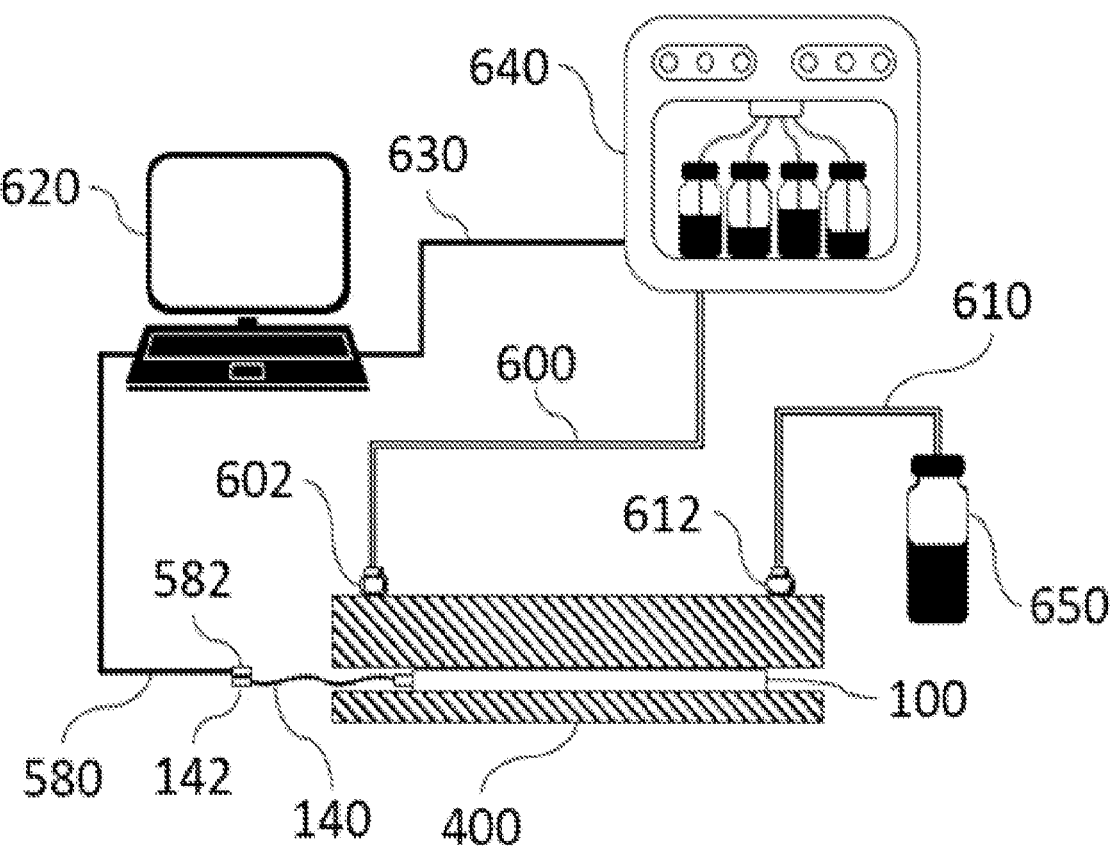

FIG. 13 is a schematic overview of an embodiment of a polymer and/or heteropolymer microarray synthesis system comprising a flow-cell assembly comprising an attached micro-LED array, a liquid reagent handling system, a waste collection vessel, a control computer, and connections between system components.

Figure 14:
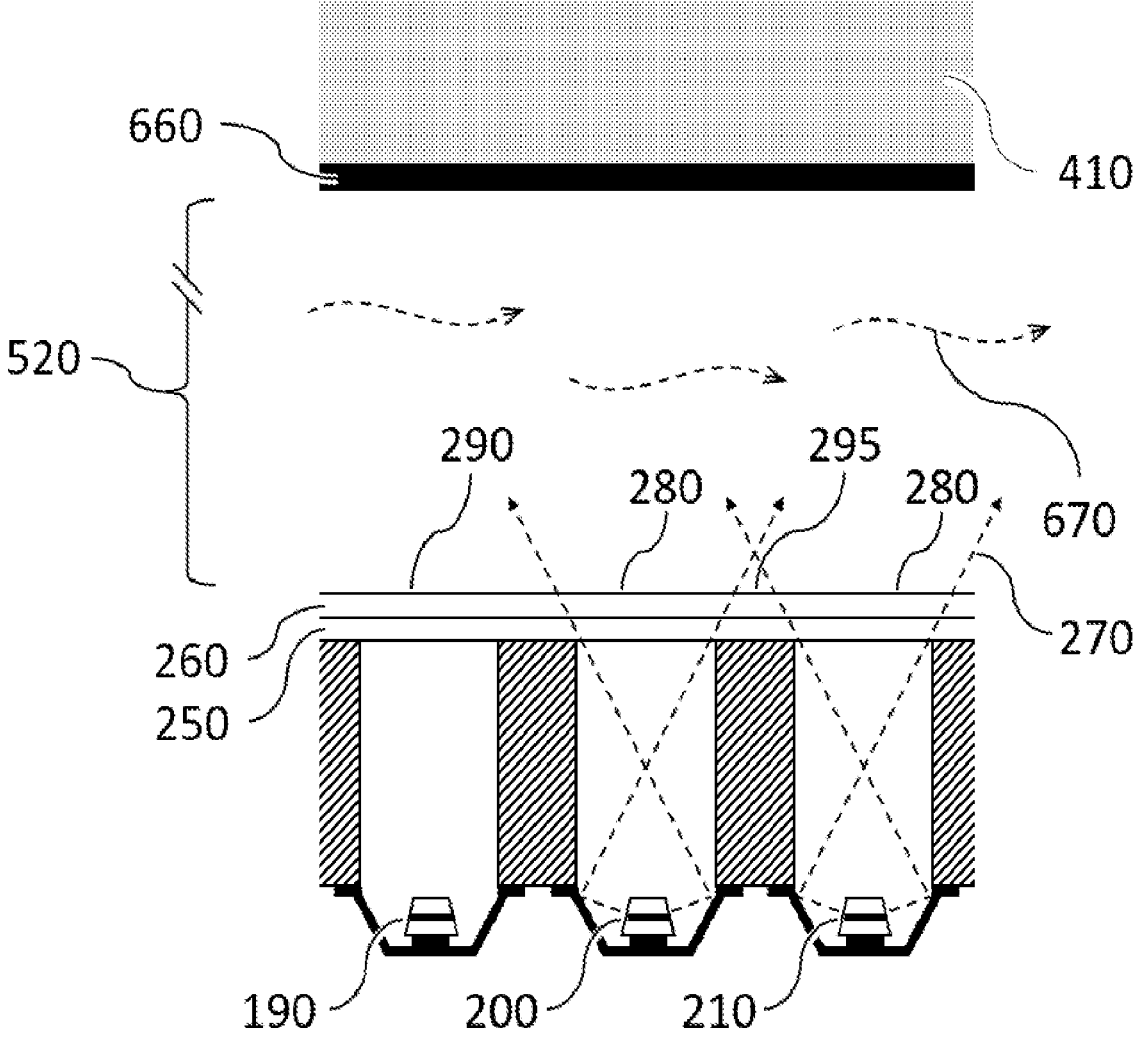

FIG. 14 is an illustrative, magnified, cross-sectional view through a portion of a micro-LED array similar to the micro-LED array shown in FIG. 8 and showing the opposing wall of the reagent chamber space created by combining the micro-LED array with the flow-cell assembly.

Figure 15:
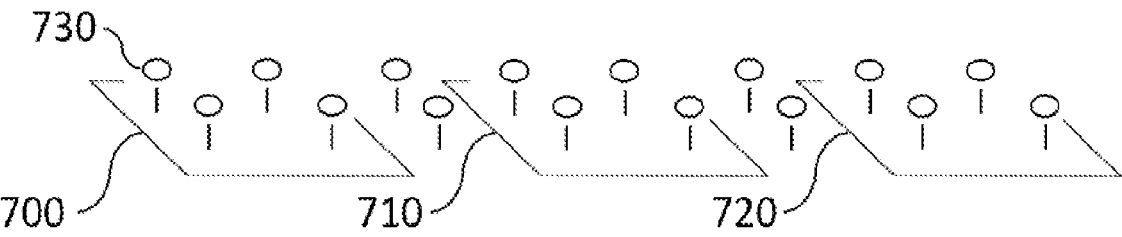
Figure 16:
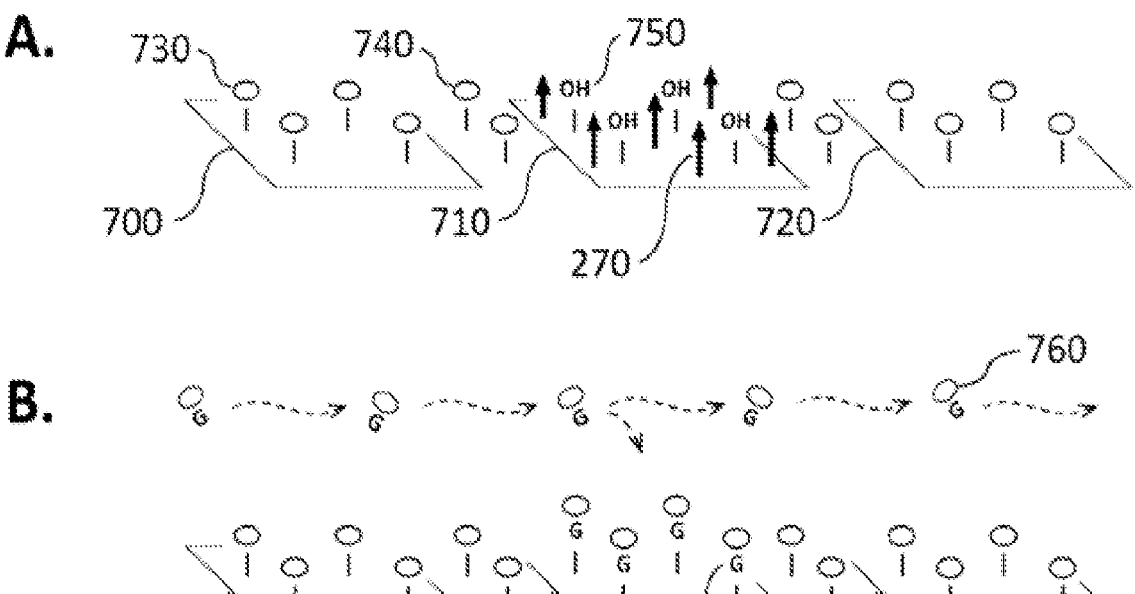
Figure 17:
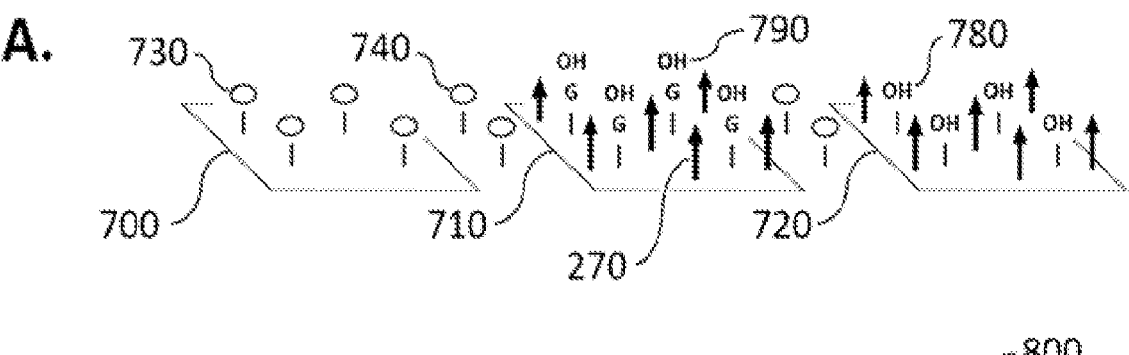
Figure 17:
Figure 17:
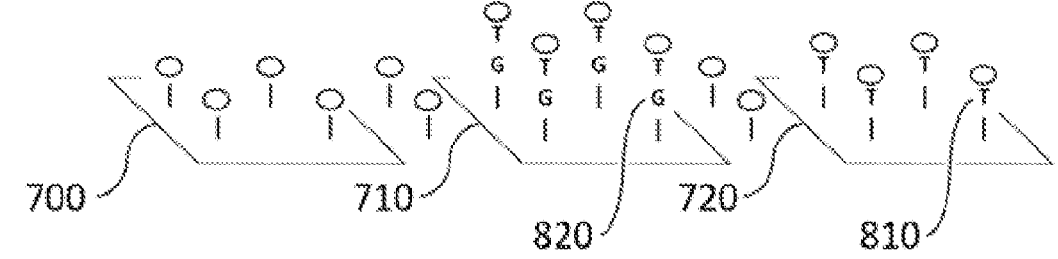

In some embodiments, methods comprise steps for synthesizing one or more DNA oligonucleotides on a microarray, e.g., as shown in FIGS. 15-17. While the embodiment depicted in FIGS. 15-17 illustrates the synthesis of an oligonucleotide comprising a specific sequence (e.g., comprising guanine and thymine as shown in FIGS. 15-17 and described below), the technology is not limited to the particular nucleotides and nucleotide sequences as shown in FIGS. 15-17 and described below and includes embodiments for producing oligonucleotides comprising any natural nucleotides (e.g., A, C, G, and/or T) and/or any nonnatural nucleotides.

FIG. 15 is an illustration of 5'-blocked DNA synthesis linkers on a functionalized surface of a micro-LED array, e.g., that finds use in synthesizing DNA oligonucleotides according to embodiments of the technology provided herein.

FIG. 16 is an illustration of a method for (Panel A) selectively photo-deprotecting hydroxyl (—OH) groups on DNA synthesis linkers on the surface of a micro-LED array and (Panel B) coupling pre-blocked guanine nucleotides to the free —OH groups to initiate in situ synthesis of DNA oligonucleotides according to embodiments of the technology provided herein.

FIG. 17 is an illustration of a method for (Panel A) selectively photo-deprotecting hydroxyl (—OH) groups on the functionalized surface of a micro-LED array and/or on previously incorporated guanine nucleotides before (Panel B) coupling pre-blocked thymine nucleotides to the free —OH groups according to embodiments of the technology provided herein.

Figure 18:
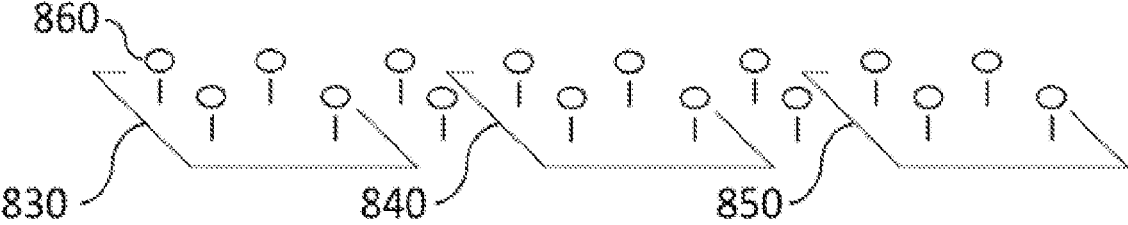
Figure 19:
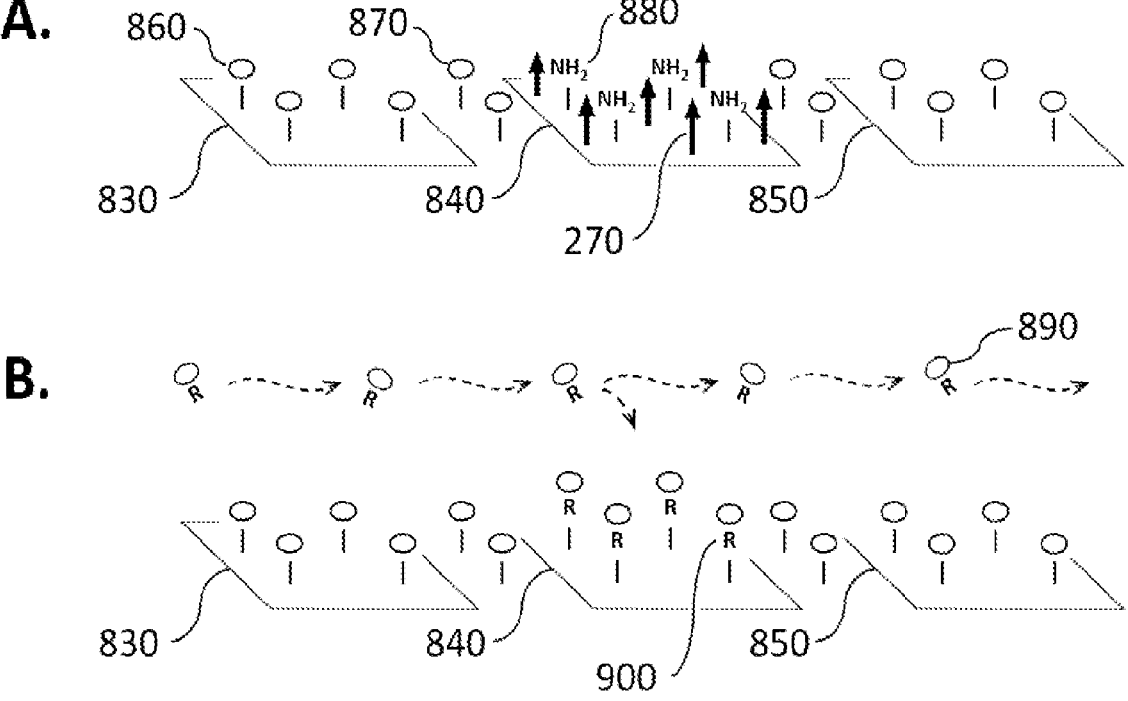
Figure 20:
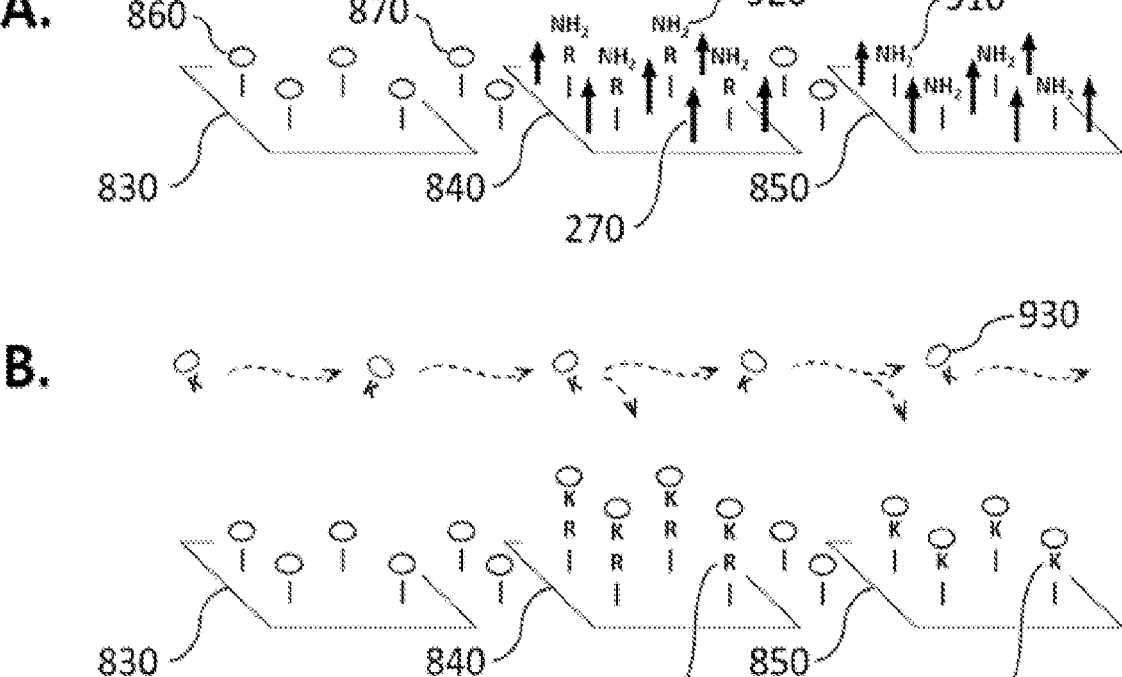

In some embodiments, methods comprise steps for synthesizing one or more oligopeptides on a microarray, e.g., as shown in FIGS. 18-20. While the embodiment depicted in FIGS. 18-20 illustrates the synthesis of an oligopeptide comprising a specific sequence (e.g., comprising arginine and lysine as shown in FIGS. 18-20 and described below), the technology is not limited to the particular amino acids and amino acid sequences as shown in FIGS. 18-20 and described below and includes embodiments for producing oligopeptides comprising any natural amino acids and/or any non-natural amino acids.

FIG. 18 is an illustration of $NH_2$-blocked peptide synthesis linkers on the functionalized surface of a micro-LED array, e.g., that finds use in synthesizing oligopeptides according to embodiments of the technology provided herein.

FIG. 19 is an illustration of a method for (Panel A) selectively photo-deprotecting amine (—$NH_2$) groups on peptide synthesis linkers on the surface of a micro-LED array and (Panel B) coupling pre-blocked arginine amino acids to the free —$NH_2$ groups to initiate in situ synthesis of oligopeptides according to embodiments of the technology provided herein.

FIG. 20 is an illustration of a method for (Panel A) selectively photo-deprotecting amine (—$NH_2$) groups on the functionalized surface of a micro-LED array and on previously incorporated arginine amino acids before (Panel B) coupling pre-blocked lysine amino acids to the free —$NH_2$ groups according to embodiments of the technology provided herein.

Figure 21:
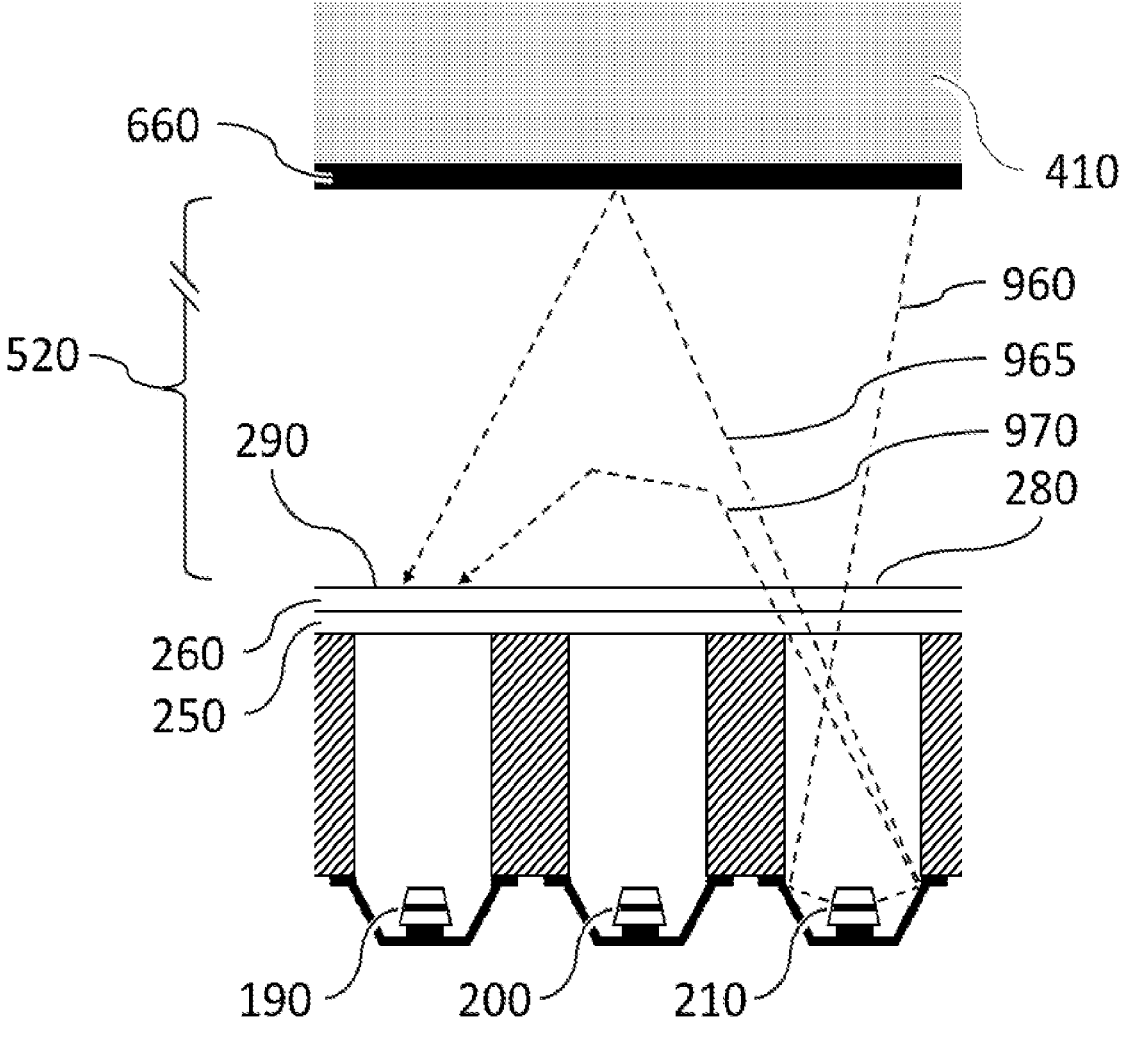

FIG. 21 is an illustrative, magnified, cross-sectional view through a portion of an embodiment of a micro-LED array (see, e.g., FIG. 14) showing potential sources of stray light in the system.

Figure 22:
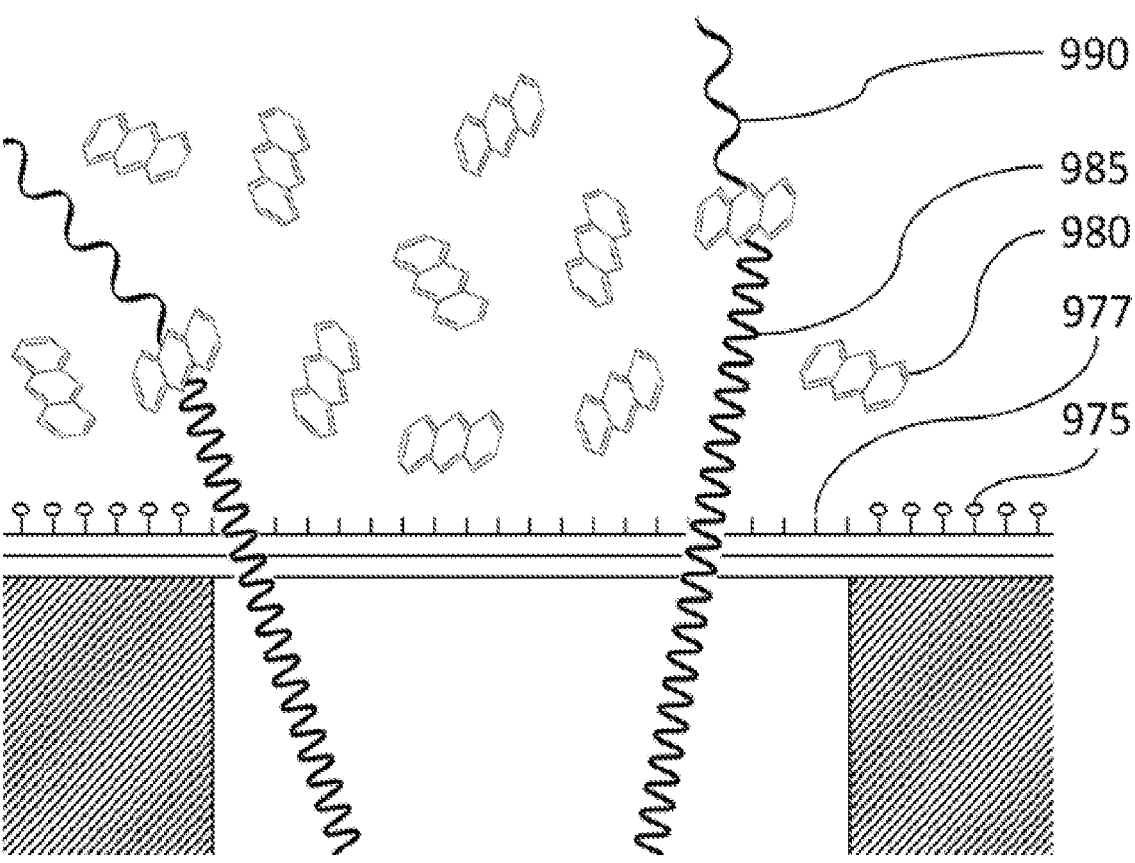

FIG. 22 is an illustration of an embodiment of the technology provided herein comprising minimizing and/or eliminating stray light that could decrease polymer and/or heteropolymer quality.

Figure 23A:
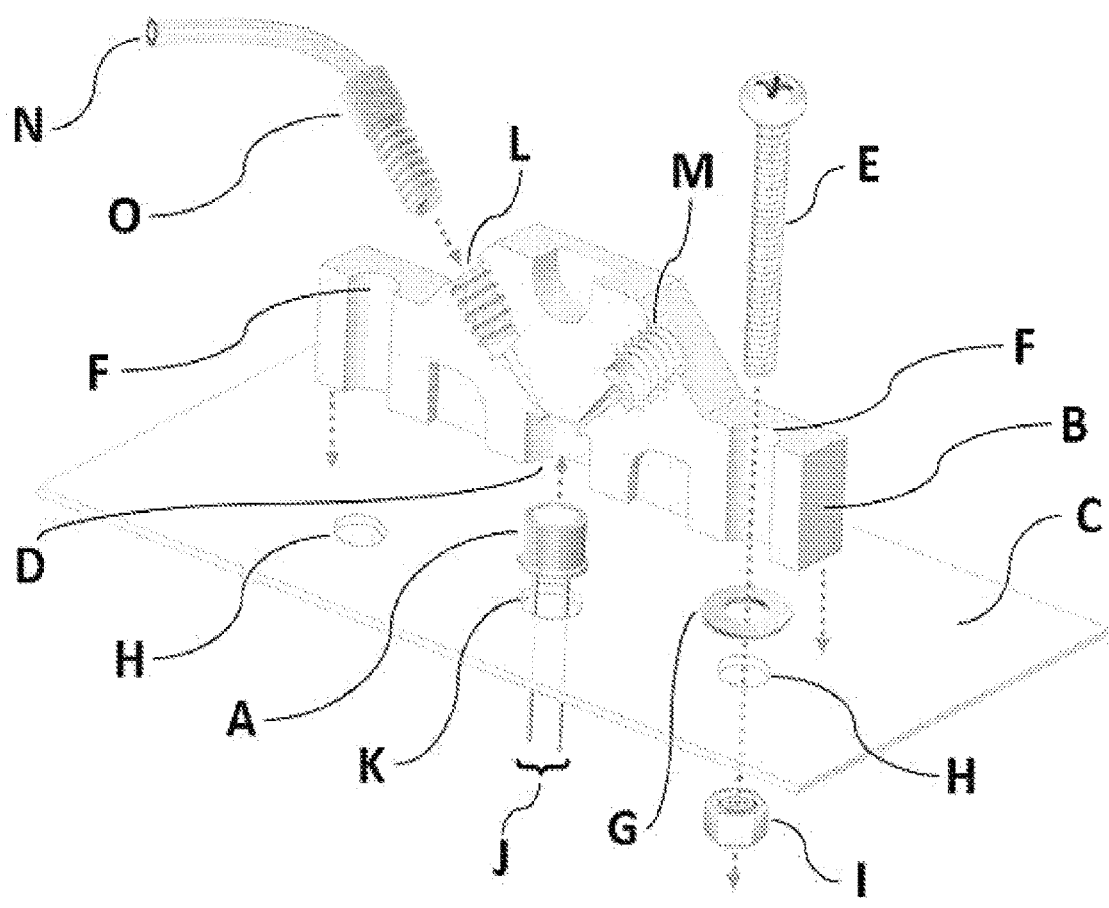

FIG. 23A is a drawing of a custom-designed, reusable, flow-cell for photochemical synthesis of polymers on the surface of LEDs.

Figure 23B:
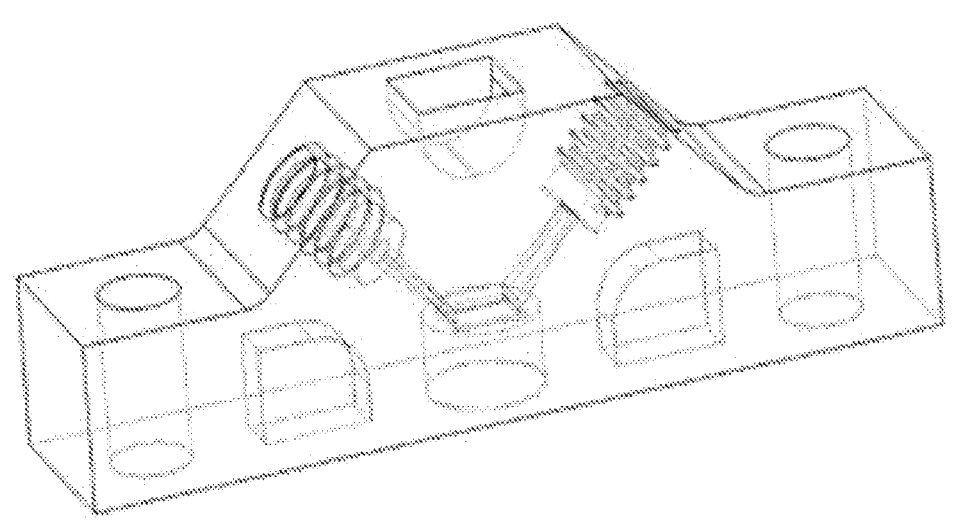

FIG. 23B is a transparent schematic drawing of the full flow-cell.

Figure 23C:
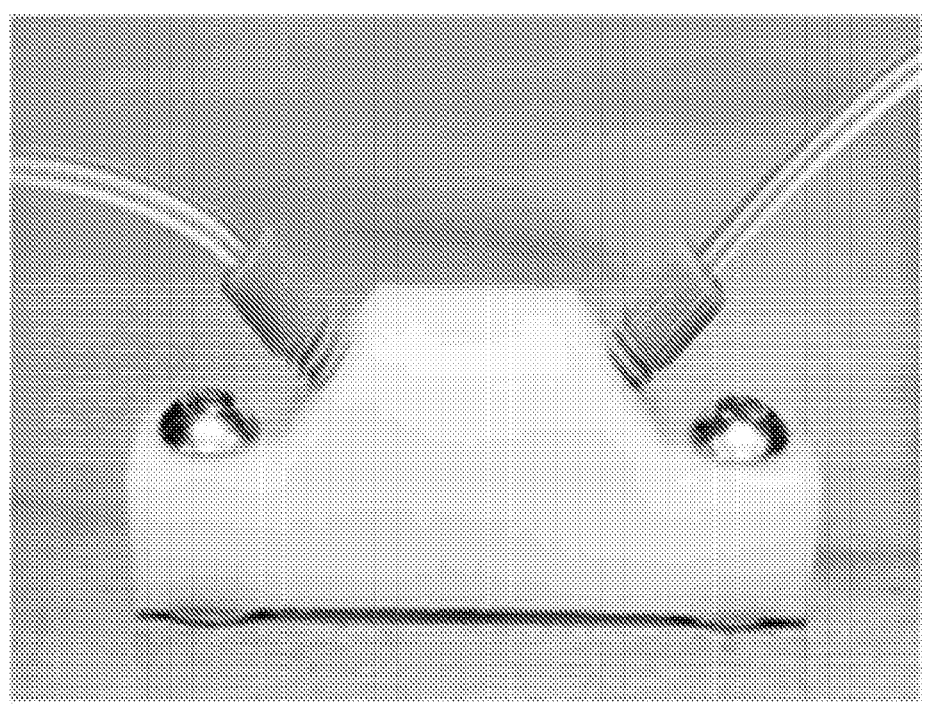

FIG. 23C shows a photograph of the flow-cell attached to the aluminum plate and input/output tubing.

Figure 24:
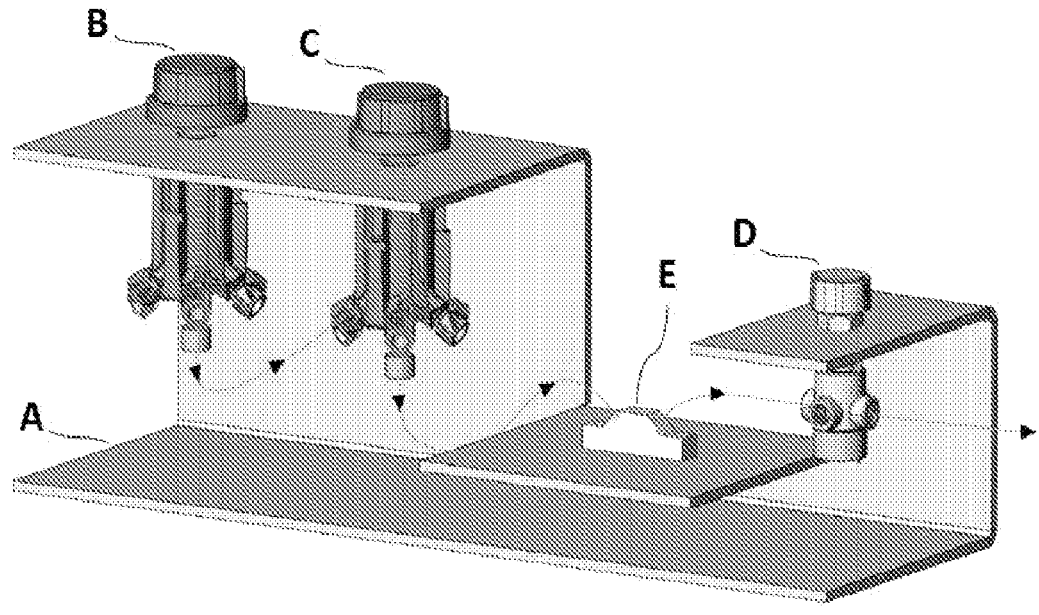

FIG. 24 is a schematic drawing of an experimental apparatus assembled to hold the flow-cell and switching valves capable of directing precise amounts of synthesis reagents from multiple holding reservoirs sequentially to the reaction chamber of the flow-cell.

Figure 25:
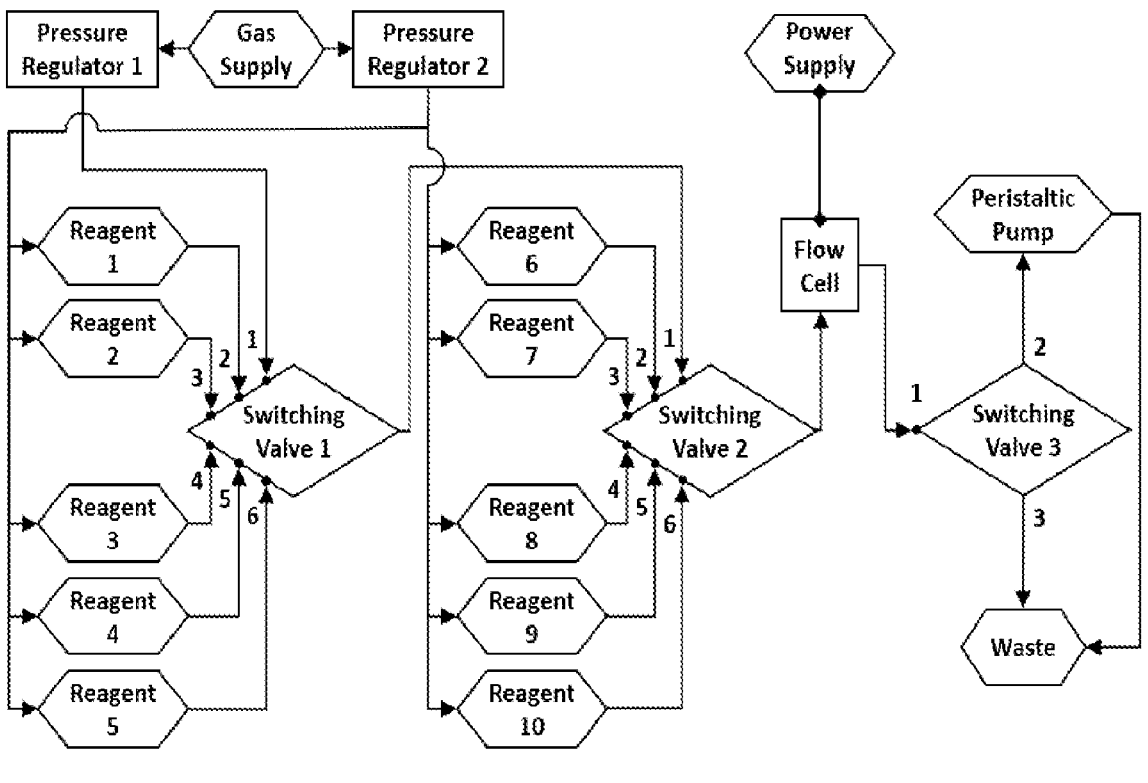

FIG. 25 is a flow chart depicting the connections among components of the experimental apparatus.

Figure 26A:
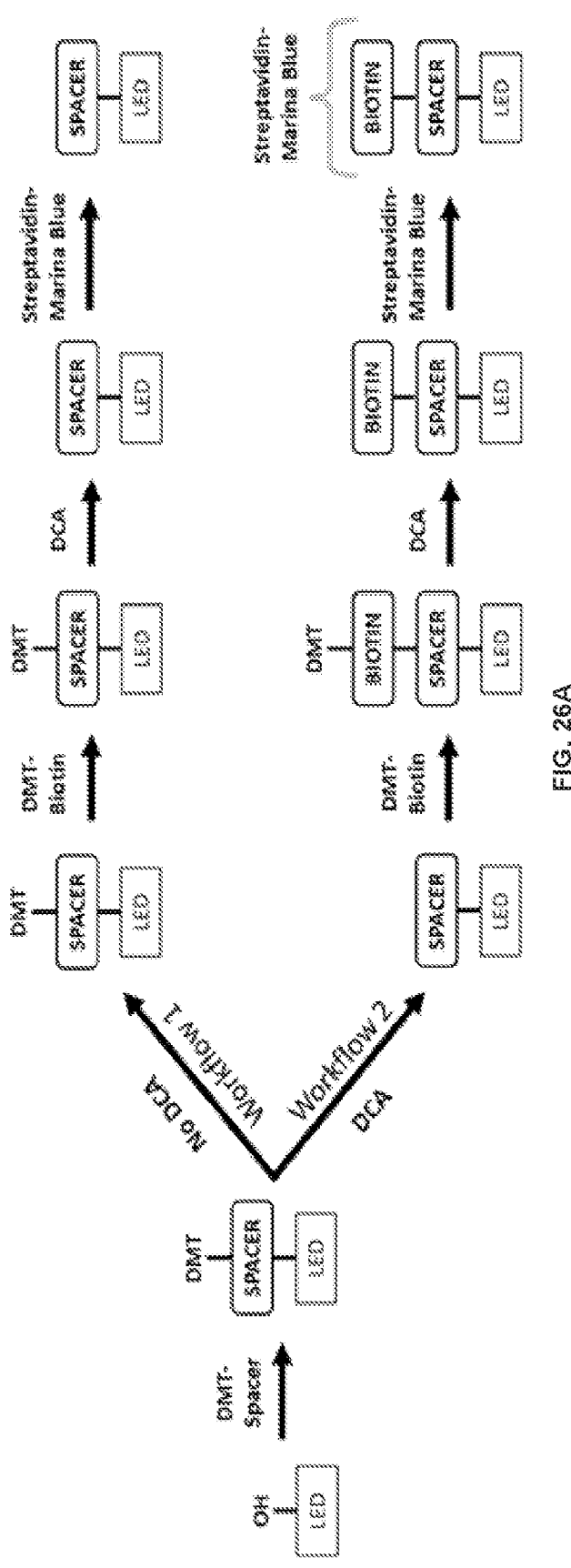

FIG. 26A shows a workflow used in Experiment 1 described in the Examples for testing of the experimental apparatus to synthesize a simple heteropolymer on the surface of an LED using a chemical deprotection method.

Figure 26B:
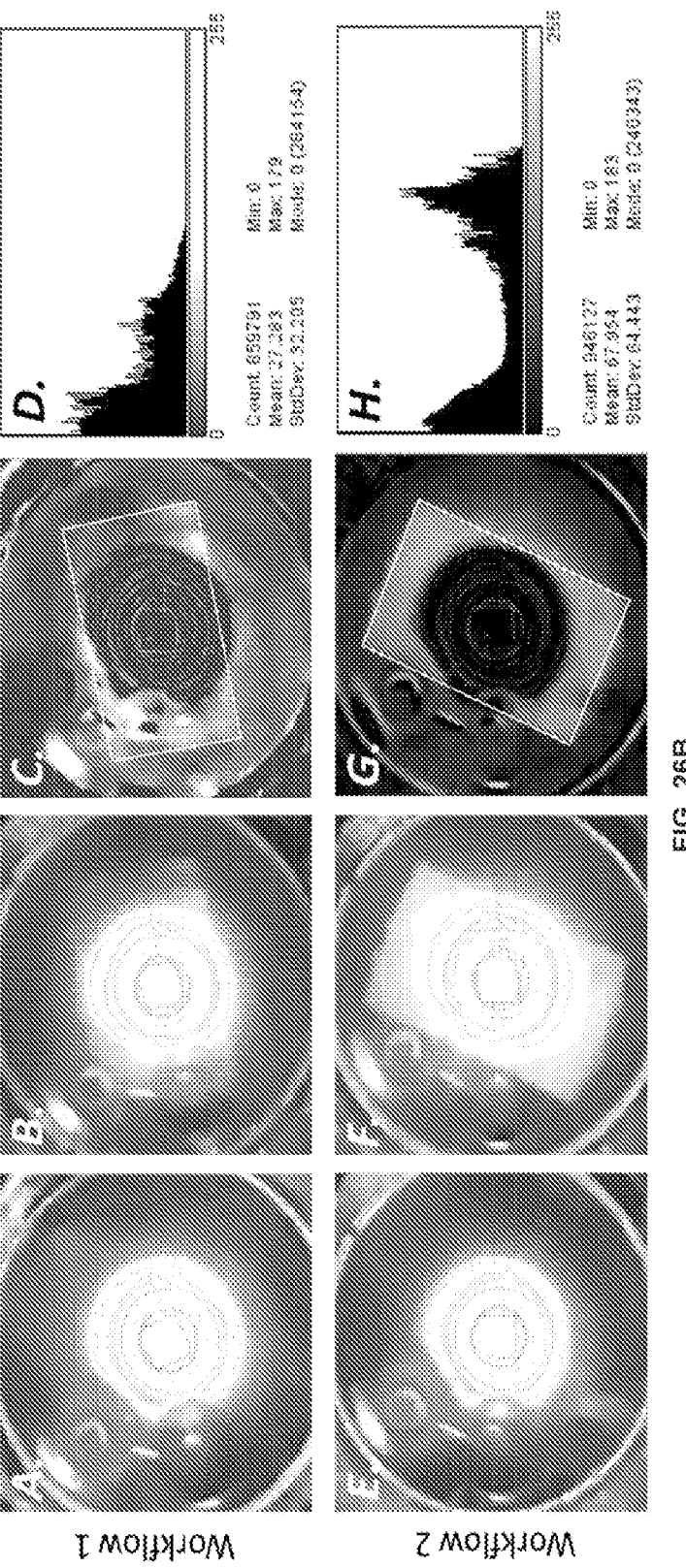

FIG. 26B shows results from Experiment 1 described in the Examples.

Figure 27A:
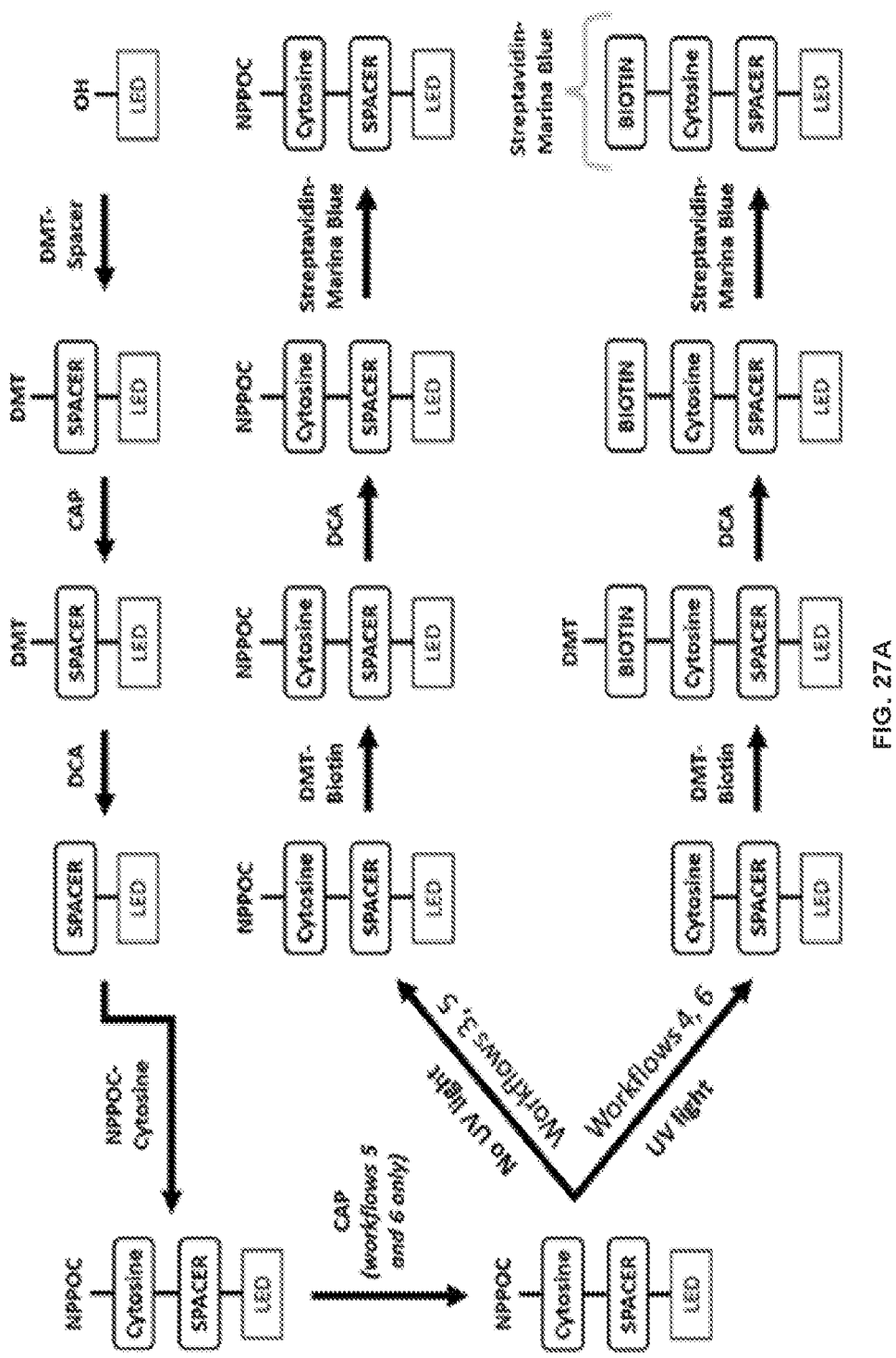

FIG. 27A shows a workflow used in Experiment 2 described in the Examples for testing the synthesis of a heteropolymer on the surface of an LED using light emitted from the same LED to control the removal of photolabile protecting groups during synthesis.

Figure 27B:
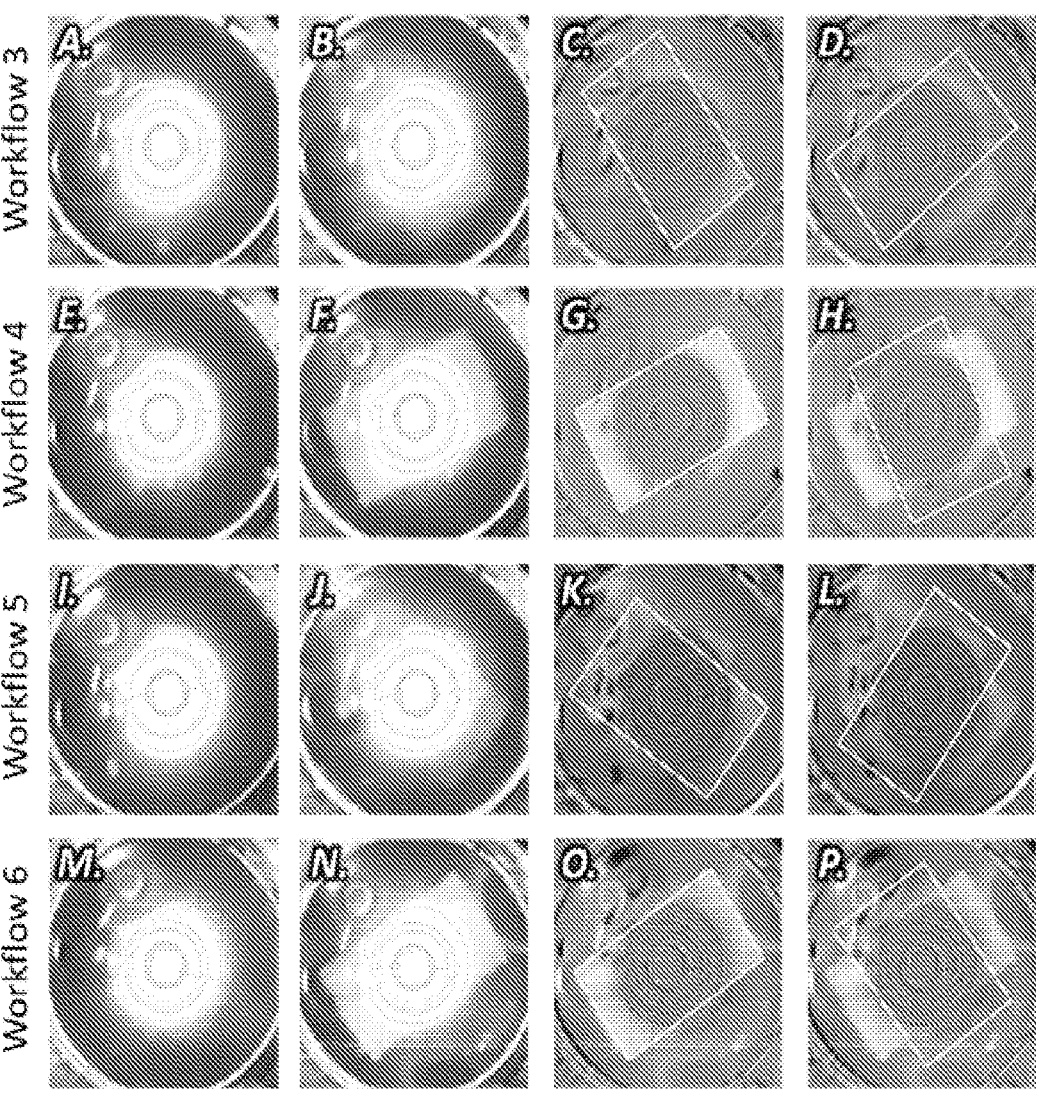

FIG. 27B shows results from Experiment 2 described in the Examples.

Figure 28A:
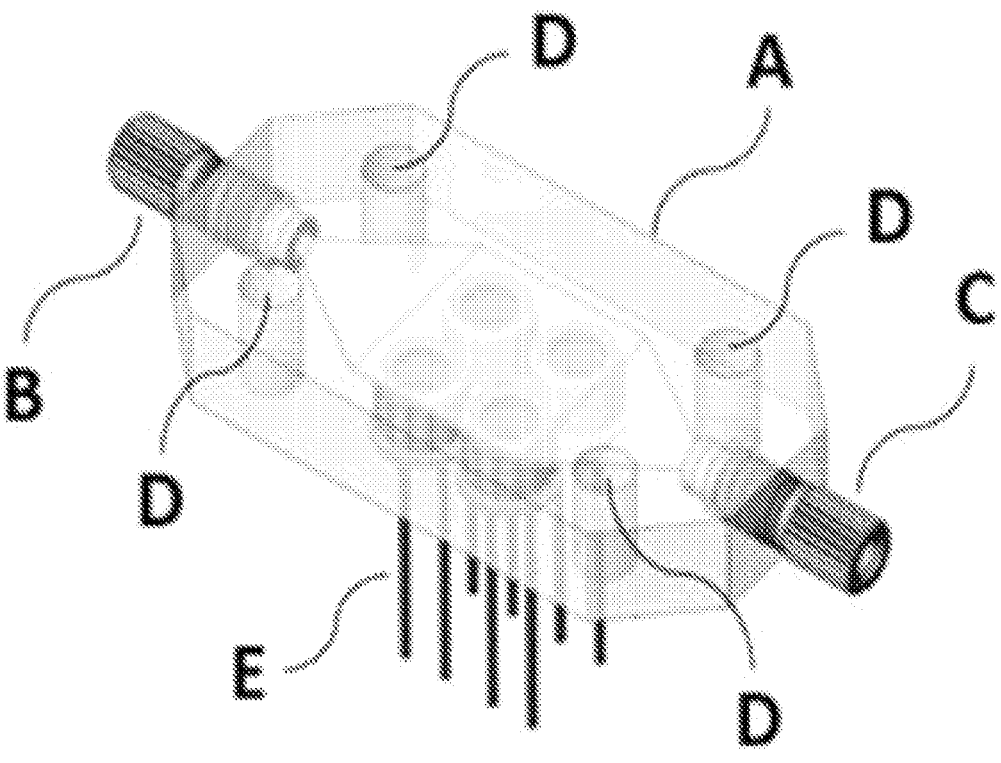
Figure 28B:
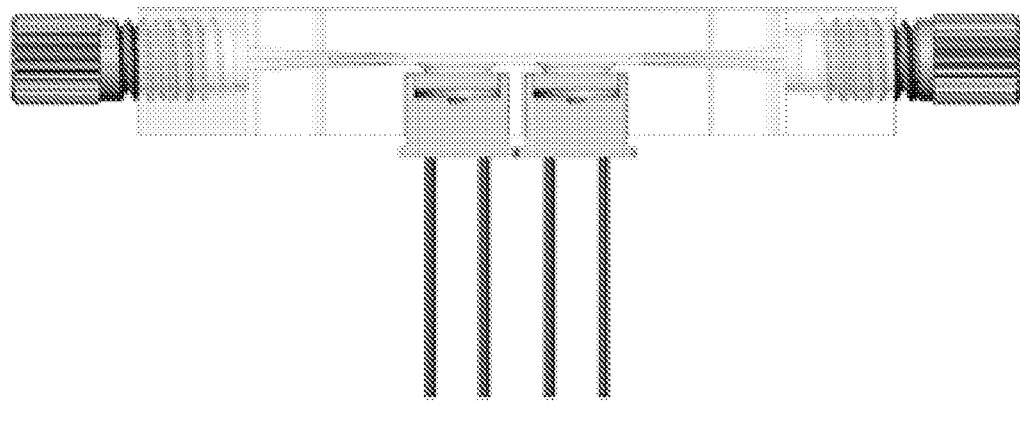
Figure 28C:
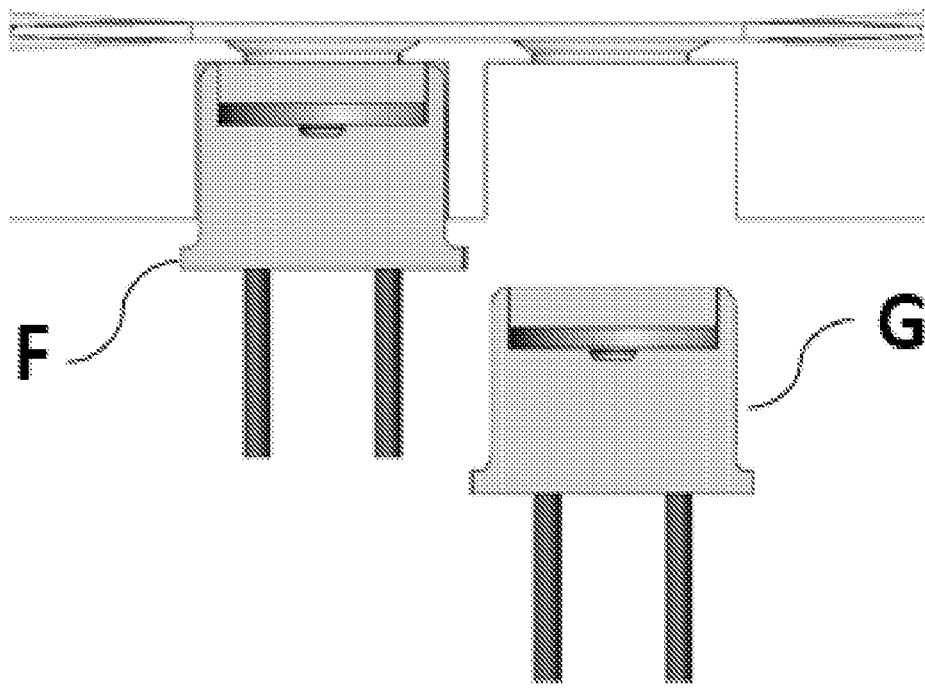

FIG. 28A-C show drawings of a flow-cell for synthesizing polymers on the surfaces of independently controlled LEDs arranged in a 4-plex array sharing a common reaction chamber.

FIG. 28 D-F show results of testing the flow-cell shown in FIG. 28A-C.

It is to be understood that the figures are not necessarily drawn to scale, nor are the objects in the figures necessarily drawn to scale in relationship to one another. The figures are depictions that are intended to bring clarity and understanding to various embodiments of apparatuses, systems, and methods disclosed herein. Wherever possible, the same reference numbers will be used throughout the drawings to refer to the same or like parts. Moreover, it should be appreciated that the drawings are not intended to limit the scope of the present teachings in any way.

DETAILED DESCRIPTION

Provided herein is technology relating to microarrays and particularly, but not exclusively, to microarray devices and systems, methods for producing microarrays, and methods of using microarrays.

In this detailed description of the various embodiments, for purposes of explanation, numerous specific details are set forth to provide a thorough understanding of the embodiments disclosed. One skilled in the art will appreciate, however, that these various embodiments may be practiced with or without these specific details. In other instances, structures and devices are shown in block diagram form. Furthermore, one skilled in the art can readily appreciate that the specific sequences in which methods are presented and performed are illustrative and it is contemplated that the sequences can be varied and still remain within the spirit and scope of the various embodiments disclosed herein.

All literature and similar materials cited in this application, including but not limited to, patents, patent applications, articles, books, treatises, and internet web pages are expressly incorporated by reference in their entirety for any purpose. Unless defined otherwise, all technical and scientific terms used herein have the same meaning as is commonly understood by one of ordinary skill in the art to which the various embodiments described herein belongs. When definitions of terms in incorporated references appear to differ from the definitions provided in the present teachings, the definition provided in the present teachings shall control. The section headings used herein are for organizational purposes only and are not to be construed as limiting the described subject matter in any way.

Definitions

To facilitate an understanding of the present technology, a number of terms and phrases are defined below. Additional definitions are set forth throughout the detailed description.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator and is equivalent to the term "and/or" unless the context clearly dictates otherwise. The term "based on" is not exclusive and allows for being based on additional factors not described, unless the context clearly dictates otherwise. In addition, throughout the specification, the meaning of "a", "an", and "the" include plural references. The meaning of "in" includes "in" and "on".

As used herein, the terms "about", "approximately", "substantially", and "significantly" are understood by persons of ordinary skill in the art and will vary to some extent on the context in which they are used. If there are uses of these terms that are not clear to persons of ordinary skill in the art given the context in which they are used, "about" and "approximately" mean plus or minus less than or equal to 10% of the particular term and "substantially" and "significantly" mean plus or minus greater than 10% of the particular term.

As used herein, disclosure of ranges includes disclosure of all values and further divided ranges within the entire range, including endpoints and sub-ranges given for the ranges.

As used herein, the suffix "-free" refers to an embodiment of the technology that omits the feature of the base root of the word to which "-free" is appended. That is, the term "X-free" as used herein means "without X", where X is a feature of the technology omitted in the "X-free" technology. For example, a "calcium-free" composition does not comprise calcium, a "mixing-free" method does not comprise a mixing step, etc.

Although the terms "first", "second", "third", etc. may be used herein to describe various steps, elements, compositions, components, regions, layers, and/or sections, these steps, elements, compositions, components, regions, layers, and/or sections should not be limited by these terms, unless otherwise indicated. These terms are used to distinguish one step, element, composition, component, region, layer, and/or section from another step, element, composition, component, region, layer, and/or section. Terms such as "first", "second", and other numerical terms when used herein do not imply a sequence or order unless clearly indicated by the context. Thus, a first step, element, composition, component, region, layer, or section discussed herein could be termed a second step, element, composition, component, region, layer, or section without departing from technology.

As used herein, spatially relative terms, such as "under," "below," "lower," "over," "upper", "left", "right", and the like are used for ease of description to describe relationships between components, elements, features, etc., e.g., as illustrated in a figure. Spatially relative terms are intended to encompass different orientations of embodiments of the technology in use or operation, e.g., in addition to the orientation as depicted in the figures. For example, elements described as "under" or "beneath" other elements or features would then be oriented "over" the other elements or features when the positions of elements are changed in some embodiments.

As used herein, the term "optional" or "optionally" means that the subsequently described circumstance may or may not occur and is not necessary, so that the description includes instances where the circumstance occurs and instances where it does not occur.

As used herein, the term "array" (sometimes referenced as a "microarray") refers to an arrangement (e.g., a one-dimensional, two-dimensional, or three-dimensional arrangement) of addressable regions each comprising a particular chemical moiety or moieties (e.g., polymers and/or heteropolymers such as oligonucleotides, oligopeptides, or other biomolecules) associated with that region. In some embodiments, the term "probe" or "probes" is used to refer to the polymers, e.g., when the microarray finds use in a binding assay to detect and/or characterize an analyte. However, the technology is not limited to microarrays comprising probes and includes microarrays comprising polymers and/or heteropolymers (e.g., synthesized on a microarray) that are not designed or intended to interact with analytes in any sample. For example, the term microarray also refers to microarrays comprising polymers and/or heteropolymers that are removed from the surface of the microarray, that are used to store data in their sequence (e.g., "DNA data storage"), and/or used as a building material (e.g., "DNA origami").

As used herein, an array is "addressable" in that it has multiple regions (e.g., comprising different moieties (e.g., different oligonucleotides, oligopeptides, etc.) such that a region (a "array feature" or "spot" of the array) at a particular predetermined location (an "address") on the array detects a particular target or class of targets. As used herein, a "target" refers to an analyte in a mobile phase (typically fluid) to be detected by probes (sometimes referenced as "target probes") that are bound to the substrate at the various regions. The probes may be bound to the substrate by interactions that include, for example, covalent and/or electrostatic interactions.

However, either of the "target" or "target probes" may be the one which is to be evaluated by the other. "Addressable collection of probes" refers to the multiple regions of different moieties supported by or intended to be supported by the array surface. In some embodiments comprising use of oligonucleotide probes and targets, the probes and targets may be single-stranded or double-stranded. A "sample" or "sample solution" refers to a mobile phase comprising the analyte. "Interrogating" the array refers to obtaining information from the array, especially information about analytes binding to the array. An "array format" refers to one or more characteristics of the array, such as array feature position, array feature size, or some indication of a moiety at a given location, including multiple different moieties, each moiety at a different addressable location. An "array substrate" refers to an article that supports an addressable collection of probes. The portion of the surface on which the collection of probes is disposed in an addressable format is referenced as the "array surface." In some embodiments, multiple arrays (e.g., 3, 4, 5, or more microarrays) are located on one substrate. In some embodiments, an array comprises a micro-LED array as described herein. In some embodiments, an array substrate comprises a micro-LED array as described herein.

As used herein, the term "integrated" describes a component comprising two (or more) sub-components physically and operably joined together. The sub-components may be (fully or partially) fabricated separate from each other and joined after their (full or partial) fabrication, or the integrated component may be fabricated to include the distinct sub-components in the integrated device. As described herein, an integrated micro-LED array integrates an array of light sources (a first sub-component) and a substrate for light-controlled polymer synthesis (a second sub-component), wherein the array of light sources and the substrate are integrated in one micro-LED array component.

As used herein, the term "micro-LED" refers to a small light emitting diode (LED) device. In some embodiments, the term "micro-LED" refers to a LED device that is smaller than approximately 1 mm in diameter. While the term "micro-LED" is understood by some in the art to refer to LED devices smaller than 100 μm in diameter, the technology is not limited to LED devices smaller than 100 μm in diameter and thus includes embodiments comprising LED devices that are larger than 100 μm in diameter ("mini-LEDs"). Thus, it is to be understood that use of the term "micro-LED" is not intended to limit the technology in any way, but rather should be interpreted to include the full range of possible LED device dimensions.

As used herein, the term "micro-LED array" refers to at least two individually addressable micro-LED units provided on the surface of a solid support). In some embodiments, a micro-LED array comprises more than 2, 5, 10, 20, 50, 100, 200, 500, or more than 1000 micro-LED units. In some embodiments, a micro-LED array comprises more than a thousand or more than a million micro-LED units. In some embodiments, a micro-LED array comprises 1, 2, 3, 4, 5, 6, 7, 8, or 9×10 micro-LED units; 1, 2, 3, 4, 5, 6, 7, 8, or $9 \times 10^2$ micro-LED units; 1, 2, 3, 4, 5, 6, 7, 8, or $9 \times 10^3$ micro-LED units; 1, 2, 3, 4, 5, 6, 7, 8, or $9 \times 10^4$ micro-LED units; 1, 2, 3, 4, 5, 6, 7, 8, or $9 \times 10^5$ micro-LED units; 1, 2, 3, 4, 5, 6, 7, 8, or $9 \times 10^6$ micro-LED units; 1, 2, 3, 4, 5, 6, 7, 8, or $9 \times 10^7$ micro-LED units; 1, 2, 3, 4, 5, 6, 7, 8, or $9 \times 10^8$ micro-LED units; or 1, 2, 3, 4, 5, 6, 7, 8, or $9 \times 10^9$ micro-LED units.

As used herein, the term "micro-LED unit" refers to the collection of components in a micro-LED array that contribute to the formation of a single pixel of the micro-LED array. In some embodiments, a single micro-LED unit for a pixel comprises a plurality of micro-LED devices for illuminating the same said pixel (e.g., to provide redundancy or to provide a multicolor light source or multicolor pixel).

As used herein, the term "micro-LED device" refers to the p-n diode of a micro-LED, e.g., comprising an n-doped layer, a p-doped layer, and an intervening quantum well layer. In some embodiments, a micro-LED device further comprises the p-contact and/or the n-contact of the diode.

As used herein, the term "solid support" or "physical support" refers to any solid or semi-solid material having a surface area to which molecules can be attached through bond formation or absorbed through electronic or static interactions (e.g., covalent bond or complex formation) through a specific functional group. In some embodiments, the functional surface of a solid support comprises simple organic molecules, co-polymers, dendrimers, or the like. As described herein, the present technology relates to micro-LED arrays that comprise a solid support upon which polymers are constructed.

As used herein, the term "feature" refers to a defined area on the surface of a microarray. See, e.g., FIG. 1. In some embodiments, a feature comprises a polymer (e.g., a heteropolymer). In exemplary embodiments, the polymer is a biomolecule (e.g., a peptide, nucleic acid, carbohydrate, and the like). A feature can comprise a polymer having different properties (e.g., different sequences, reactivities, and/or orientations) relative to other features. While a feature may be described as comprising a polymer, in practice each feature comprises a plurality of copies (e.g., in a cluster) occupying a discrete feature. See, e.g., FIG. 1. In some embodiments, a feature comprises tens, hundreds, thousands, millions, or more copies of the same polymer (e.g., 1, 2, 3, 4, 5, 6, 7, 8, or 9×10 copies; 1, 2, 3, 4, 5, 6, 7, 8, or $9 \times 10^2$ copies; 1, 2, 3, 4, 5, 6, 7, 8, or $9 \times 10^3$ copies; 1, 2, 3, 4, 5, 6, 7, 8, or $9 \times 10^4$ copies; 1, 2, 3, 4, 5, 6, 7, 8, or $9 \times 10^5$ copies; 1, 2, 3, 4, 5, 6, 7, 8, or $9 \times 10^6$ copies; 1, 2, 3, 4, 5, 6, 7, 8, or $9 \times 10^7$ copies; 1, 2, 3, 4, 5, 6, 7, 8, or $9 \times 10^8$ copies; or 1, 2, 3, 4, 5, 6, 7, 8, or $9 \times 10^9$ copies of the same polymer).

As used herein, the term "feature pitch" refers to the distance between the same point on adjacent features (see, e.g., FIG. 1, Panel B, arrow a).

As used herein, the term "feature gap" refers to the distance between the closest point on adjacent features (see, e.g., FIG. 1, Panel B, arrow b).

As used herein, the term "feature width" refers to the width of a feature (see, e.g., FIG. 1, Panel B, arrow c).

As used herein, the term "feature number" refers to the absolute number of spatially distinct features on a microarray.

As used herein, the term "feature density" refers to the number of features of a microarray divided by the functional area of the microarray. The term "feature density" does not describe the absolute number of molecules on the microarray, the total number of different sequences represented on the microarray, or the number of copies of each molecule per feature.

As used herein, the term "feature diversity" refers to the absolute number of different sequences that are represented on a microarray. Accordingly, in some embodiments, the term "feature diversity" provides a measure of information complexity for a microarray. "Feature diversity" is partially independent of the absolute number of features. For example, while a microarray comprises a minimum feature number to support a given feature diversity, two microarrays may have the same feature numbers but have different feature diversities if one microarray has a greater redundancy of sequence representation among its features.

As used herein, the term "protecting group" refers to a moiety, functional group, ligand, or the like, that is cleavably bound (e.g., via covalent bond, ionic bond, or complex) to a potentially reactive functional group and prevents the potentially reactive functional group from reacting in an uncontrolled manner. In some embodiments, the protecting group is cleavably bound via a covalent bond. Embodiments provide that the protecting group is cleaved off the respective reactive functional group by any fashion, such as by acids, bases, fluoride, enzymes, reduction, or oxidation. In some embodiments related to photocleavable protecting groups, the protecting group is cleaved off by exposure to electromagnetic radiation. Protecting groups according to the technology are photo labile protecting groups that include, but are not limited to, o-nitrobenzyl-oxycarbonyl (NBOC), o-nitrophenyl-ethoxycarbonyl (NPEOC), 2-(3,4-methylenedioxy-2-nitrophenyl)-propyloxy-carbonyl (MeN-PPOC), 2-(3,4-methylenedioxy-2-nitrophenyl)-oxycarbonyl (MeNPOC), 2-(2-nitrophenyl)-propoxycarbonyl (NPPOC), 2-(2-nitro-4-benzoylphenyl)-2'-propyl-1'-oxycarbonyl (benzoyl-NPPOC), dimethoxy-benzo-inylyl-oxycarbonyl (DM-BOC), 2-(2-nitrophenyl)-ethylsulfonyl (NPES), (2-nitrophenyl)-propylsulfonyl (NPPS), and the like.

As used herein, the term "functional group" refers to any of numerous combinations of atoms that form parts of chemical molecules that undergo characteristic reactions themselves and that influence the reactivity of the remainder of the molecule. Typical functional groups include, but are not limited to, hydroxyl, carboxyl, aldehyde, carbonyl, amino, azide, alkynyl, thiol, and nitrile. Potentially reactive functional groups include, for example, amines, carboxylic acids, alcohols, double bonds, and the like. In some embodiments, functional groups are potentially reactive functional groups of amino acids such as amino groups or carboxyl groups or potentially reactive functional groups of nucleotides such as hydroxyl.

As used herein, the term "moiety" refers to one of two or more parts into which something may be divided, such as, for example, the various parts of a molecule or a chemical group.

As used herein, the term "polymer" refers to a macromolecule formed by the chemical union of monomers (e.g., polymerizable monomers) and thus may refer to any natural or non-natural molecule comprising multiple subunits. A polymer may be a homopolymer consisting of only a single type of repeating subunit. A polymer may be a heteropolymer comprising different subunits. The term polymer encompasses "biopolymers" and "biomolecules", which are biological polymers that comprise a variety of different but structurally related subunits, e.g., polynucleotides such as DNA and RNA comprising a plurality of nucleotide subunits and polypeptides comprising a plurality of amino acid subunits. As used herein, the "sequence" of a polymer refers to the order and identity of monomer units (e.g., nucleotides, amino acids, sugars, etc.) in the polymer. The sequence (e.g., base sequence) of a nucleic acid is typically read in the 5' to 3' direction. The sequence of a polypeptide is typically read from the amino terminus to the carboxy terminus.

As used herein, the term "biomarker" refers to an indicator of a medical state or condition of a healthy or diseased subject, e.g., a predictive, diagnostic, and/or prognostic indicator, that can be detected in a sample. For example, a biomarker may serve as an indicator of a disease or disorder characterized by certain molecular, pathological, histological, and/or clinical features. A biomarker may be, but is not limited to, a deoxyribonucleic acid, ribonucleic acid, metabolite, lipid, phospholipid, steroid, carbohydrate, sugar, polysaccharide, signaling molecule, hormone, neurotransmitter, cofactor, protein, or glycoprotein; a derivative and/or a chemical modification of any of the foregoing; and/or a combination of any of the foregoing. In some embodiments, one or more biomarkers is used to detect or aid in the detection of a disease or is used to detect or aid in the detection of risk of disease; monitor the progression of a disease; and/or monitor the effectiveness of a treatment for a disease.

As used herein, the terms "peptide" or "oligopeptide" refers to a polymer of amino acids, e.g., an organic compound comprising amino acids arranged in a linear chain and joined together by peptide bonds between the carboxyl and amino groups of adjacent amino acid residues. The terms "peptide" or "oligopeptide" also refer to organic compounds comprising less than 100 amino acid residues (e.g., less than 100, 95, 90, 85, 80, 75, 70, 65, 60, 55, 50, 45, 40, 35, 34, 33, 32, 31, 30, 29, 28, 27, 26, 25, 24, 23, 22, 21, 20, 19, 18, 17, 16, 15, 14, 13, 12, 11, 10, 9, 8, 7, 6, 5, 4, or 3 amino acids).

As used herein, the term "natural amino acid" refers to one of the 20 amino acids used for protein biosynthesis as well as other amino acids that can be incorporated into proteins during translation (e.g., pyrrolysine and selenocysteine). The 20 natural amino acids include histidine, alanine, valine, glycine, leucine, isoleucine, aspartic acid, glutamic acid, serine, glutamine, asparagine, threonine, arginine, proline, phenylalanine, tyrosine, tryptophan, cysteine, methionine, and lysine. Conventional one and three-letter amino acid codes are used herein as follows—Alanine: Ala, A; Arginine: Arg, R; Asparagine: Asn, N; Aspartate: Asp, D; Cysteine: Cys, C; Glutamate: Glu, E; Glutamine: Gln, Q; Glycine: Gly, G; Histidine: His, H; Isoleucine: Ile, I; Leucine: Leu, L; Lysine: Lys, K; Methionine: Met, M; Phenylalanine: Phe, F; Proline: Pro, P; Serine: Ser, S; Threonine: Thr, T; Tryptophan: Trp, W; Tyrosine: Tyr, Y; Valine: Val, V. As used herein, the codes Xaa and X refer to any amino acid. As used herein, the one-letter codes for amino acids refer to standard IUB nomenclature as described in "IUPAC-IUB Nomenclature of Amino Acids and Peptides" published in *Biochem. J., 1984, 219, 345-373; Eur. J. Biochem., 1984, 138, 9-37; 1985, 152, 1; Internat. J. Pept. Prot. Res., 1984, 24, following p 84; J. Biol. Chem., 1985, 260, 14-42; Pure Appl. Chem., 1984, 56, 595-624; Amino Acids and Peptides, 1985, 16, 387-410;* and in *Biochemical Nomenclature and Related Documents,* 2nd edition, Portland Press, 1992, pp 39-67, each of which is incorporated herein by reference.

As used herein, the term "non-natural amino acid" refers to an organic compound that is not among those encoded by the standard genetic code or incorporated into proteins during translation. Therefore, non-natural amino acids include amino acids or analogs of amino acids, but are not limited to, the D-isostereomers of amino acids, the beta-amino-analogs of amino acids, citrulline, homocitrulline, homoarginine, hydroxyproline, homoproline, ornithine, 4-amino-phenylalanine, cyclohexylalanine, a-aminoisobu-tyric acid, N-methyl-alanine, N-methyl-glycine, norleucine, N-methyl-glutamic acid, tert-butylglycine, α-aminobutyric acid, tert-butylalanine, 2-aminoisobutyric acid, α-ami-noisobutyric acid, 2-aminoindane-2-carboxylic acid, sele-nomethionine, dehydroalanine, lanthionine, γ-amino butyric acid, and derivatives thereof wherein the amine nitrogen has been mono-alkylated or di-alkylated.

As used herein, the term "amino group" refers to primary ($-NH_2$) or secondary ($-NHR$) amino groups. Examples of amino groups include, but are not limited to, $-NH_2$, $-NHCH_3$, and $-NHC(CH_3)_2$. Examples of cyclic amino groups include, but are not limited to, aziridino, azetidino, pyrrolidino, piperidino, piperazino, morpholino, and thio-morpholino.

As used herein, the term "reactive amino group" refers to an amine that can react with a functional group to form a covalent bond between the nitrogen of the amino group and the electrophile of the functional group, such as a peptide bond.

As used herein, the term "nucleic acid" refers to any nucleic acid containing molecule including but not limited to DNA or RNA. As used herein, the term "nucleic acid" generally refers to a polymer comprising one or more nucleic acid subunits or nucleotides. A nucleic acid may include one or more subunits selected from adenosine (A), cytosine (C), guanine (G), thymine (T), and uracil (U), or variants thereof. A nucleotide can include A, C, G, T, or U, or variants thereof. A nucleotide can include any subunit that can be incorporated into a growing nucleic acid strand. Such subunit can be an A, C, G, T, or U, or any other subunit that is specific to one or more complementary A, C, G, T or U, or complementary to a purine (e.g., A or G, or variant thereof) or a pyrimidine (e.g., C, T, or U, or variant thereof). In some examples, a nucleic acid is deoxyribonucleic acid (DNA) or ribonucleic acid (RNA), or derivatives thereof. A nucleic acid may be single-stranded or double-stranded. The term nucleic acid encompasses nucleic acids that comprise natural nucleotides and/or any of the known base analogs of DNA and RNA including, but not limited to, 4-acetylcyto-sine, 8-hydroxy-N6-methyladenosine, aziridinylcytosine, pseudoisocytosine, 5-(carboxyhydroxyl-methyl) uracil, 5-fluorouracil, 5-bromouracil, 5-carboxymethylaminom-ethyl-2-thiouracil, 5-carboxymethyl-aminomethyluracil, dihydrouracil, inosine, N6-isopentenyladenine, 1-methylad-enine, 1-methylpseudouracil, 1-methylguanine, 1-methyl-inosine, 2,2-dimethylguanine, 2-methyladenine, 2-methyl-guanine, 3-methylcytosine, 5-methylcytosine, N6-methyladenine, 7-methylguanine, 5-methylaminom-ethyluracil, 5-methoxyaminomethyl-2-thiouracil, beta-D-mannosylqueosine, 5' methoxycarbonylmethyluracil, 5-methoxyuracil, 2-methylthio-N6-isopentenyladenine, ura-cil-5-oxyacetic acid methylester, uracil-5-oxyacetic acid, oxybutoxosine, pseudouracil, queosine, 2-thiocytosine, 5-methyl-2-thiouracil, 2-thiouracil, 4-thiouracil, 5-methylu-racil, N-uracil-5-oxyacetic acid methylester, uracil-5-oxy-acetic acid, pseudouracil, queosine, 2-thiocytosine, and 2,6-diaminopurine.

As used herein, the term "oligonucleotide" refers to a molecule comprising two or more deoxyribonucleotides or ribonucleotides, preferably more than three, and usually more than ten. In some embodiments, an oligonucleotide comprises more than 10, 15, 20, 25, 30, 35, 40, 45, 50, 55, 60, 65, 70, 75, 80, 85, 90, 95, 100, 105, 110, 115, 120, 125, 130, 135, 140, 145, 150, 155, 160, 165, 170, 175, 180, 185, 190, 195, 200, 205, 210, 215, 220, 225, 230, 235, 240, 245, 250, 255, 260, 265, 270, 275, 280, 285, 290, 295, 300, 305, 310, 315, 320, 325, 330, 335, 340, 345, 350, 355, 360, 365, 370, 375, 380, 385, 390, 395, 400, 405, 410, 415, 420, 425, 430, 435, 440, 445, 450, 455, 460, 465, 470, 475, 480, 485, 490, 495, 500, 550, 600, 650, 700, 750, 800, 850, 900, 950, or 1000 nucleotides. The term oligonucleotide may also be used interchangeably with the term "polynucleotide."

As used herein, the term "light" is understood to refer to electromagnetic radiation in any appropriate region of the electromagnetic spectrum and is not limited to visible light. Accordingly, the term "light" encompasses infrared, ultra-violet, and visible electromagnetic radiation. As used herein, the term "light" can refer to light directed toward a surface, composition, molecule, etc., so that it contacts the surface, composition, molecule, etc., regardless of the treatment of the light as a wave or a particle (e.g., a photon).

In some embodiments, an "activating" intensity of light is light provided above a threshold intensity required to effect a chemical reaction, e.g., to cleave a photolabile moiety from a polymer or monomer (e.g., to cleave a protecting group). In some embodiments, an activating intensity of light is expressed as the intensity of light at a particular wavelength of electromagnetic radiation or an average inten-sity over a particular range of wavelengths of electromag-netic radiation. In some embodiments, the "activating" intensity is expressed as a number of photons (e.g., photons of a particular wavelength) absorbed by a photoactivatable molecule. In some embodiments, the "activating" intensity is expressed in units of irradiance or intensity, e.g., in the form of power per unit area (e.g., $W/cm^2$ or the like). In some embodiments, the activating intensity is expressed as an irradiance at the absorption maximum of a photoactivat-able molecule. However, the activating light need not be provided at a wavelength at or near the absorption maximum (e.g., wavelength of maximal absorption) of a photoactivat-able molecule; thus, in some embodiments, the activating light is provided at a wavelength at which the absorption by the photoactivatable molecule of said wavelength is less than 50, 45, 40, 35, 30, 25, 20, 15, 10, 9, 8, 7, 6, 5, 4, 3, 2, or 1% of the absorption by the molecule at the wavelength of the absorption maximum.

As used herein, the term "photon" refers to a unit particle of electromagnetic energy.

As used herein, the term "color" or "wavelength" is used interchangeably with the term "spectrum." However, the term, "color" generally is used to refer to a property of electromagnetic radiation that is perceivable by an observer (though this usage is not intended to limit the scope of this term). Accordingly, the term "different colors" implies two different spectra with different wavelengths, wavelength components, wavelength ranges, spectra, and/or band-widths. In addition, "color" may be used to refer to white and non-white light. As used herein, the term "blue light" refers to light having a wavelength in the range of approxi-mately 450-495 nm (e.g., 445, 446, 447, 448, 449, 450, 451, 452, 453, 454, 455, 456, 457, 458, 459, 460, 461, 462, 463, 464, 465, 466, 467, 468, 469, 470, 471, 472, 473, 474, 475, 476, 477, 478, 479, 480, 481, 482, 483, 484, 485, 486, 487, 488, 489, 490, 491, 492, 493, 494, 495, 496, 497, 498, 499, or 500 nm). As used herein, "UV light" refers to light having a wavelength of approximately 100-450 nm (e.g., 95, 100, 105, 110, 115, 120, 125, 130, 135, 140, 145, 150, 155, 160, 165, 170, 175, 180, 185, 190, 195, 200, 205, 210, 215, 220, 225, 230, 235, 240, 245, 250, 255, 260, 265, 270, 275, 280, 285, 290, 295, 300, 305, 310, 315, 320, 325, 330, 335, 340, 345, 350, 355, 360, 365, 370, 375, 380, 385, 390, 395, 400, 405, 410, 415, 420, 425, 430, 435, 440, 445, 450, or 455 nm).

As used herein, the terms "photon beam", "light beam", "electromagnetic beam", "image beam", or "beam" refer to a somewhat localized (in time and space) beam or bundle of photons or electromagnetic waves of various frequencies or wavelengths within the electromagnetic spectrum.

As used herein, the terms "light source", "photon source", or "source" refer to various devices that are capable of emitting, providing, transmitting, or generating one or more photons or electromagnetic waves of one or more wavelengths or frequencies within the electromagnetic spectrum. A light or photon source may transmit one or more outgoing light beams. A photon source may be a laser, a light bulb, or the like. In embodiments of the technology provided herein, a photon source or source is a light emitting diode (LED) (e.g., a micro-LED unit). A photon source may generate photons via stimulated emissions of atoms or molecules, an incandescent process, or various other mechanisms that generate an electromagnetic wave or one or more photons. A photon source may provide continuous or pulsed outgoing light beams of a predetermined frequency, range of frequencies, wavelength, range of wavelengths, or spectra. The outgoing light beams may be coherent light beams. The photons emitted by a light source may be of various wavelengths or frequencies.

DESCRIPTION

Although the disclosure herein refers to certain illustrated embodiments, it is to be understood that these embodiments are presented by way of example and not by way of limitation.

In some embodiments, e.g., as shown in FIG. 6, the technology comprises a micro-LED array 100. In some embodiments the micro-LED array comprises a high-density field of light-emitting elements 130 comprising individually addressable micro-LEDs arrayed in two dimensions with underlying complementary metal-oxide semiconductor (CMOS) control circuitry (not visible in this view), a protective enclosure with top 110 and side 120 surfaces indicated, a cable 140 for conducting power and external control signals to the internal CMOS control circuitry, and a pin connector 142 for linking the cable 140 to an external control computer.

The area in FIG. 6 encompassed by the dashed line 145 is magnified in FIG. 7 to show individual light-emitting areas ("pixels") 150, each of which defines the surface of a distinct micro-LED light source within the array. Discrete pixels are surrounded and separated by a contiguous non-light-emitting surface area 180. In some embodiments, the surface of the light-emitting elements 150, the surface of the intervening material 180, and the top surface 110 of the surrounding protective enclosure are substantially co-planar to facilitate efficient hydrodynamics during flow-cell operation, described later. However, the technology is not limited to these geometries and, accordingly, the technology encompasses other geometries. In some embodiments, the micro-LED arrays are essentially rigid in structure. However, the technology is not limited to use essentially rigid micro-LED arrays and, accordingly, some embodiments comprise use of a flexible micro-LED array (see, e.g., (Tian P, McKendry J J, Gu E, Chen Z, Sun Y, Zhang G, Dawson M D, Liu R. Fabrication, characterization and applications of flexible vertical InGaN micro-light emitting diode arrays. Opt Express. 2016 Jan. 11; 24(1):699-707; Lee H E, Choi J, Lee S H, Jeong M, Shin J H, Joe D J, Kim D, Kim C W, Park J H, Lee J H, Kim D, Shin C S, Lee K J. Monolithic Flexible Vertical GaN Light-Emitting Diodes for a Transparent Wireless Brain Optical Stimulator. Adv Mater. 2018 July; 30(28): e1800649, each of which is incorporated herein by reference). Flexible micro-LED arrays find use in embodiments of the present technology to provide flexible polymer and heteropolymer microarrays.

Although the term "micro-LED" is generally understood to describe LED devices smaller than 100 µm in diameter, LED devices larger than 100 µm in diameter ("mini-LEDs") find use in the present technology. Thus, it is to be understood that use of the term "micro-LED" is not intended to limit the technology in any way, but rather should be interpreted to include the full range of possible LED device dimensions. The number, shape and size of the pixels, and relative positions and pitches of pixels on the micro-LED array, may vary considerably without impacting the basic functionality of the present technology to synthesize polymers directly on the surface of each light source. For example, embodiments comprise synthesizing a single polymer on the surface of a single mini-LED unit. However, in some embodiments, the technology comprises use of micro-LED arrays that comprise at least two individually addressable micro-LED units, and could comprise more than 1 thousand micro-LED units, or more than 1 million micro-LED units, or more than 100 million micro-LED units. There is no minimum number of micro-LED units within a micro-LED array below which the corresponding polymer and/or heteropolymer microarray would be without utility for use in some existing application. Accordingly, current commercial micro-LED array manufacturing capabilities are sufficient to support the practice of the present technology.

Several different methods of fabricating micro-LED arrays have been demonstrated or proposed, including "pick-and-place", "flip-chip" assembly, transfer-printing, wafer-level monolithic hybrid integration, and GaN-on-silicon monolithic fabrication (see, e.g., Marion F, Bisotto S, Berger F, Gueugnot A, Mathieu L, Henry D, Templier F, Catelain T. A Room Temperature Flip-Chip Technology for High Pixel Count Micro-Displays and Imaging Arrays. IEEE 66th Electronic Components and Technology Conference (ECTC). 2016: 929-935; Bower C, Meitl M, Raymond B, Radauscher E, Cok R, Bonafede S, Gomez D, Moore T, Prevatte C, Fisher B, Rotzoll R, Melnik G, Fecioru A, Trindade A. Emissive displays with transfer-printed assemblies of 8 µm and 15 µm inorganic light-emitting diodes. Photon. Res. 2017 Feb. 23; 5, A23-A29; Zhang L, Ou F, Chong W C, Chen Y, Zhu Y, Li Q. Monochromatic Active Matrix Micro-LED Micro-Displays with >5,000 dpi Pixel Density Fabricated using Monolithic Hybrid Integration Process. SID Symposium Digest of Technical Papers. 2018; 49. 333-336; and Strickland K. The Future of MicroLED Displays using Next-generation Technologies. SID Symposium Digest of Technical Papers. 2018; 49:696-7, each of which is incorporated herein by reference). Micro-LED arrays fabricated by any of these methods, or by other methods not described here, may be used in the present technology to manufacture polymer microarrays.

Many of these methods were developed to manufacture micro-LED displays for use in consumer electronics, where two of the most difficult goals to address have been producing full-color (RGB) capability and producing high-resolution displays without a single non-functioning pixel (Wu T, Sher C-W, Lin Y, Lee C-F, Liang S, Lu Y, Huang-Chen S-W, Guo W, Kuo H-C, Chen Z. Mini-LED and Micro-LED: Promising Candidates for the Next Generation Display Technology. Appl. Sci. 2018; 8(9): 1557, incorporated herein by reference).

Importantly, embodiments of the present technology do not require these advanced capabilities. First, in some embodiments, light-directed polymer synthesis is controlled by a micro-LED array that emits light of a single wavelength (rather than three wavelengths (e.g., red, green, and blue)), which is a basic capability shared by nearly all micro-LED array display technologies. Second, in some embodiments of the technology, non-functional pixels are effectively ignored, provided that a sufficient number of functional pixels are present somewhere on the array to support the number of different polymers desired. In some embodiments, functional pixel number and/or location is/are confirmed by a quality control step in advance of using a micro-LED array to synthesize a polymer on the substrate. For example, in some embodiments, the technology comprises evaluating the pixel quality of a micro-LED array by a method comprising activating all pixels in a micro-LED array and visualizing the micro-LED array, e.g., using standard imaging technology. In some embodiments, location and/or quality of functional and non-functional pixels are recorded (e.g., using coordinates). In some embodiments, polymers are synthesized at locations on the micro-LED array comprising functional pixels. Thus, previous generation micro-LED array manufacturing technologies and individual micro-LED arrays that would be considered defective for use in commercial display products because of one or more non-functional pixels can be used with the present technology to lower costs and provide increased manufacturing flexibility.

The major surface and sub-surface constituents of a micro-LED array are described in a partial cross-sectional side view in FIG. 8. It is to be appreciated that this is only one possible embodiment of a micro-LED array that finds use in the present technology and that the number of alternative embodiments is not limited. Furthermore, those skilled in the art will recognize that this illustration has been simplified to include some exemplary details to provide a description of embodiments of the present technology and that the elements of a micro-LED that provide the functions of the micro-LED in accordance with embodiments of the present technology are presumed to be present even though they are not depicted here or explicitly discussed. For example, the drawings of the vertical-type micro-LED devices 190, 200, 210 that are at the core of three adjacent micro-LED units in the embodiment in FIG. 8 do not identify structural details such as the p- and n-contacts, or the n-doped, p-doped, and intervening quantum well layers that constitute each p-n diode. These features are widely understood features that provide functional micro-LED devices, and thus are included in embodiments of the technology that find use in the present technology. Similarly, although the relative location of the circuitry in the CMOS backplane of the micro-LED array is indicated 300, the structural details of the same are not presented as they are not unique to the function of the present technology.

Returning to FIG. 8, each of the three adjacent micro-LED units shown contains one micro-LED device, 190, 200, or 210, all of which comprise essentially the same structure, but are numbered differently to indicate that each occupies a distinct location within the micro-LED array and can be addressed independently (e.g., activated and inactivated) by control software. For the present technology, the term "micro-LED device" is intended to include only the p-n diode itself, comprising at least an n-doped layer, p-doped layer, and intervening quantum well layer, while a "micro-LED unit" is defined to include the components in a micro-LED array that contribute to the formation of a single pixel only. Thus, a single micro-LED unit may include more than one micro-LED device (as is sometimes done for purposes of redundancy or to produce a multicolor display) provided that they are designed to illuminate only one pixel. In the embodiment shown, a single micro-LED device, 190, 200, or 210, is positioned near the bottom a well formed by a translucent light distribution layer 230 with opaque walls 240 on all sides. The opaque walls 240 are designed to prevent incident light from entering adjacent micro-LED units. The bottom of the well is formed by a reflective layer 220 designed to reflect light emitted from the micro-LED device upwards through the light distribution layer 230 and out of the well. In some embodiments, the light distribution layer 230, reflective layer 220, and opaque walls 240 are not constrained to the shapes shown in FIG. 8; accordingly, the technology comprises a light distribution layer 230, reflective layer 220, and opaque walls 240 that are fabricated with other geometries.

The surface of the light distribution layer 230 opposite to the reflective layer 230 provides an aperture for each micro-LED unit, which, in some embodiments, is covered by one or more layers or coatings that can each have different functions. The embodiment shown in FIG. 8 comprises two layers: a barrier layer 250 and a functionalized layer 260. The barrier layer 250 protects internal components of the micro-LED unit from oxygen, water, or other reactive gases or chemical reagents that might otherwise damage them, but it is substantially translucent to the wavelength of light used for light directed polymer synthesis. In some embodiments, the barrier layer 250 comprises $SiO_2$. In some embodiments, the barrier layer 250 comprises $Al_2O_3$, Parylene AF-4, or other materials exhibiting the desired properties.

The functionalized layer 260 comprises a material that functions to support in situ synthesis of polymers. More precisely, the material comprises chemical functional groups at the surface of the functionalized layer. The chemical functional groups can form a bond with a component of a polymer and anchor it to surface of the micro-LED array, e.g., while the remainder of the polymer is synthesized and/or during use of the polymer microarray in subsequent applications. The material comprising the functionalized layer 260 is therefore stable and resistant to the chemicals used in the polymer synthesis process. The barrier layer 250 and the functionalized layer 260 are stable when exposed to light from the micro-LED.

Some embodiments of the technology comprise a coating of a silane coupling agent to establish the functionalized layer, which presents functional groups suitable for initiating and anchoring the synthesis of several types of heteropolymers. Silanes suitable for this purpose include N,N-bis(2-hydroxyethyl)-3-aminopropyltriethoxysilane (McGall G H, Fidanza J A. Photolithographic synthesis of high-density oligonucleotide arrays. DNA Arrays—Methods and Protocols. Methods in Molecular Biology, Springer, 2001; 170: 71-102, incorporated herein by reference), N(3-triethoxysilylpropyl)-4-hydroxybutyramide (Franssen-van Hal N L, van der Putte P, Hellmuth K, Matysiak S, Kretschy N, Somoza M M. Optimized light-directed synthesis of aptamer microarrays. Anal Chem. 2013; 85(12):5950-7, incorporated herein by reference), and 3-aminopropyldimethylethoxysilane (De Stefano L, Oliviero G, Amato J, Borbone N, Piccialli G, Mayol L, Rendina I, Terracciano M, Rea I. Aminosilane functionalizations of mesoporous oxidized silicon for oligonucleotide synthesis and detection. J R Soc Interface. 2013 Mar. 27; 10(83):20130160, incorporated herein by reference). In some cases, polymers comprising other types of functional groups to provide for polymer synthesis are synthesized by making further modifications to the silane functionalized layer. For example, in some embodiments, amino functional groups are added to existing silane hydroxyl groups to enable the in situ photosynthesis of peptide heteropolymers (Forsstrom B, Axnas B B, Stengele K P, BUhler J, Albert T J, Richmond T A, Hu F J, Nilsson P, Hudson E P, Rockberg J, Uhlen M. Proteome-wide epitope mapping of antibodies using ultra-dense peptide arrays. Mol Cell Proteomics. 2014 June; 13(6):1585-97, incorporated herein by reference). Materials and chemicals suitable for the functionalization of micro-LED arrays to produce microarrays comprising various types of polymers, in accordance with embodiments of the present technology, are not limited by the examples provided here. Methods for applying functionalized coatings or layers to devices such as micro-LED arrays are well established and are familiar to those skilled in the art.

In some embodiments, the barrier layer 250 and the functionalized layer 260 are combined into a single layer that serves both functions. For example, in some embodiments, Parylene AF-4 is combined with other chemicals that provide hydroxyl or amino functional groups on its surface. In some embodiments, additional layers or coatings of material are included below the functionalized layer 260 and above the light distribution layer 230 to provide additional functionality to the system and/or to alter the properties of light emitted by the micro-LED unit. In some embodiments, the additional layer is a filter layer that filters out wavelengths other than those desired and narrows the spectrum of the emitted light. In some embodiments, the additional layer is a wavelength conversion layer that changes the wavelength of light emitted by the micro-LED device to a wavelength more desirable for use with the technology. In some embodiments, the additional layer is a matching layer that aligns the refraction indices of interfaces between other layers in the light path to minimize and/or eliminate the back reflection of light.

Micro-LED devices comprise wide-bandgap semiconducting materials that exhibit electroluminescence over a wide range of wavelengths, from deep-ultraviolet (200 nm) to near-infrared (900 nm) depending on the specific materials used. In some embodiments, the wavelength used for the in situ photosynthesis of polymers is determined by the specific photolabile chemical protecting group that is used to control polymer extension during the process and generally falls within the ultraviolet A (UVA) range of 320-400 nm (e.g., 320, 325, 330, 335, 340, 345, 350, 355, 360, 365, 370, 375, 380, 385, 390, 395, or 400 nm) for embodiments of methods used to synthesize DNA and peptides. In some embodiments, the micro-LED devices comprise gallium nitride (GaN), which emits light at a peak wavelength of approximately 365 nm and can be used to deprotect polymers protected by the photolabile chemical group 2-(2-nitrophenyl)propoxycarbonyl (NPPOC), which is sensitive to this wavelength. In some embodiments, the micro-LED devices comprise gallium nitride/aluminum gallium nitride (GaN/AlGaN), gallium nitride/indium gallium nitride (GaN/InGaN), gallium nitride/aluminum indium gallium nitride (GaN/AlInGaN), aluminum indium gallium phosphide (Al-InGaP), aluminum gallium arsenide (AlGaAs), or gallium arsenide (GaAs), depending on the particular polymer and/or heteropolymer in situ photosynthesis system.

FIG. 8 further illustrates the paths of light rays 270 emitted by two activated micro-LED devices 200 and 210 within their respective micro-LED units, while a third micro-LED device 190 has not been activated to emit light. The light rays 270 shown are only those that exit the micro-LED unit at the most extreme angles relative to the perpendicular axis, and so circumscribe a volume of light exiting the micro-LED unit. The shape of the volume would be cone shaped if the aperture of the micro-LED unit were circular, or shaped as an inverted pyramid if the aperture of the micro-LED unit were square, or other shapes depending on the design of the micro-LED unit. The light rays exiting at lesser angles are not shown. Areas of the functionalized surface illuminated by the exiting light define individual pixels where in situ photochemistry occurs 280. Photochemistry does not occur in areas of the functionalized surface above non-activated micro-LED units 290 or between adjacent activated micro-LED units where light cones do not reach 295. It can be appreciated that the shape of the light distribution layer 230, the shape of the reflective layer 220, and the distance between adjacent micro-LED units, can be controlled to control the width and pitch of pixels on the micro-LED array, and thus to control the width and pitch of features on a polymer microarray produced by the technology.

FIG. 9 illustrates an embodiment comprising the functionalized micro-LED array 100 immobilized within a flow-cell assembly 400, e.g., to create a chemical reaction chamber surrounding the light-emitting surface of the array 130 and comprising inlet 500 and outlet 510 ports to deliver liquid reagents to and from the chamber. The flow-cell assembly 400 comprises separate upper 410 and lower 420 parts held together against the micro-LED array 100 (e.g., using bolts 430 inserted through holes 450, 460 in the upper and lower flow-cell assembly parts; and using washers 440, 470 and nuts 480 as shown by the dashed line 490). The black dot 515 in FIG. 9 indicates the orientation of the upper flow-cell part 410, which is shown inverted in FIG. 10. FIG. 10 highlights a cavity in the upper flow-cell part 410 that forms the reaction chamber 520 when pressed against the micro-LED array 100, the gasket 550 that provides a tight seal around the circumference of the reaction chamber, and the opening of the exit channel 540 from the reaction chamber 520 that leads to the outlet port 510 on the exterior of the flow-cell assembly 400. In some embodiments, multiple micro-LED arrays are processed simultaneously in a single flow-cell of an appropriate design. In some embodiments, multiple micro-LED arrays are processed simultaneously in different flow-cells arranged in series and utilizing the same reagent stream. In some embodiments, multiple micro-LED arrays are processed simultaneously in different flow-cells arranged in parallel and utilizing a single reagent stream that is divided prior to reaching them. In some embodiments, the flow-cell and the micro-LED array are integrated and manufactured as a single unit.

FIG. 11A provides a cross-sectional view through the flow-cell assembly 400 and the immobilized micro-LED array 100 to reveal the structure of the internal fluidic components. In some embodiments, the liquid reagents provided for polymer and/or heteropolymer synthesis enter the flow-cell assembly through the reagent inlet port 500 before entering the reaction chamber 520 through opening 530 of the entrance channel. After each reaction is completed within a synthesis cycle, used reagents exit the reaction chamber 520 through opening 540 of the exit channel and then exit the flow-cell assembly through the reagent outlet port 510. Also shown are the cable 140 and pin connector 142 for conducting power and external control signals to the internal CMOS control circuitry 300. The area in FIG. 11A encompassed by the dashed line 560 is magnified in FIG. 11B and FIG. 11C to show the structure and function of the gasket 550, which is positioned within a channel in the upper flow-cell part 410, e.g., to provide a leak-proof seal around the light-emitting surface 130 of the micro-LED array when the upper 410 and lower 420 parts of the flow-cell assembly are tightened against it, as shown in the transition from FIG. 11B to FIG. 11C, which closes the gap indicated by the arrows 570 in FIG. 11B.

FIG. 12 provides additional detail showing connections between the flow-cell assembly 400, the immobilized micro-LED array 100, and external devices. Tubing 600 terminated by a threaded connector 602 is attached to the flow-cell assembly inlet port 500, e.g., to deliver fresh liquid synthesis reagents to the flow-cell assembly 400 and reaction chamber 520. Tubing 610 terminated by a threaded connector 612 is attached to the flow-cell assembly outlet port 510, e.g., to withdraw used liquid synthesis reagents from the reaction chamber 520 and flow-cell assembly 400. Cable 580 and pin connector 582 deliver power and external control signals to the internal CMOS control circuitry 300 via pin connector 142 and cable 140 as indicated.

FIG. 13 is a schematic overview of an embodiment of the polymer microarray synthesis system comprising a flow-cell assembly 400 with micro-LED array 100, liquid reagent handling system 640, waste collection vessel 650, control computer 620, and connections between these components. In some embodiments, liquid reagents provided for the synthesis reactions are delivered into the reaction chamber 420 using a liquid reagent handling system 640 connected to the flow-cell assembly 400, e.g., comprising reagent reservoirs, valves, manifolds, tubing and waste collection vessels similar, e.g., to those used in existing automated DNA synthesis systems. A control computer 620 is connected via cable 630 to the liquid reagent handling system 640, e.g., to control and/or monitor the pumping of liquid reagents to the reaction chamber 420 and to the driver circuitry 300 of the micro-LED array 100 to control the emission of light from each individual micro-LED. In some embodiments, these functions are coordinated by control software operated from the control computer so that the timing of light emission and reagent delivery are appropriately synchronized to synthesize the desired heteropolymers in situ on the functionalized surface of the micro-LED array, e.g., to produce a polymer microarray. In other embodiments, the control computer 620 communicates wirelessly with the liquid reagent handling system 640 and/or the driver circuitry 300 of the micro-LED array 100.

FIG. 14 provides a cross-sectional view through a portion of the immobilized micro-LED array 100. In the embodiment depicted in FIG. 14, the flow (e.g., left-to-right directional flow) of reagents through the reaction chamber 520 and contact of reagents with the functionalized surface of the micro-LED array 280, 290, 295 is illustrated by the dashed arrows 670. The internal surface of the reaction chamber 520, formed by the upper flow-cell assembly part 410, is designed to have anti-reflective properties to prevent emitted light from reflecting back to the surface of the micro-LED array as stray light, thus minimizing and/or eliminating interference with photosynthesis reactions by stray light and minimizing and/or eliminating polymer sequence errors caused by stray light. In some embodiments, the internal surface of the reaction chamber comprises a material 660 that allows 365 nm light to pass through efficiently (e.g., SiO$_2$ (fused quartz)) or a material 660 that absorbs 365 nm light efficiently (e.g., glass comprising sufficient impurities that absorb 365 nm light (e.g., metal oxide glass or other compositions known to those skilled in the art)). Alternatively, or additionally, in some embodiments, the liquid present in the reaction chamber during the photo-deprotection step comprises a material in suspension or in solution that absorbs 365 nm light. In some embodiments, the amount of light-absorbing material is titrated to allow sufficient light emitted from the micro-LED to illuminate the molecules on its surface and to be effectively absorbed before traveling far enough to illuminate molecules on adjacent pixels. While, in some embodiments described herein, the technology comprises use of light having a wavelength of 365 nm, the technology is not limited to light of this wavelength and encompasses embodiments comprising use of light of other wavelengths as discussed herein. In addition, the technology provides materials that absorb, reflect, and/or transmit light of the wavelength or range of wavelengths used for the polymer synthesis technology and/or for other aspects of the array technologies described herein.

In some embodiments, the technology provides methods for synthesizing a polymer array (e.g., an oligonucleotide array) on a micro-LED surface. For example, FIGS. 15-17 provide an illustrative embodiment comprising a series of consecutive steps to provide a photochemical synthesis of a set of DNA oligonucleotides on three adjacent light-emitting areas (pixels) 700, 710, 720 on the surface of a micro-LED array. All three pixels 700, 710, 720 are associated with a separate, independently addressable micro-LED unit, configured as shown in FIG. 14. The micro-LED device within each micro-LED unit comprises GaN designed to emit ultraviolet light with a wavelength of 365 nm. In this embodiment, the surface of the micro-LED array is functionalized with an application of N-(3-triethoxysilylpropyl)-4-hydroxybutyramide to produce a surface densely covered with hydroxyl groups. The hydroxyl groups are then coupled to a 5-base thymine linker molecule comprising a 5' hydroxyl group protected by the photolabile protecting group 2-(2-nitrophenyl)-propoxycarbonyl (NPPOC) 730. NPPOC is photolabile, e.g., by exposure to ultraviolet light with a wavelength of 365 nm. In some embodiments, other photolabile protecting groups are used with phosphoramidite chemistry, including but not limited to: thiophenyl-2-(2-nitrophenyl)-propoxycarbonyl (SPh-NPPOC), 5'-(α-methyl-2-nitropiperonyl)oxycarbonyl (MeNPOC), and dimethoxybenzoincarbonate (DMBOC). In some embodiments, DNA oligonucleotide synthesis is carried out in the 3' to 5' direction (opposite to natural enzymatic DNA synthesis) so that the completed DNA oligonucleotides are attached to the microarray by the 3' end. In other embodiments, DNA oligonucleotide synthesis is carried out in the 5' to 3' direction so that the completed DNA oligonucleotides are attached to the microarray by the 3' end. The resulting micro-LED array is shown in FIG. 15.

In an exemplary and non-limiting embodiment, FIG. 16 demonstrates the selective incorporation of a guanine (G) nucleotide as the first component of the DNA oligonucleotide specified for synthesis on pixel 710. First, in FIG. 16A, pixel 710 is activated to emit 365-nm light rays 270 that contact and remove the photolabile NPPOC groups on the surface of pixel 710, exposing (deprotecting) the associated hydroxyl groups on the linkers located there 750. Deprotection does not occur on the surface of pixels 700 or 720, or in the regions between pixels, where the linkers remain protected 730, 740. In some embodiments, the intensity and duration of the illumination that provides sufficient (e.g., effectively total and/or maximal) deprotection of a pixel is determined by conducting experiments with the same configuration of the system and formulation of reagents. In some embodiments, an optional wash step (not shown) is performed (e.g., after the deprotection step) to prepare the surface of the micro-LED array for subsequent steps.

In FIG. 16B, guanine (G) nucleotides are incorporated by flowing an appropriate fluid containing NPPOC-protected guanine nucleoside phosphoramidites 760 over the surface of the micro-LED array. The NPPOC-protected G-phosphoramidites couple only with the de-protected hydroxyl groups on linkers contacted by the NPPOC-protected G-phosphoramidites on the surface of pixel 710. Incorporation does not occur where linkers remain protected. Reactive hydroxyl groups on the 5' ends of the newly-incorporated guanine nucleosides 770 are protected by NPPOC groups that were previously attached (e.g., during original synthesis of nucleotides), thus preventing uncontrolled homopolymer formation. In some embodiments, an optional capping step (not shown) is performed to inactivate unreacted nucleoside phosphoramidites. In some embodiments, an optional wash step (not shown) prepares the surface of the micro-LED array for a subsequent step or subsequent cycle.

FIG. 17 demonstrates the simultaneous incorporation of a thymine (T) nucleotide as the second component of the DNA oligonucleotide specified for synthesis on pixel 710 and the first component of the DNA oligonucleotide specified for synthesis on pixel 720. First, in FIG. 17A, the micro-LEDs underlying pixels 710 and 720 are both activated to emit light rays 270 and effect de-protection of the illuminated linkers 790, 780. In some embodiments, an optional wash step (not shown) is performed to prepare the surface of the micro-LED array for subsequent steps. In FIG. 17B, thymine (T) nucleotides are incorporated by flowing an appropriate fluid comprising NPPOC-protected thymine nucleoside phosphoramidites 800 over the surface of the micro-LED array. The NPPOC-protected T-phosphoramidites couple only with the de-protected hydroxyl groups on linkers contacted within pixels 710 and 720, respectively, but not within pixel 700 or in the regions between pixels. In some embodiments, an optional capping step (not shown) is performed to inactivate unreacted nucleoside phosphoramidites. In some embodiments, an optional wash step (not shown) prepares the surface of the micro-LED array for a subsequent step or subsequent cycle.

As used herein, a "synthesis cycle" refers to the series of steps (e.g., an ordered series of steps in some embodiments) performed to add an individual component to a growing polymer. In some embodiments, e.g., as shown in FIG. 15 to FIG. 17 for in situ synthesis of DNA oligonucleotides, a cycle minimally comprises: (a) photo-deprotection; (b) optionally washing the array; (c) coupling of the new nucleotide; (d) optionally capping unreacted nucleosides; and (e) optionally washing the array. In some embodiments, an optional drying step is performed (e.g., prior to the photo-deprotection step of a synthesis cycle) to increase the efficiency of deprotection. In some embodiments, the optional drying step comprises flowing an inert gas, e.g. helium or argon, through the flow-cell and over the surface of the microarray (e.g., until it is dry). In some embodiments, a nucleophilic activator is added to the phosphoramidite-containing liquid before it enters the reaction chamber to activate the nucleoside phosphoramidites prior to coupling with de-protected hydroxyl groups on the surface of the micro-LED array. In some embodiments, the nucleophilic activator is 4,5-dicyanoimidazole (DCI). In some embodiments, an oxidation step is performed after the final synthesis cycle to remove remaining non-photolabile base-protecting groups from components of the completed polymer. In some embodiments, the oxidation solution used in the oxidation step is a mixture of tetrahydrofuran, water, pyridine, and iodine. In other embodiments, an oxidation step may optionally be included within one or more synthesis cycles prior to completion of the final synthesis cycle. It is to be appreciated that a range of incubation times, exposure times, reagent compositions, reagent concentrations, and reagent volumes can be successfully utilized within different embodiments of the technology. In some embodiments, the number of cycles performed is determined by the number of components that are added to synthesize the desired polymers on the array. For instance, in an exemplary embodiment, FIG. 16 depicts a first cycle and FIG. 17 depicts a second cycle.

In some embodiments, e.g., as shown in FIG. 15 to FIG. 17, methods comprise incorporating individual monomers into heteropolymers during the coupling step of each synthesis cycle. The technology is not limited to incorporating monomers and, accordingly, in some embodiments, the technology comprises incorporating dimers, trimers, or larger oligomers (e.g., n-mers where n is, e.g., 2 to 20 (e.g., 2, 3, 4, 5, 6, 7, 8, 9, 10, 11, 12, 13, 14, 15, 16, 17, 18, 19, or 20)) into polymers during the coupling step of a single synthesis cycle. In some embodiments, a mixture of components is provided to the deprotected linkers or polymers during the coupling step of a single synthesis cycle, e.g., so that they insert randomly (e.g., to increase polymer and/or heteropolymer diversity). It is to be appreciated that the technology comprises embodiments in which synthesis of a polymer microarray combines elements of different embodiments, for example, incorporating monomers in some synthesis cycles, oligomers in other cycles, and mixed monomers in still other cycles, or any combination desired. It is to be further appreciated that in some embodiments, a polymer microarray synthesized according to the present technology uses micro-LED photo-deprotection to control the spatially selective incorporation of different components in some synthesis steps or cycles and uses electrochemical or chemical or other forms of deprotection to control the incorporation of polymer and/or heteropolymer components in other synthesis steps or cycles.

In some embodiments, the technology provides methods for synthesizing a polymer array (e.g., an oligopeptide array) on a micro-LED surface. For example, in some embodiments, the technology finds use in synthesizing oligopeptide microarrays as illustrated in FIG. 18 to FIG. 20. In FIG. 18, three adjacent pixels 830, 840, and 850 are shown on the surface of a micro-LED array. All three pixels 830, 840, 850 are associated with a separate, independently addressable micro-LED unit (e.g., configured as shown in FIG. 14) and the micro-LED device within each micro-LED unit comprises GaN designed to emit ultraviolet light with a wavelength of 365 nm. In some embodiments, the surface of the micro-LED array is first treated with 3-aminopropyldimethylethoxysilane to provide a surface comprising amine functional groups. In some embodiments, the amine groups are coupled to NPPOC-protected 6-aminocaproic acid linkers, where NPPOC is blocking an amine group on the linker 860. An embodiment of the resulting micro-LED array is shown in FIG. 18.

In an exemplary and non-limiting embodiment, FIG. 19 demonstrates the selective incorporation of an arginine (R) amino acid as the first component of the peptide specified for synthesis on pixel 840. First, in FIG. 19A, the micro-LED associated with pixel 840 is activated to emit 365-nm light rays 270 that contact and remove the photolabile NPPOC groups they encounter on the surface of pixel 840, exposing the associated amine groups on the linkers located there 880. Deprotection does not occur on the surface of pixels 830 or 850, or in the regions between pixels, where the linkers remain protected 860, 870. In some embodiments, an optional wash step (not shown) is performed to prepare the surface of the micro-LED array subsequent steps. In FIG. 19B, arginine (R) amino acids are incorporated by flowing an appropriate fluid containing NPPOC-protected arginine amino acids 890 over the surface of the micro-LED array. The NPPOC-protected arginines couple only with the de-protected amine groups on linkers contacted by the NPPOC-protected arginines on the surface of pixel 840. Incorporation does not occur where linkers remain protected. Reactive amine groups on the newly-incorporated arginines 900 are protected by NPPOC groups which were previously attached (e.g., during original synthesis of amino acids), thus preventing uncontrolled homopolymer formation. In some embodiments, the technology comprises use of NPPOC-protected amino acids, e.g., as described in U.S. Pat. App. Pub. No. 2005/0101763, incorporated herein by reference. In some embodiments, an optional capping step (not shown) is performed to inactivate unreacted amino acids. In some embodiments, an optional wash step (not shown) prepares the surface of the micro-LED array for a subsequent step or subsequent cycle.

FIG. 20 demonstrates the simultaneous incorporation of a lysine (K) amino acid as the second component of the peptide specified for synthesis on pixel 840 and the first component of the peptide specified for synthesis on pixel 850. First, in FIG. 20A, the micro-LEDs underlying pixels 840 and 850 are both activated to emit light rays 270 and effect de-protection of the illuminated linkers 920, 910. In some embodiments, an optional wash step (not shown) is performed to prepare the surface of the micro-LED array for a subsequent step or subsequent cycle. In FIG. 20B, lysine (K) amino acids are incorporated by flowing an appropriate fluid comprising NPPOC-protected arginine amino acids 890 over the surface of the micro-LED array. The NPPOC-protected arginines couple only with the de-protected amine groups on linkers contacted by NPPOC-protected arginines within pixels 840 and 850, respectively, but not within pixel 830 or in the regions between pixels. In some embodiments, an optional capping step (not shown) is performed to inactivate unreacted amino acids. In some embodiments, an optional wash step (not shown) prepares the surface of the micro-LED array for a subsequent step or subsequent cycle. In some embodiments, an optional drying step is performed (e.g., prior to the photo-deprotection step of a synthesis cycle). In some embodiments, a nucleophilic activator is added to the phosphoramidite-containing liquid before it enters the reaction chamber to activate the nucleoside phosphoramidites prior to coupling with de-protected hydroxyl groups on the surface of the micro-LED array. In some embodiments, an oxidation step is performed after the final synthesis cycle to remove remaining non-photolabile base-protecting groups from components of the completed polymer. In other embodiments, an oxidation step may optionally be included within one or more synthesis cycles prior to completion of the final synthesis cycle.

As described herein, the reduction in length and complexity of the light path between light source and polymer synthesis minimizes and/or eliminates scattered light (e.g., from one or multiple sources) in the present technology. In some embodiments, the technology provides additional features and/or steps to minimize and/or eliminate stray light.

For example, in some embodiments, most of the light that is emitted from the surface 280 of a micro-LED pixel is absorbed 960 or conducted away from the reaction chamber by the material layer 660 located opposite to the light-emitting surface of the micro-LED array (FIG. 21). Nevertheless, some light is back-reflected 965 or redirected by scattering within the liquid 970 (e.g., by Rayleigh scattering) back toward the surface of the microarray where it can cause the undesired removal of protecting groups from the surfaces of other features 290 and cause sequence insertions. The mechanism of back-reflection within flow-cells has been demonstrated to occur in other maskless photolithography synthesis systems to a level of approximately 0.25% even where broadband anti-reflection (BBAR) UV coatings have been applied to surfaces (see, e.g., Agbavwe C, Kim C, Hong D, Heinrich K, Wang T, Somoza M M. Efficiency, error and yield in light-directed maskless synthesis of DNA microarrays. J Nanobiotechnology. 2011 Dec. 8; 9:57, incorporated herein by reference). Accordingly, some embodiments of the technology provided herein hinder and/or prevent this remaining stray light from reducing the quality of the polymer microarrays using "light quenching", which is not employed by previous methods of producing polymer and/or heteropolymer microarrays using in situ polymer photosynthesis.

As described herein, the technology provides methods for producing polymer arrays using a substrate that is much closer to light sources that in previous technologies. Accordingly, photons emitted from a micro-LED travel a minimal distance to deprotect polymers on its own integrated surface. DNA monomers, for example, are about 0.34 nm in length. Thus, the terminal protecting group for the final synthesis cycle of a 100-mer DNA oligonucleotide might be approximately 34 nm distant from the surface of the micro-LED, discounting a few nanometers for a potential linker molecule and assuming the oligonucleotide is stretched perpendicularly to the surface of the micro-LED. Conversely, stray light traveling the shortest possible distance to the surface of a neighboring pixel, assuming a pixel width of 3 μm and a pixel gap of only 2 μm (the current state-of-the-art in micro-LED technology), would travel 59 times as far to reach the closest polymers on the adjacent pixel and 147 times as far to reach the most distant polymers on the adjacent pixel. Realistically, most stray light would need to travel a much greater distance than that to reach protecting groups on the polymers of a neighboring pixel. In some embodiments, the present technology comprises providing "light quencher" molecules in the reaction chamber solution, e.g., at a concentration empirically determined to allow light emitted from a micro-LED to deprotect molecules on its own surface (e.g., at its own pixel) during the deprotection step of synthesis and to intercept any stray light before it reaches other pixels.

In some embodiments, e.g., as shown in FIG. 22, the technology provides a process of light quenching. As shown in FIG. 22, some of the 365-nm light emitted from a micro-LED strikes photolabile NPPOC groups on heteropolymers at the surface of the pixel and removes them 977, leaving NPPOC groups on heteropolymers between pixels 975 untouched. In some embodiments, the remaining 365-nm photons 985 are absorbed by light quencher molecules 980 before they travel much further (e.g., to neighboring pixels) as stray light. In some embodiments, the light quencher molecules subsequently emit photons of a longer wavelength 990 that cannot cleave NPPOC groups should they encounter them. In some embodiments, e.g., as shown in FIG. 22, the light quencher 980 is anthracene, which absorbs light below approximately 390 nm and emits it above approximately 370 nm (the absorption and emission spectra overlap slightly though the peaks are distinct). While the technology is described in reference to an exemplary embodiment comprising use of anthracene as a quencher, the technology is not limited to such embodiments. Accordingly, embodiments comprise use of other materials that absorb and emit at appropriate wavelengths and that are compatible with the reagents used in the technology described. For example, in some embodiments, the technology comprises use of a quencher that is 9,10-diphenylanthracene; 1,4,5,8-naphthalenetetracarboxylic dianhydride (NTCDA); phenazine; and others (see, e.g., Taniguchi M, Lindsey J S. Database of Absorption and Fluorescence Spectra of >300 Common Compounds for use in PhotochemCAD. Photochem Photobiol. 2018 March; 94(2):290-327, incorporated herein by reference). In some embodiments of the technology comprising use of a light quencher as described, sequence errors are reduced (e.g., to a number of sequence errors than is lower than 10% of the number of sequence errors that occur in the absence of the light quencher). This reduction supplements the reduction in sequence errors provided by the shortened and simplified light path described herein (e.g., to a number of sequence errors that is lower than 10% of the number of sequence errors that occur for previous technologies). Together, the present technology provides embodiments in which polymers (e.g., oligonucleotides) are synthesized with a sequence error rate that is less than 1% (e.g., less than 0.010, 0.0095, 0.0090, 0.0085, 0.0080, 0.0075, 0.0070, 0.0065, 0.0060, 0.0005, 0.0004, 0.0003, 0.0002, or 0.0001) of the number of sequence errors that occur for previous technologies. These improvements, which provide important emerging applications that benefit from high sequence fidelity, such as artificial gene synthesis and DNA data storage, are not possible using other methods of in situ photosynthesis to produce polymer microarrays.

As described herein, the technology provides microarrays comprising a component that integrates the reaction substrate with a light source for controlling the synthesis of polymers on the reaction substrate. In contrast to previous technologies, the distance from the light source to the photo-deprotectable moiety on the polymer is less than 200 nm (e.g., less than 200, 195, 190, 185, 180, 175, 170, 165, 160, 155, 150, 145, 140, 135, 130, 125, 120, 115, 110, 105, 100, 95, 90, 85, 80, 75, 70, 65, 60, 55, 50, 45, 40, 35, 30, 25, 20, 15, 10, or 5 nm). This technology provides embodiments of microarrays comprising increased feature density, increased feature diversity, decreased feature size, decreased array size (e.g., length and width), and decreased sequence errors relative to previous microarrays. In some embodiments, the technology provides a microarray comprising 100,000 or more features (e.g., $1.0 \times 10^5$, $1.5 \times 10^5$, $2.0 \times 10^5$, $2.5 \times 10^5$, $3.0 \times 10^5$, $3.5 \times 10^5$, $4.0 \times 10^5$, $4.5 \times 10^5$, $5.0 \times 10^5$, $5.5 \times 10^5$, $6.0 \times 10^5$, $6.5 \times 10^5$, $7.0 \times 10^5$, $7.5 \times 10^5$, $8.0 \times 10^5$, $8.5 \times 10^5$, $9.0 \times 10^5$, $9.5 \times 10^5$, or $1 \times 10^6$ features), which addresses approximately 75% of current market needs. In some embodiments, the technology provides a microarray comprising 1,000,000 or more features (e.g., $1.0 \times 10^6$, $1.5 \times 10^6$, $2.0 \times 10^6$, $2.5 \times 10^6$, $3.0 \times 10^6$, $3.5 \times 10^6$, $4.0 \times 10^6$, $4.5 \times 10^6$, or $5.0 \times 10^6$ features), which addresses approximately 95% of current market needs. In some embodiments, the technology provides a microarray comprising at least 5,000,000 features (e.g., $5.0 \times 10^6$, $5.5 \times 10^6$, $6.0 \times 10^6$, $6.5 \times 10^6$, $7.0 \times 10^6$, $7.5 \times 10^6$, $8.0 \times 10^6$, $8.5 \times 10^6$, $9.0 \times 10^6$, $9.5 \times 10^6$, $1 \times 10^7$, $1 \times 10^8$, $1 \times 10^9$, or more features). In some embodiments, a microarray comprising at least 5,000,000 features provides applications related to, e.g., DNA data storage and drug discovery using combinatorial library screening.

In some embodiments, the microarrays provided herein provide a higher feature density than previous technologies. High-feature-density permits the physical dimensions of the microarray to remain small while meeting the needs of existing and future applications. In some embodiments, the technology provides a low density microarray (e.g., comprising 1,000 features/cm² or less (e.g., 1000, 950, 900, 850, 800, 750, 700, 650, 600, 550, 500, 450, 400, 350, 300, 250, 200, 150, 100, 50, 45, 40, 35, 30, 25, 20, or 10 features/cm²)). In some embodiments, the technology provides a high density microarray (e.g., comprising at least 100,000; 200,000; or 300,000 features/cm² (e.g., at least 100,000 to 5,000,000 features/cm² (e.g., $1.0 \times 10^5$, $1.5 \times 10^5$, $2.0 \times 10^5$, $2.5 \times 10^5$, $3.0 \times 10^5$, $3.5 \times 10^5$, $4.0 \times 10^5$, $4.5 \times 10^5$, $5.0 \times 10^5$, $5.5 \times 10^5$, $6.0 \times 10^5$, $6.5 \times 10^5$, $7.0 \times 10^5$, $7.5 \times 10^5$, $8.0 \times 10^5$, $8.5 \times 10^5$, $9.0 \times 10^5$, $9.5 \times 10^5$, $1 \times 10^6$, $1.5 \times 10^6$, $2.0 \times 10^6$, $2.5 \times 10^6$, $3.0 \times 10^6$, $3.5 \times 10^6$, $4.0 \times 10^6$, $4.5 \times 10^6$, or $5.0 \times 10^6$ features/cm²)). Micro-LED array technologies that are appropriate to produce microarrays at a density in this range (e.g., 100,000 to 300,000 features/cm²) have been produced (see, e.g., Templier F, Dupré L, Dupont B, Daami A, Aventurier B, Henry F, Sarrasin D, Renet S, Berger F, Olivier F, Mathieu L. High-resolution active-matrix 10-μm pixel-pitch GaN LED microdisplays for augmented reality applications. Proc. SPIE 10556, Advances in Display Technologies VIII; 2018 February, incorporated herein by reference).

In some embodiments, the microarrays provided by the technology described herein have reduced or no sequence errors. In general, sequence errors are related both to coupling efficiency and stray light artifacts. Coupling efficiencies less than 100% produce deletions in the sequence of synthesized polymers, while stray light produces insertions in the sequence of synthesized polymers. The present technology provides coupling efficiencies of greater than 99% per cycle, which is beyond the capability of existing methods of in situ maskless photolithographic synthesis which are estimated at 98.5% (see, e.g., Agbavwe C, Kim C, Hong D, Heinrich K, Wang T, Somoza M M. Efficiency, error and yield in light-directed maskless synthesis of DNA microarrays. J Nanobiotechnology. 2011 Dec. 8; 9:57, incorporated herein by reference).

Furthermore, the present technology reduces stray light on inactive features adjacent to active features to below approximately 0.1% of normal incident light (e.g., light measured at the active pixel). In contrast, existing in situ photolithographic synthesis methods exhibit greater than about 0.25%. Stray light is partially dependent on the contrast ratio of the optical system employed for photodeprotection. Contrast ratio is generally defined as the ratio of the luminance of the brightest emission to the darkest region (e.g. non-emission) that a system can produce. The estimated contrast ratio of a maskless array synthesis instrument utilizing digital micromirror technology has been estimated at approximately 400, which is predicted to generate 20-mer DNA oligos that are only 36% correct in sequence (see, e.g., Garland P B, Serafinowski P J. Effects of stray light on the fidelity of photodirected oligonucleotide array synthesis. Nucleic Acids Res. 2002 Oct. 1; 30(19):e99, incorporated herein by reference), corresponding to approximately 1 error per 30 bases synthesized. The contrast ratio of micro-LED displays is generally estimated at approximately 10,000, which, in embodiments of the present technology, provides for the synthesis of, e.g., 20-mer DNA oligos that are >96% correct in sequence, corresponding to approximately 1 error per 500 bases synthesized. This decrease in the sequence error rate provides a significant improvement (e.g., approximately 17-fold) over the error rate of existing maskless array synthesis technologies. Error rates in peptide synthesis are more difficult to measure than error rates in DNA synthesis because equivalent sequencing technologies do not exist, however, similar benefits in polymer quality are expected to apply to peptides and other types of polymers synthesized on microarrays using the technology.

Embodiments provide a manufacturing method for producing custom-designed microarrays without penalties for small lot sizes. Microarray synthesis methods employing static photomasks are not economically advantageous for small lot sizes due to the cost of producing the masks used for each synthesis cycle. In some embodiments, the technology provides a method of producing a microarray having a cost to produce a single polymer microarray with custom-defined content that is less than 1.5 times the cost of producing a batch (e.g., 10 or more) of the same microarray. The cost of producing a single polymer microarray with custom-defined content using a static photomasking method is estimated to be at least 10-fold greater than the cost of producing a batch of the same microarray.

Furthermore, the technology provides a scalable manufacturing method of producing microarrays. As used herein, the term "scalability" refers to meeting growing demand for manufacturing products based on the technology without requiring considerable additional marginal investment in infrastructure (e.g., space, instrument cost, etc.) as demand increases, or reducing the turnaround time for custom orders In some embodiments, the present technology provides the simultaneous advantages of high feature number (e.g., at least 100,000; 1,000,000; or 5,000,000 features), high feature density (e.g., at least 100,000 to 300,000 features/cm$^2$ or more), minimal or no sequence errors, economically feasible customizability at both large and small lot sizes, and scalability, each of which is discussed above. Photolithography approaches provide technologies for producing very high-feature-number and high-feature-density due to the intrinsically high spatial resolution of light used to direct the photochemical reactions. Maskless versions of photolithography approaches further provide increased capability to produce custom-defined content without penalties for small lot sizes because, in contrast to photolithography technologies that use expensive static masks, maskless photolithography technologies can produce two microarrays comprising different sets of (hetero) polymers for the same material costs as two microarrays comprising the same set of (hetero) polymers.

The present technologies improve maskless photolithography technologies by reducing sequence errors caused by stray light without sacrificing the other capabilities. In particular, synthesizing polymers directly on the surface of micro-LED arrays as described herein provides several advantages over prior solutions. For example, synthesizing polymers directly on the light-emitting surface of the light source uses light that travels essentially zero distance from the light source to the site of synthesis of the polymers anchored to the light-emitting surface itself. Prior technologies use light that travels to a distant synthesis site using mirrors (e.g., sometimes several mirrors), lenses, and filters. Every tiny imperfection encountered in any one of these optical elements, every edge of an element (particularly problematic for approaches using digital micromirrors), and every particle of dust encountered on that longer light-path increases the risk that a photon will be scattered and miss its intended target, causing unintended chemical activity (e.g., deprotection) where it does impact and consequently producing sequence errors in those polymers. Even low levels of sequence errors in polymers reduce their utility for many desirable applications and limit the length of polymers that can be synthesized without accumulating substantial errors.

The present technology provides the advantage of using a synthetic surface integrated with the light source, e.g., by providing a micro-LED comprising a synthesis substrate, which minimizes stray light without sacrificing other important microarray capabilities. The primary applications for micro-LED arrays are in consumer electronics displays and development of that technology is similarly driven to achieve high-feature-number and high-feature-density. For example, micro-LED arrays comprising 640×480 pixels, each 12 microns in diameter with 15 micron spacing, and using CMOS circuitry were demonstrated in 2011. While several years old, these parameters are competitive with prior polymer and/or heteropolymer microarray technologies. More recently, micro-LED features as small as 2 microns in diameter have been demonstrated reproducibly, which is smaller than any feature yet attained by any previous practical polymer and/or heteropolymer microarray technology. Because the pixels on micro-LED arrays are independently addressable, they are fully capable of supporting custom-defined designs without incurring increased costs. Avoiding use of expensive mirrors, lenses, and filters provides the present technology to be more easily scalable than previous technologies. LED light sources provide advantages over other types of light sources, e.g., mercury arc lamps typically used a UV lighting source in previous technologies. In particular, LED light sources are easier to use, environmentally safer, more efficient than mercury arc lamps, and capable of emitting a much wider range of wavelengths that can better match the requirements of the chemical reagents used in the photo-deprotection process.

In some embodiments, the technology provides a microarray comprising a plurality of polymers and/or heteropolymers (e.g., organic polymers (e.g., biomolecular polymers (e.g., oligonucleotides, oligopeptides, etc.))) attached to its surface and further comprising an integrated micro-LED array, e.g., that provides an array of addressable and controllable light sources. Thus, in some embodiments, each polymer on the surface of the microarray can be illuminated by light provided by a micro-LED pixel associated with the polymer. In some embodiments, the micro-LED array functions as an array of light detectors. Accordingly, in some embodiments, the technology provides a microarray comprising a plurality of polymers and/or heteropolymers (e.g., organic polymers (e.g., biomolecular polymers (e.g., oligo-nucleotides, oligopeptides, etc.))) attached to its surface and further comprising an integrated micro-LED array, e.g., that provides an array of addressable and controllable light detectors. In some embodiments, the micro-LED array functions as an array of light detectors and as an array of light sources. Accordingly, in some embodiments, the technology provides a microarray comprising a plurality of polymers and/or heteropolymers (e.g., organic polymers (e.g., biomolecular polymers (e.g., oligonucleotides, oligopeptides, etc.))) attached to its surface and further comprising an integrated micro-LED array, e.g., that provides an array of addressable and controllable light detectors and an array of addressable and controllable light detectors.

In some embodiments, a polymer of the microarray binds an analyte (e.g., a small molecule, a polymer (e.g., an organic polymer (e.g., a biomolecular polymer (e.g., an oligonucleotide, an oligopeptide, etc.)))), or an antibody to form a polymer-analyte complex (e.g., comprising the analyte bound to the polymer of the microarray). Accordingly, in some embodiments, the technology provides for the addressable illumination of a polymer-analyte complex. In some embodiments, a microarray polymer comprises a detectable label (e.g., a light activatable detectable label). In some embodiments, an analyte comprises a detectable label (e.g., a light activatable detectable label). In some embodiments, a microarray polymer comprises a fluorescent label. In some embodiments, an analyte comprises a fluorescent label. In some embodiments, the technology comprises fluorescence detection of an analyte and/or measuring the interaction of a microarray polymer and an analyte, e.g., using Forster resonance energy transfer (FRET) and/or fluorescence resonance energy transfer (FRET) to measure energy transfer between a fluorescent label of the polymer and a fluorescent label of the analyte. In some embodiments, a polymer of a microarray comprises a detectable label (e.g., a light activatable detectable label) and an analyte comprises a quencher. In some embodiments, an analyte comprises a detectable label (e.g., a light activatable detectable label) and a polymer of the microarray comprises a quencher. In some embodiments, the technology comprises detection of an analyte and/or measuring the interaction of a microarray polymer and an analyte, e.g., using quenching between a fluorescent label of the polymer and a fluorescent label of the analyte.

The technology is not limited in the type, structure, or composition of the fluorescent moiety. Non-limiting examples of fluorescent moieties include dyes that can be synthesized or obtained commercially (e.g., Operon Biotechnologies, Huntsville, Ala.). A large number of dyes is available for application in fluorescence excitation applications. These dyes include those from the fluorescein, rhodamine, AlexaFluor, Bodipy, Coumarin, and Cyanine dye families. Specific examples of fluorophores include, but are not limited to, FAM, TET, HEX, Cy3, TMR, ROX, VIC (e.g., from Life Technologies), Texas red, LC red 640, Cy5, and LC red 705. In some embodiments, the label is a fluorescently detectable moiety as described in, e.g., Haugland (September 2005) MOLECULAR PROBES HANDBOOK OF FLUORESCENT PROBES AND RESEARCH CHEMICALS (10th ed.), which is herein incorporated by reference in its entirety. In some embodiments the label (e.g., a fluorescently detectable label) is one available from ATTO-TEC GmbH (Am Eichenhang 50, 57076 Siegen, Germany), e.g., as described in U.S. Pat. Appl. Pub. Nos. 20110223677, 20110190486, 20110172420, 20060179585, and 20030003486; and in U.S. Pat. No. 7,935,822, each of which is incorporated herein by reference. In some embodiments, dyes with emission maxima from 410 nm (e.g., Cascade Blue) to 775 nm (e.g., Alexa Fluor 750) are available and can be used. Of course, one of ordinary skill in the art will recognize that dyes having emission maxima outside these ranges may be used as well. In some cases, dyes ranging between 500 nm to 700 nm have the advantage of being in the visible spectrum and can be detected using existing visible detection systems. In some embodiments, the broad range of available dyes allows selection of dye sets that have emission wavelengths that are spread across the detection range. Detection systems capable of distinguishing many dyes are known in the art.

Further, the technology is not limited in the type, structure, or composition of the quenching moiety. Exemplary quenching moieties include a Black Hole Quencher, an Iowa Black Quencher, and derivatives, modifications thereof, and related moieties. Exemplary quenching moieties include BHQ-0, BHQ-1, BHQ-2, and BHQ-3. Some exemplary fluorophore-quencher pairs include FAM and BHQ-1, TET and BHQ-1, JOE and BHQ-1, HEX and BHQ-1, Cy3 and BHQ-2, TAMRA and BHQ-2, ROX and BHQ-2, Cy5 and BHQ-3, Cy5.5 and BHQ-3, FAM and BHQ-1, TET and BHQ-1, JOE and 3'-BHQ-1, HEX and BHQ-1, Cy3 and BHQ-2, TAMRA and BHQ-2, ROX and BHQ-2, Cy5 and BHQ-3, Cy5.5 and BHQ-3, or similar fluorophore-quencher pairs available from the commercial entities such as Biosearch Technologies, Inc. of Novato, Calif.

In some embodiments, a polymer of a microarray provided herein comprises a photoactivatable cross-linking moiety. In some embodiments, an analyte (e.g., that interacts with a polymer of a microarray provided herein) comprises a photoactivatable cross-linking moiety. Accordingly, embodiments provide a technology to photo-cross-link an analyte and a polymer of a microarray using the integrated, addressable light of the micro-LED array.

Some embodiments of the technology provided herein further comprise functionalities for collecting, storing, and/or analyzing data. For example, in some embodiments, the technology (e.g., a system) comprises a processor, a memory, and/or a database for, e.g., storing and executing instructions, analyzing data, performing calculations using the data, transforming the data, and storing the data. Moreover, in some embodiments a processor is configured to control the synthesis of polymers on the surface of a micro-LED array. In some embodiments, a processor is configured to control illumination of a polymer and/or an analyte bound to a polymer at a pixel of a microarray as described herein. In some embodiments, a processor is configured to detect and/or record illumination produced by a polymer and/or an analyte bound to a polymer at a pixel of a microarray as described herein.

In some embodiments, the processor is used to initiate and/or terminate the measurement and data collection. In some embodiments, the technology comprises a user interface (e.g., a keyboard, buttons, dials, switches, and the like) for receiving user input that is used by the processor to control synthesis of polymers of an array and/or to direct or record a measurement. In some embodiments, the technology further comprises a data output for transmitting data to an external destination, e.g., a computer, a display, a network, and/or an external storage medium.

The technology finds use in a wide range of fields. For example, embodiments of the technology find use in research and clinical settings within the fields of medicine and biotechnology. In some embodiments, the technology finds use in combinatorial chemistry and in polymer/heteropolymer synthesis. Particular applications include, but are not limited to, biological research, medical diagnostics, drug discovery, applied agricultural biology, materials science, nanoconstruction, biological computing, and molecular data storage (e.g. DNA data storage).

In summary, the synthesis of polymer microarrays directly on the surface of micro-LED arrays provides a technology for simultaneously meeting many desirable technical attributes for microarrays discussed herein. This advantage over prior solutions is made more compelling considering that micro-LED array technology itself is advancing at a rapid pace as it strives to meet the demands of the consumer electronics market. It can be reasonably expected that as the technical capabilities of micro-LEDs increase and manufacturing costs drop, polymer microarrays synthesized directly on the surface of micro-LED arrays will continue to advance in lockstep and perhaps enable applications that are not anticipated today.

EXAMPLES

During the development of embodiments of the technology provided herein, experiments were conducted to test and/or verify the technology described herein. In particular, data were collected during the experiments to test devices, systems, and methods for synthesizing heteropolymer molecules directly on the light-emitting surface of an LED. The experiments validated key features of the technology described herein. First, data collected from the experiments indicated successful synthesis of a polymer on a substrate (e.g., the surface of the LED) that is integrated into a component comprising an LED. Accordingly, the component comprising the LED and the integrated substrate comprises a substrate that is inseparable from the LED by design. Second, data collected from the experiments indicated successful synthesis of a polymer using light emitted from the LED. Accordingly, the data indicated that light emitted from the LED alone is sufficient to drive the photochemical synthesis of polymers on the substrate surface integrated into the component comprising the LED.

Furthermore, experiments conducted during the development of the technology provided herein indicated that light from the LED can be used in subsequent assays using the synthesized polymer to detect the specific binding of a ligand to polymers synthesized on the surface of the component comprising the LED and integrated substrate. The experiments described here represent only one possible embodiment of the technology and one of ordinary skill in the art understands that many other embodiments are possible.

Materials and Methods

Fluidics Apparatus

The single-LED flow-cell was custom fabricated by 3M (Advanced Materials Division, St. Paul, Minn.) using additive manufacturing (3D-printing) with PTFE (Teflon) to provide broad physical and chemical resistance for photochemical polymer synthesis. The external dimensions of the flow-cell were: length (37 mm), width (8 mm), height (12 mm). The dimensions of the reaction chamber within the flow-cell were: length (2.7 mm), width (1.8 mm), height (0.5 mm) for a calculated volume of 2.4 μL and a surface area of 0.0486 cm². The 4-LED array flow-cell, external length (35 mm), width (18 mm), height (5.4 mm), was fabricated from EPX using 3D-printing (Midwest Prototyping, Blue Mounds, Wis.). Reagents were dispensed from 5-mL V-Vials (Wheaton), 22-mL amber glass vials (Millipore-Sigma), or 60-mL amber glass bottles (Millipore-Sigma), depending on the volumes required, via PFA tubing (1/16" O.D., IDEX) inserted into the bottom of the vials/bottles through PTFE/silicone septa phenolic hole caps. Flangeless fittings, nuts, and ferrules (IDEX) were used to connect the tubing to the manual switching valves: 6-way switching valve (V-241, IDEX); 4-way valve (V-101L, IDEX). High purity argon gas (<3 ppm H₂O, Airgas USA) flow was regulated using an initial stage gas pressure regulator (0-15 psi, Harris 425-15-580) with subsequent inline gas pressure regulators (0-5 psi, 41795K2, McMaster-Carr). The negative pressure used to control liquid reagent flow from the reagent bottles to the flow-cell was provided by a MINIPULS 3 variable speed peristaltic pump (Gilson) using Iso-Versinic tubing, 2.0 mm I.D. (Gilson).

LED and Power Supply

Type TO-46 LEDs (UVLED365-110E, 365 nm wavelength, Rank 6) were obtained from Roithner Lasertechnik. These LEDs are cylindrical (4.7 mm external diameter) with a 4.0-mm diameter light-emitting apical surface composed of hard glass, and anode and cathode leads at the base used to conduct current. The LEDs were controlled using a KPS3010D Power Supply (Eventek) and potentiometer (McMaster-Carr) and monitored using a HHM93 multimeter (Omega Engineering, Norwalk, Conn.) and a 2217-20 Digital Multi Meter (Milwaukee Tools). The combination of power supply and potentiometer were capable of delivering a steady current of up to 20 mA to each LED used in the study for synthesis and imaging purposes.

Silanization

LED glass surfaces were cleaned and functionalized by immersion at room temperature in 1 M NaOH (30 minutes), then a solution of 2% N-(3-triethoxysilylpropyl)-4-hydroxybutyramide (v/v) (SIT8189.5; Gelest) and 0.1% acetic acid in 95% ethanol (3 hours), followed by 2× rinses in 95% ethanol (20 minutes each) and curing for 16 hours in a 95° C. oven. After cooling to room temperature, the LEDs were stored in a desiccator until used.

Synthesis Reagents

18-O-Dimethoxytritylhexaethyleneglycol, 1-[(2-cyanoethyl)-(N,N-diisopropyl)]-phosphoramidite (Glen Research; Spacer Phosphoramidite 18); DMT-protected Biotin Phosphoramidite (Millipore Sigma; M042030); NPPOC-dC(ib) Phosphoramidite (RayDite; Millipore Sigma); 0.5 M CSO in Anhydrous Acetonitrile (Glen Research; 40-4632); 0.25 M DCI Activator (4,5-Dicyanoimidazole) in Anhydrous Acetonitrile (Glen Research; 30-3152-52); Anhydrous acetonitrile (Millipore Sigma; 271004); 3% Dichloroacetic acid in Dichloromethane (DCA; Deblocking Mix; Glen Research; 40-4040); Diethyleneglycol ethyl ether (2-cyanoethyl)-(N,N-diisopropyl)-phosphoramidite (UniCap Phosphoramidite; Glen Research); Unless otherwise specified, reagents were obtained from Millipore Sigma.

Streptavidin-Marina Blue Assay

Streptavidin-Marina Blue conjugate (S11221A; Fisher Scientific) was resuspended in phosphate buffered saline (PBS) to a concentration of 1 mg/mL. For each assay, 5 μL of conjugate was added to 50 μL of binding buffer (150 mM NaCl+50 mM Tris) in a 1.5 mL centrifuge tube. The LED was inverted and placed in the tube so that the glass surface was completely submerged. The assay tube was placed in a rack on a shaking platform with gentle agitation for 1 hour. The LED was removed from the Streptavidin-Marina Blue solution, washed 2× in binding buffer at room temperature and 1× in binding buffer at 37° C. The LED was then allowed to air dry and stored in a light proof container at room temperature until it was imaged.

Imaging

Images were captured using a Samsung Note 10+(12 MP camera). Marina Blue fluorescence was imaged through a bandpass filter with >90% transmission at 450 nm and 10 nm FWHM (ThorLabs; FBH450-10). Images were processed using ImageJ software, including separation of raw images into different color channels for analysis, pre- and post-synthesis image subtraction (e.g., pixel intensity normalization), pixel counts and measurement, and averaging of pixel intensities.

Fluidics Set-Up and Reagent Preparation

Synthesis reagents were prepared according to the following table and connected to the fluidics apparatus using the numbering system described in the flowchart in FIG. 25. The argon gas attached to switching valve 1, port 1 was used to purge/dry the fluidics system at ~1 psi between some reagent flows as indicated in the individual workflow charts below. Argon gas was also delivered at 0.5 psi to each reagent bottle by a needle inserted through the septa to maintain positive pressure countering the negative pressure generated by the peristaltic pump to pull reagents from the reservoirs and deliver them to the flow-cell. All phosphoramidites were mixed with activator immediately before the workflow (not inline). If a reagent listed was not used for a particular workflow, the switching valve port was capped.

Reagent Reservoir and Valve Connections and Contents
(Refer to FIG. 25).

| Switching Valve # | Valve Port # | Reagent # | Bottle Size | Contents | Preparation Ingredient | Amount |
|---|---|---|---|---|---|---|
| 1 | 1 | n/a | n/a | Argon gas (1 p.s.i.) | n/a | n/a |
| 1 | 2 | 1 | 60 mL | Acetonitrile | n/a | n/a |
| 1 | 3 | 2 | n/a | n/a (capped) | n/a | n/a |
| 1 | 4 | 3 | 5 mL | 3% DCA/DCM | n/a | n/a |
| 1 | 5 | 4 | 5 mL | CSO oxidizer | n/a | n/a |
| 1 | 6 | 5 | 22 mL | UV exposure solvent | DMSO | 18 ml |
| | | | | | Imidazole | 180 mg |
| 1 | Output Port | n/a | n/a | Output to Switching Valve 2/Port 1 | n/a | n/a |
| 2 | 1 | n/a | n/a | Input from Switching Valve 1 | n/a | n/a |
| 2 | 2 | 6 | 5 mL | Spacer 18 Phosphoramidite (33 mM) | Spacer 18 Phosphoramidite diluted in Acetonitrile (66 mM) | 1 mL |
| | | | | | 0.25M DCI Activator | 1 mL |
| 2 | 3 | 7 | 5 mL | UniCap Phosphoramidite (28 mM) | UniCap diluted in Acetonitrile (56 mM) | 1 mL |
| | | | | | 0.25M DCI Activator | 1 mL |
| 2 | 4 | 8 | 5 mL | DMT-Biotin Phosphoramidite (11.4 mM) | DMT-Biotin Phosphoramidite | 12 mg |
| | | | | | Acetonitrile | 0.6 mL |
| | | | | | 0.25M DCI Activator | 0.6 mL |
| 2 | 5 | 9 | 5 mL | NPPOC-dC(ib) Phosphoramidite (14.2 mM) | NPPOC-dC(ib) Phosphoramidite | 12 mg |
| | | | | | Acetonitrile | 0.6 mL |
| | | | | | 0.25M DCI Activator | 0.6 mL |
| 2 | 6 | 10 | n/a | n/a (capped) | n/a | n/a |
| 2 | Output Port | n/a | n/a | Output to Flow-Cell | n/a | n/a |
| 3 | 1 | n/a | n/a | Input from Flow-Cell | n/a | n/a |
| 3 | 2 | n/a | n/a | Output to MINIPULS 3 Pump | n/a | n/a |
| 3 | 3 | n/a | n/a | Output to Waste | n/a | n/a |
| 3 | 4 | n/a | n/a | n/a (capped) | n/a | n/a |

Synthesis Workflows

The MINIPULS 3 Pump (Gilson) was set to 3.7 rpm, determined empirically to produce a desirable flow rate throughout the fluidics system. All flow times were determined empirically to flush the lines of the previous reagent and deliver the new reagent through the flow-cell reaction chamber. The flow orientation was set to pull fluids from the reagent reservoirs through the flow-cell using negative pressure as shown in FIG. 25. All synthesis workflows began with the same preliminary steps: (1) connect reagent reservoirs and gas lines to the fluidics apparatus, (2) prime the lines from all reagent reservoirs to the nearest switching valve, (3) flow acetonitrile through the entire system to clear any residue from the individual reagent priming steps, (4) insert a functionalized LED into a single-LED flow-cell and connect the flow-cell to the fluidics apparatus, (5) flow acetonitrile through the flow-cell to verify the seal between the flow-cell and the surface of the LED, (6) (optional) LED functionality was verified if the workflow included an LED activation step. Hold times are the time the synthesis reagent was left in the reaction chamber before flushing (e.g., reaction time). All LED activation steps consisted of delivery of 20 mA of current to the LED for the indicated hold time. NOTE: while LED is activated (workflows 4 and 6), the pump should be pulsed for 2-3 seconds every 20 seconds so that reaction byproducts do not accumulate in the reaction chamber during this step.

Workflow 1

| Step | Description | Switching Valve 1 Port # | Switching Valve 2 Port # | Switching Valve 3 Port # | Pumping Time (sec) | Hold Time (sec) |
|---|---|---|---|---|---|---|
| 1 | Flush cell with Acetonitrile | 2 | 1 | 2 | 12 | |
| 2 | Fill cell Spacer 18 Phosphoramidite | 3 (Capped) | 2 | 2 | 8 | 90 |
| 3 | Flush cell with Acetonitrile | 2 | 1 | 2 | 12 | |
| 4 | Fill cell with DMT-Biotin Phosphoramidite | 3 (Capped) | 4 | 2 | 8 | 90 |
| 5 | Flush cell with Acetonitrile | 2 | 1 | 2 | 12 | |
| 6 | Fill cell with 0.5M CSO oxidizer | 5 | 1 | 2 | 12 | 30 |
| 7 | Flush cell with Acetonitrile | 2 | 1 | 2 | 12 | |
| 8 | Fill cell with 3% DCA/DCM | 4 | 1 | 2 | 8 | 30 |
| 9 | Flush cell with Acetonitrile | 2 | 1 | 2 | 12 | |
| 10 | Flush cell with Argon | 1 | 1 | 3 | N/A | 20 |

Workflow 2

| Step | Description | Switching Valve 1 Port # | Switching Valve 2 Port # | Switching Valve 3 Port # | Pumping Time (sec) | Hold Time (sec) |
|---|---|---|---|---|---|---|
| 1 | Flush cell with Acetonitrile | 2 | 1 | 2 | 12 | |
| 2 | Fill cell Spacer 18 Phosphoramidite | 3 (Capped) | 2 | 2 | 8 | 90 |
| 3 | Flush cell with Acetonitrile | 2 | 1 | 2 | 12 | |
| 4 | Fill cell with 3% DCA/DCM | 4 | 1 | 2 | 8 | 30 |
| 5 | Flush cell with Acetonitrile | 2 | 1 | 2 | 12 | |
| 6 | Fill cell with DMT-Biotin Phosphoramidite | 3 (Capped) | 4 | 2 | 8 | 90 |
| 7 | Flush cell with Acetonitrile | 2 | 1 | 2 | 12 | |
| 8 | Fill cell with 0.5M CSO oxidizer | 5 | 1 | 2 | 12 | 30 |
| 9 | Flush cell with Acetonitrile | 2 | 1 | 2 | 12 | |
| 10 | Fill cell with 3% DCA/DCM | 4 | 1 | 2 | 8 | 30 |
| 11 | Flush cell with Acetonitrile | 2 | 1 | 2 | 12 | |
| 12 | Flush cell with Argon | 1 | 1 | 3 | N/A | 20 |

Workflow 3

| Step | Description | Switching Valve 1 Port # | Switching Valve 2 Port # | Switching Valve 3 Port # | Pumping Time (sec) | Hold Time (sec) |
|---|---|---|---|---|---|---|
| 1 | Flush cell with Acetonitrile | 2 | 1 | 2 | 12 | |
| 2 | Fill cell Spacer 18 Phosphoramidite | 3 (Capped) | 2 | 2 | 8 | 90 |
| 3 | Flush cell with Acetonitrile | 2 | 1 | 2 | 12 | |
| 4 | Fill cell with UniCap Phosphoramidite | 3 (Capped) | 3 | 2 | 8 | 90 |
| 5 | Flush cell with Acetonitrile | 2 | 1 | 2 | 12 | |
| 6 | Fill cell with 3% DCA/DCM | 4 | 1 | 2 | 8 | 30 |
| 7 | Flush cell with Acetonitrile | 2 | 1 | 2 | 12 | |
| 8 | Fill cell with NPPOC-dC Phosphoramidite | 3 (Capped) | 5 | 2 | 8 | 90 |
| 9 | Flush cell with Acetonitrile | 2 | 1 | 2 | 12 | |
| 10 | Fill cell with DMT-Biotin Phosphoramidite | 3 (Capped) | 4 | 2 | 8 | 90 |
| 11 | Flush cell with Acetonitrile | 2 | 1 | 2 | 12 | |
| 12 | Fill cell with 0.5M CSO oxidizer | 5 | 1 | 2 | 12 | 30 |
| 13 | Flush cell with Acetonitrile | 2 | 1 | 2 | 12 | |
| 14 | Fill cell with 3% DCA/DCM | 4 | 1 | 2 | 8 | 30 |
| 15 | Flush cell with Acetonitrile | 2 | 1 | 2 | 12 | |
| 16 | Flush cell with Argon | 1 | 1 | 3 | N/A | 20 |

Workflow 4

| Step | Description | Switching Valve 1 Port # | Switching Valve 2 Port # | Switching Valve 3 Port # | Pumping Time (sec) | Hold Time (sec) |
|---|---|---|---|---|---|---|
| 1 | Flush cell with Acetonitrile | 2 | 1 | 2 | 12 | |
| 2 | Fill cell Spacer 18 Phosphoramidite | 3 (Capped) | 2 | 2 | 8 | 90 |
| 3 | Flush cell with Acetonitrile | 2 | 1 | 2 | 12 | |
| 4 | Fill cell with UniCap Phosphoramidite (CAP) | 3 (Capped) | 3 | 2 | 8 | 90 |
| 5 | Flush cell with Acetonitrile | 2 | 1 | 2 | 12 | |
| 6 | Fill cell with 3% DCA/DCM | 4 | 1 | 2 | 8 | 30 |
| 7 | Flush cell with Acetonitrile | 2 | 1 | 2 | 12 | |
| 8 | Fill cell with NPPOC-dC Phosphoramidite | 3 (Capped) | 5 | 2 | 8 | 90 |
| 9 | Flush cell with Acetonitrile | 2 | 1 | 2 | 12 | |
| 10 | Flush cell with Argon | 1 | 1 | 3 | N/A | 20 |
| 11 | Fill cell with UV exposure solvent | 6 | 1 | 2 | 12 | |
| 12 | Apply UV (pulse exp solvent per 20s)* | 6 | 1 | 2 | (PULSE) | 300 |
| 13 | Flush cell with Acetonitrile | 2 | 1 | 2 | 12 | |
| 14 | Fill cell with DMT-Biotin Phosphoramidite | 3 (Capped) | 4 | 2 | 8 | 90 |
| 15 | Flush cell with Acetonitrile | 2 | 1 | 2 | 12 | |
| 16 | Fill cell with 0.5M CSO oxidizer | 5 | 1 | 2 | 12 | 30 |
| 17 | Flush cell with Acetonitrile | 2 | 1 | 2 | 12 | |
| 18 | Fill cell with 3% DCA/DCM | 4 | 1 | 2 | 8 | 30 |
| 19 | Flush cell with Acetonitrile | 2 | 1 | 2 | 12 | |
| 20 | Flush cell with Argon | 1 | 1 | 3 | N/A | 20 |

Workflow 5

| Step | Description | Switching Valve 1 Port # | Switching Valve 2 Port # | Switching Valve 3 Port # | Pumping Time (sec) | Hold Time (sec) |
|---|---|---|---|---|---|---|
| 1 | Flush cell with Acetonitrile | 2 | 1 | 2 | 12 | |
| 2 | Fill cell Spacer 18 Phosphoramidite | 3 (Capped) | 2 | 2 | 8 | 90 |
| 3 | Flush cell with Acetonitrile | 2 | 1 | 2 | 12 | |
| 4 | Fill cell with UniCap Phosphoramidite | 3 (Capped) | 3 | 2 | 8 | 90 |
| 5 | Flush cell with Acetonitrile | 2 | 1 | 2 | 12 | |
| 6 | Fill cell with 3% DCA/DCM | 4 | 1 | 2 | 8 | 30 |
| 7 | Flush cell with Acetonitrile | 2 | 1 | 2 | 12 | |
| 8 | Fill cell with NPPOC-dC Phosphoramidite | 3 (Capped) | 5 | 2 | 8 | 90 |
| 9 | Flush cell with Acetonitrile | 2 | 1 | 2 | 12 | |
| 10 | Fill cell with UniCap Phosphoramidite | 3 (Capped) | 3 | 2 | 8 | 90 |
| 11 | Flush cell with Acetonitrile | 2 | 1 | 2 | 12 | |
| 12 | Fill cell with DMT-Biotin Phosphoramidite | 3 (Capped) | 4 | 2 | 8 | 90 |
| 13 | Flush cell with Acetonitrile | 2 | 1 | 2 | 12 | |
| 14 | Fill cell with 0.5M CSO oxidizer | 5 | 1 | 2 | 12 | 30 |
| 15 | Flush cell with Acetonitrile | 2 | 1 | 2 | 12 | |
| 16 | Fill cell with 3% DCA/DCM | 4 | 1 | 2 | 8 | 30 |
| 17 | Flush cell with Acetonitrile | 2 | 1 | 2 | 12 | |
| 18 | Flush cell with Argon | 1 | 1 | 3 | N/A | 20 |

Workflow 6

| Step | Description | Switching Valve 1 Port # | Switching Valve 2 Port # | Switching Valve 3 Port # | Pumping Time (sec) | Hold Time (sec) |
|---|---|---|---|---|---|---|
| 1 | Flush cell with Acetonitrile | 2 | 1 | 2 | 12 | |
| 2 | Fill cell Spacer 18 Phosphoramidite | 3 (Capped) | 2 | 2 | 8 | 90 |
| 3 | Flush cell with Acetonitrile | 2 | 1 | 2 | 12 | |
| 4 | Fill cell with UniCap Phosphoramidite | 3 (Capped) | 3 | 2 | 8 | 90 |
| 5 | Flush cell with Acetonitrile | 2 | 1 | 2 | 12 | |
| 6 | Fill cell with 3% DCA/DCM | 4 | 1 | 2 | 8 | 30 |
| 7 | Flush cell with Acetonitrile | 2 | 1 | 2 | 12 | |
| 8 | Fill cell with NPPOC-dC Phosphoramidite | 3 (Capped) | 5 | 2 | 8 | 90 |
| 9 | Flush cell with Acetonitrile | 2 | 1 | 2 | 12 | |
| 10 | Fill cell with UniCap Phosphoramidite | 3 (Capped) | 3 | 2 | 8 | 90 |
| 11 | Flush cell with Acetonitrile | 2 | 1 | 2 | 12 | |
| 12 | Flush cell with Argon | 1 | 1 | 3 | N/A | 20 |
| 13 | Fill cell with UV exposure solvent | 6 | 1 | 2 | 12 | |
| 14 | Apply UV (pulse exp solvent per 20s)* | 6 | 1 | 2 | (PULSE) | 300 |
| 15 | Flush cell with Acetonitrile | 2 | 1 | 2 | 12 | |
| 16 | Fill cell with DMT-Biotin Phosphoramidite | 3 (Capped) | 4 | 2 | 8 | 90 |
| 17 | Flush cell with Acetonitrile | 2 | 1 | 2 | 12 | |
| 18 | Fill cell with 0.5M CSO oxidizer | 5 | 1 | 2 | 12 | 30 |
| 19 | Flush cell with Acetonitrile | 2 | 1 | 2 | 12 | |
| 20 | Fill cell with 3% DCA/DCM | 4 | 1 | 2 | 8 | 30 |
| 21 | Flush cell with Acetonitrile | 2 | 1 | 2 | 12 | |
| 22 | Flush cell with Argon | 1 | 1 | 3 | N/A | 20 |

All workflows were completed by removing the LED from the flow-cell, performing a final deprotection in a stirring 1:1 ethylenediamine (EDA):95% ethanol bath for 2 hours at room temperature, rinsing the LED 2× in 95% ethanol, and storing it in a desiccator at room temperature until use in the streptavidin-Marina Blue assay.

Design of Experimental Apparatus

A flow-cell apparatus was designed and fabricated to provide the delivery of chemical synthesis reagents to and from a reaction chamber formed on the light emitting surface of a single LED capable of emitting ultraviolet light having a peak wavelength of 365 nm (FIG. 23A, 23B, 23C). FIG. 23A shows a longitudinal cross-sectional schematic of the flow-cell. An LED (A) is inserted into receptacle (D) of the flow-cell body (B), forming a hollow rectangular reaction chamber where the glass surface of the LED meets a rectangular raised ridge at the top of the receptacle. The flow-cell plus LED is secured to an aluminum plate (C) using two bolts (E, only one is shown) passed through holes in the flow-cell body (F), washers (G), holes in the aluminum plate (H) and nuts (I) as indicated. The anode and cathode leads (J) of the LED are passed through a third hole (K) in the aluminum plate (C) that is smaller than the diameter of the LED. Pressure from tightening the bolts creates a leak-proof seal where the LED surface meets the raised ridge of the flow-cell body to create the reaction chamber. Openings at either end of the reaction chamber connect to threaded input (L) and output (M) ports where flangeless compression fittings (O, only one is shown) facilitate attachment of flexible tubing (N) to convey synthesis reagents to and from the chamber. Panel B shows a transparent schematic of the full flow-cell. Panel C shows a photograph of the flow-cell attached to the aluminum plate and input/output tubing.

Photochemical in situ synthesis of heteropolymers comprises sequential delivery to the flow-cell reaction chamber of small yet precise volumes of multiple different fluid reagents, including wash solutions, activating chemicals, neutralizing chemicals, and the individual monomers that will ultimately comprise the synthesized polymers. The plate to which the flow-cell is attached in FIGS. 23A and C is part of a larger frame, incorporating multiple switching valves, custom designed and assembled to accommodate this need (FIG. 24). As shown in FIG. 24, the one-piece aluminum frame (A) supports two high-pressure switching valves (B, C) each with six input ports and one output port. The valves are raised to allow placement of reagent reservoirs close below them connected to the input ports. In some embodiments, up to six different reagent reservoirs are connected to the first valve (B), which is manually operated by the switch on top to allow flow from any one of the six inputs at a time. Reagents flow in the direction of the arrows. The output from the first valve (B) flows into one of the six input ports of the second valve (C) leaving five input ports to connect other reagents at that valve. The output of the second valve (C) flows into the input port of the flow-cell (E). Note that the platform holding the flow-cell is slightly elevated to allow connection of the electrical leads controlling the LED to the power supply. The output of the flow-cell (E) flows into a 4-way switching valve (D) used to connect the fluidic system either to a variable speed peristaltic pump or to a chemical waste receptacle. When the pump was selected at the 4-way valve (D), it was used to draw reagents from their reservoirs through the flow-cell reaction chamber at well-controlled rates via negative pressure. When the output at the 4-way valve (D) was directed to a chemical waste receptacle, positive pressure was used to push reagents through the fluidics system or to clean and dry the system using a pressurized gas source (e.g., argon) connected to an input port at the first valve (B).

Additional details describing the design of the experimental apparatus are shown in the flow chart in FIG. 25. In some embodiments, the chemical attributes of the reagents utilized for photochemical polymer synthesis presented important design constraints. In particular, the various phosphoramidites (e.g., linker phosphoramidites, nucleoside phosphoramidites, and/or biotin phosphoramidites) used as monomer precursors are extremely sensitive to water and must be maintained and used under strongly anhydrous conditions (e.g. <50 ppm $H_2O$) to avoid degradation. To address this, reagent reservoirs comprised bottles with PTFE/silicone septa caps that form an airtight seal around the thin tubing used to draw reagents from those bottles, thus reducing exposure of reagents to the environment. Concurrently, dry argon gas was flowed into all the reagent bottles at low pressure (FIG. 25, Pressure Regulator 2) via needles piercing the septa. This served to blanket the reagents with argon (e.g., to exclude air) and to maintain constant pressure in the bottles as reagents were withdrawn under negative pressure. Argon gas delivered through Pressure Regulator 1 was connected to input port 1 of valve 1 and used to purge the system of reagents or to dry the flow-cell as required by the photochemical synthesis protocol. Chemically resistant HPLC-grade tubing used to convey reagents from the reservoirs was connected to the switching valves using flangeless compression fittings.

The LEDs used for the experiments (UVLED365-110E, Rank 6, Roithner Lasertechnik) specify optimal power (mean=4.1 mW) and wavelength (365 nm peak emission) outputs with 20 mA forward current input (~3.6 V), corresponding to a calculated irradiance of 0.0326 mW/cm$^2$ (0.0326 J/s/cm$^2$). Uniform current was delivered to the LED via a power supply in voltage regulation mode and an external potentiometer and was monitored using digital multimeters (see Methods).

Experimental Results

Experiment 1

During the development of embodiments of the technology described herein, experiments were conducted to verify that the fluidics components of the experimental apparatus functioned as intended and that the surface of the type of LED selected for the study was a competent substrate for polymer synthesis. In particular experiments were conducted to synthesize a simple polymer on the LED surface using an established chemical method used to synthesize polymers on other substrates. This method is distinct from the method used in some embodiments of the present technology. While both methods utilize phosphoramidite monomers as polymer building blocks, the chemical method uses DCA (dichloroacetic acid) to remove an acid-labile DMT (4,4'-dimethoxytrityl) group protecting a 5'-hydroxyl group before coupling the next monomer to that site, while the photochemical method uses UV light to remove a photolabile NPPOC (2-(2-nitrophenyl)propoxycarbonyl) group protecting the 5'-hydroxyl before proceeding (see, e.g., Kosuri S, Church G M. Large-scale de novo DNA synthesis: technologies and applications. Nat Methods. 2014 May; 11(5):499-507), incorporated herein by reference).

Two workflows (see Methods, workflow 1 and workflow 2) were compared in the initial experiment. Both workflows used LEDs that previously had been prepared (e.g., functionalized) by treating their surface with N-(3-triethoxysilylpropyl)-4-hydroxybutyramide to provide a sufficient number of stable hydroxyl groups for anchoring the synthesis product (see Methods). A functionalized LED was inserted into the single-LED flow-cell as described in FIGS. 23A and C and the flow-cell was connected to the fluidics apparatus as described in FIGS. 24 and 25. In both workflows, the first step was to deliver DMT-protected spacer molecules (Spacer Phosphoramidite 18; Glen Research) to the surface of the LED where they react with available hydroxyl groups to form a covalent attachment (FIG. 26A). The use of spacer or linker molecules (e.g., Spacer Phosphoramidite 18) to initiate polymer synthesis can improve process yields compared to initiating synthesis directly from the initial hydroxyl groups close to the glass surface and facilitate use of the polymers in subsequent assays by extending the polymer away from the substrate surface to prevent interference with ligand binding (see, e.g., Shchepinov M S, Case-Green S C, Southern E M. Steric factors influencing hybridisation of nucleic acids to oligonucleotide arrays. Nucleic Acids Res. 1997 Mar. 15; 25(6): 1155-1161; and Sojka B, Piunno P A E, Wust C C, Krull U J. A novel phosphoramidite method for automated synthesis of oligonucleotides on glass supports for biosensor development. Appl Biochem Biotechnol. 2000 October; 89(1):85-103), each of which is incorporated herein by reference).

Workflows 1 and 2 diverged at the next step. In workflow 2 only, 3% DCA was delivered to the surface of the LED to deprotect (e.g., detritylate) the spacer molecules by removing the acid-labile DMT group and exposing a hydroxyl group required for the subsequent coupling of additional components to the polymer. In workflow 1, DMT groups were not removed by treatment with DCA. Next, DMT-protected biotin phosphoramidite molecules were delivered to the surface of the LED in both workflows with the expectation that these molecules would form covalent bonds to deprotected hydroxyl groups present on the spacer molecules only in workflow 2. Another treatment with 3% DCA was performed to remove the DMT groups from biotin molecules that had successfully coupled to the polymers. The LEDs were then removed from the flow-cells, immersed in 1:1 (v/v) ethylenediamine/ethanol for two hours at room temperature, rinsed in deionized water, and dried. To detect the presence of biotin, the LEDs were incubated in binding buffer containing a Streptavidin-Marina Blue conjugate. Streptavidin binds strongly and specifically to biotin. Marina Blue is a fluorescent compound with an excitation peak at 364 nm and an emission peak at 461 nm and should be activated by the 365 nm UV light emitted by the LEDs used in the experiment. The LEDs were connected to a power supply, activated (e.g., using 15 mA), and imaged with a camera (12 MP Galaxy Note 10+, Samsung) to detect the presence of the Streptavidin-Marina Blue conjugate, and thus the presence of biotin attached to the synthesized polymers. A bandpass filter (ThorLabs) was used to minimize transmitted light below 430 nm and above 470 nm in wavelength (see Methods for detailed protocols).

The results are shown in FIG. 26B. FIG. 26B, panels A and E show baseline surface images of the activated LEDs. Although the LEDs emit light with a peak wavelength of 365 nm, sufficient light is emitted in the visible range (violet, ~400-450 nm) at 15 mA to escape the filter and be detected by the camera. FIG. 26B, panels B and F show images of the same LEDs after the synthesis workflows were completed and the LEDs were incubated with Streptavidin-Marina Blue. The image in FIG. 26B, panel F (workflow 2) shows strong Marina Blue fluorescence in the rectangular shape of the reaction chamber formed by the flow-cell on the LED surface (e.g., the fiducial region), indicating the presence of biotin. A much weaker fluorescent signal, with less distinct (but still rectangular) margins, was observed on the surface of the LED from workflow 1 (FIG. 26B, panel B). It is unlikely that the signal in workflow 1 represents legitimate coupling of biotin to the hydroxyl group on the spacer molecule as the latter had not been exposed to DCA to remove the DMT protecting group. Rather, the signal in workflow 1 is more likely to represent background coupling of biotin directly to newly exposed hydroxyl groups on the glass surface of the LED itself. Dynamic transition between the less reactive dehydroxylated siloxane (Si—O—Si) phase and the more reactive hydrated silanol (SiOH) phase on silica surfaces is well documented and strongly influenced by temperature, humidity, and a variety of other physical and chemical processes (see, e.g., Sneh O, George S M. Thermal Stability of Hydroxyl Groups on a Well-Defined Silica Surface. J Phys Chem. 1995; 99(13):4639-4647; and Schrader A M, Monroe J I, Sheil R, Dobbs H A, Keller T J, Li Y, Jain S, Shell M S, Israelachvili J N, Han S. Surface chemical heterogeneity modulates silica surface hydration. Proc Natl Acad Sci USA. 2018; 115(12):2890-2895, each of which is incorporated herein by reference). For quantification, the blue channels of the baseline and the post-streptavidin-stained LED images generated within each workflow were manually aligned and computationally subtracted (ImageJ) to mask the intense light emitted directly from the LED. This enabled a more sensitive comparison of pixel intensity values arising specifically from secondary Marina Blue fluorescence within the footprint of the flow-cell reaction chambers (FIG. 26B, panels C and G, white rectangles). These data are presented in FIG. 26B, panels D and H, where measurement of 859,791 pixels in the fiducial region of the subtracted workflow 1 image yielded a mean intensity of 27.283 (StdDev 32.205) on a scale of 0-255 and measurement of 946,127 pixels in the fiducial region of the subtracted workflow 2 image yielded a mean intensity of 67.954

(StdDev 64.443), a 2.5-fold difference. The difference in the result between workflow 1 and workflow 2 indicated successful chemical synthesis of a simple heteropolymer, comprising a biotin phosphoramidite monomer (C46H64-N5O8PS) coupled to a spacer phosphoramidite 18 monomer (C42H61N2O10P), generated in-situ on the surface of an LED (e.g., the substrate of a component comprising an LED and integrated substrate).

Experiment 2

During the development of embodiments of the technology provided herein, experiments were conducted to expand on the results of the first experiment. In particular, experiments were conducted to synthesize a polymer in-situ on the surface of an LED using light emitted from the same LED to determine the structure of the polymer (e.g., construct the polymer according to a design). This capability is the foundation of embodiments of the technology provided herein. Four new synthesis workflows (see Methods, workflows 3, 4, 5, and 6) were tested using the experimental apparatus. All these workflows begin with the same steps as the previously described for workflows 1 and 2, starting with a N-(3-triethoxysilylpropyl)-4-hydroxybutyramide functionalized LED followed by coupling of DMT-protected Spacer Phosphoramidite 18 molecules to reactive hydroxyl groups on the LED, but then differ as described in FIG. 27A.

Following coupling of the DMT-protected Spacer 18 to the LED, a capping step (CAP) was performed. UniCap phosphoramidite (Glen Research) was delivered to the flow-cell with the goal of blocking any unreacted hydroxyl groups remaining on the LED surface which might contribute to increased background in the post-synthesis detection assay. UniCap would not be expected to interfere with polymer synthesis as the Spacer 18 molecules remained protected by DMT groups during the capping step. DCA was then delivered to the reaction chamber to remove DMT groups from the Spacer 18 molecules, followed by the delivery of NPPOC-dC(ib) phosphoramidite to couple with the newly exposed hydroxyl groups. NPPOC-dC(ib) phosphoramidite is a cytosine nucleoside phosphoramidite with a photolabile NPPOC protecting group, commonly used in the synthesis of DNA oligonucleotides on microarrays using light-directed synthesis methods. Removal of the NPPOC group by irradiation with UV light (<370 nm wavelength) exposes a reactive hydroxyl in preparation for coupling the next component of the polymer, analogous to the removal of DMT protecting groups by acid in chemical synthesis methods. After coupling NPPOC-dC(ib) phosphoramidite to Spacer 18, a second capping step was performed to inactivate free hydroxyl groups in the reaction chamber, but only in workflows 5 and 6. Again, this would not be expected to interfere with polymer synthesis as the previously coupled cytosines remained protected by NPPOC groups during the capping step.

The LEDs in workflows 4 and 6 (but not the LEDs in workflows 3 and 5, which serve as negative controls) were then activated to emit 365 nm UV light (20 mA constant current) for 300 seconds to remove photolabile NPPOC protecting groups from the cytosines incorporated into the polymers on their surfaces and permit coupling of the next component of the polymer, biotin. 300 seconds was the length of time calculated to deliver a dose (e.g., cumulative radiant exposure) of 10 J/cm$^2$ (joules per square centimeter) to the surface of the LEDs in our experiment. This amount was shown in other studies to be adequate to remove >95% of NPPOC protecting groups from nucleoside phosphoramidites in light-directed polymer synthesis experiments (see, e.g., Chen S, Phillips M F, Cerrina F, Smith L M.

Controlling oligonucleotide surface density in light-directed DNA array fabrication. Langmuir. 2009 Jun. 2; 25(11):6570-5; and Holz K, Hoi J K, Schaudy E, Somoza V, Lietard J, Somoza M M. High-Efficiency Reverse (5'→3') Synthesis of Complex DNA Microarrays. Sci Rep. 2018 Oct. 10; 8(1): 15099, each of which is incorporated herein by reference). Biotin monomers would not be expected to have incorporated into the polymers in workflows 3 and 5 at that point, with the NPPOC groups remaining in place, though they potentially would be able to couple to any hydroxyl (silanol) groups on the surface of the LED freshly exposed by the ongoing process of hydroxylation. Following biotin coupling, workflows 3, 4, 5, and 6 continued as indicated in FIG. 27A, following the same steps as in workflows 1 and 2 through the completion of synthesis, the Streptavidin-Marina Blue assay, and image acquisition.

FIG. 27B, panels A, E, I, and M show pre-synthesis baseline images of the activated (15 mA) LEDs used in workflows 3, 4, 5, and 6, respectively; FIG. 27B, panels B, F, J, and N show the same LEDs after completion of synthesis and the Streptavidin-Marina Blue assay. Visual inspection of the post-assay LED images from workflows 3 (FIG. 27B, panel B) and 4 (FIG. 27B, panel F) indicates a brighter and more distinct fluorescent signal resulted from workflow 4. Similarly, comparing images from workflows 5 (FIG. 27B, panel J) and 6 (FIG. 27B, panel N) reveals that a brighter signal resulted from workflow 6. For quantification, the blue channel components of the pre-synthesis images were subtracted from the corresponding post-synthesis images to remove the contribution of the LED light itself, as in experiment 1, but a different approach was used to compare the remaining pixel intensity values between workflows. First, the average pixel intensities of the fiducial regions were determined (rectangular outlines, FIG. 27B, panels C, G, K and O). Next, similarly sized regions, but at right angles to the fiducial regions and referred to as orthogonal regions, were measured (rectangular outlines, FIG. 27B, panels D, H, L and P). The orthogonal measurements were used to account for inter-LED differences in brightness and non-specific fluorescence signal not directly attributable to polymer synthesis, although synergistic interactions between LED-dependent and LED-independent variables could not be ruled out. The results are presented in Table 1.

TABLE 1

Signal intensity from photochemical polymer synthesis on LED surface

| Workflow | Average Intensity | | |
| | Fiducial Region | Orthogonal Region | Ratio |
| --- | --- | --- | --- |
| 3 (− UV) | 12.0 | 6.4 | 1.9 |
| 4 (+ UV) | 34.4 | 10.1 | 3.4 |
| Fold difference (workflow 4/3) | 2.9 | 1.6 | 1.8 |
| 5 (− UV) | 17.2 | 7.7 | 2.2 |
| 6 (+ UV) | 34.7 | 9.7 | 3.6 |
| Fold difference (workflow 6/5) | 2.0 | 1.3 | 1.6 |

Comparison of fiducial region signal intensity among the workflows shows a strong increase in fluorescence when the LEDs were activated to de-protect the cytosine monomers compared to when they were not, with a 2.9-fold increase from workflow 4 (+UV) over workflow 3 (−UV) and a 2.0-fold increase from workflow 6 (+UV) over workflow 5 (−UV). These differences cannot be accounted for by inter-LED differences in brightness and non-specific fluorescence signal as the corresponding fold-differences from the orthogonal region signal intensities were 1.6 (workflow 4/workflow 3) and 1.3 (workflow 6/workflow 5). The ratios of fiducial region average pixel intensity to orthogonal region average pixel intensity within the same LED also indicate that the increased signal intensities observed in workflows 4 and 6 compared to workflows 3 and 5 were due to the activation of the LEDs to emit UV light. The fiducial to orthogonal ratios were 3.4 for workflow 4 compared to 1.9 for workflow 3, and 3.6 for workflow 6 compared to 2.2 for workflow 5. The observation that the fiducial to orthogonal ratios were >1.0 for workflows 3 and 5 indicated that biotin phosphoramidite was coupling to silanol groups on the surface of the LED rather than hydroxyl groups on the non-deprotected cytosine monomers on the polymers themselves.

Multi LED Array

The data obtained from experiment 2 indicated that light emitted from an individual LED can be used to determine the structure of heteropolymers synthesized on the surface of that same individual LED. Accordingly, it is logical to extrapolate these results to include situations wherein the same process of polymer synthesis is performed in parallel on multiple individual LEDs grouped together in a set, with individual control over the activation of each LED within the set (e.g., an LED "array").

Accordingly, experiments were conducted during the development of embodiments of the technology provided herein to demonstrate the feasibility of this LED array concept. In particular, an array comprising four LEDs of the same type used in experiments 1 and 2 was constructed. A flow-cell was designed and fabricated from transparent EPX (a chemically resistant material) via additive manufacturing, providing a common reaction chamber for all four LEDs in the array, but retaining independent control over the activation of each LED (FIG. 28A-F). FIG. 28A shows a schematic drawing of the flow-cell (A), including the input (B) and output (C) ports for connection of a fluidics control and delivery system to the low-volume reaction chamber within the flow-cell, a component to secure the LEDs in place and the assembled flow-cell+LEDs to a platform (e.g., peripheral bolt holes, D), and access to individual LED electrical leads (E). FIG. 28B provides a lateral view. The cross-sectional view in FIG. 28C shows how individual LEDs are inserted into the flow-cell to form the array. In some embodiments, the LEDs are held in place temporarily and then removed from the array for individual applications following completion of the polymer synthesis workflow. In some embodiments, the LEDs are affixed permanently to the flow-cell and the flow-cell is utilized as a reaction chamber to perform subsequent assays (e.g., ligand-binding, hybridization, enzyme activity, etc.) on the array.

Figure 28D:
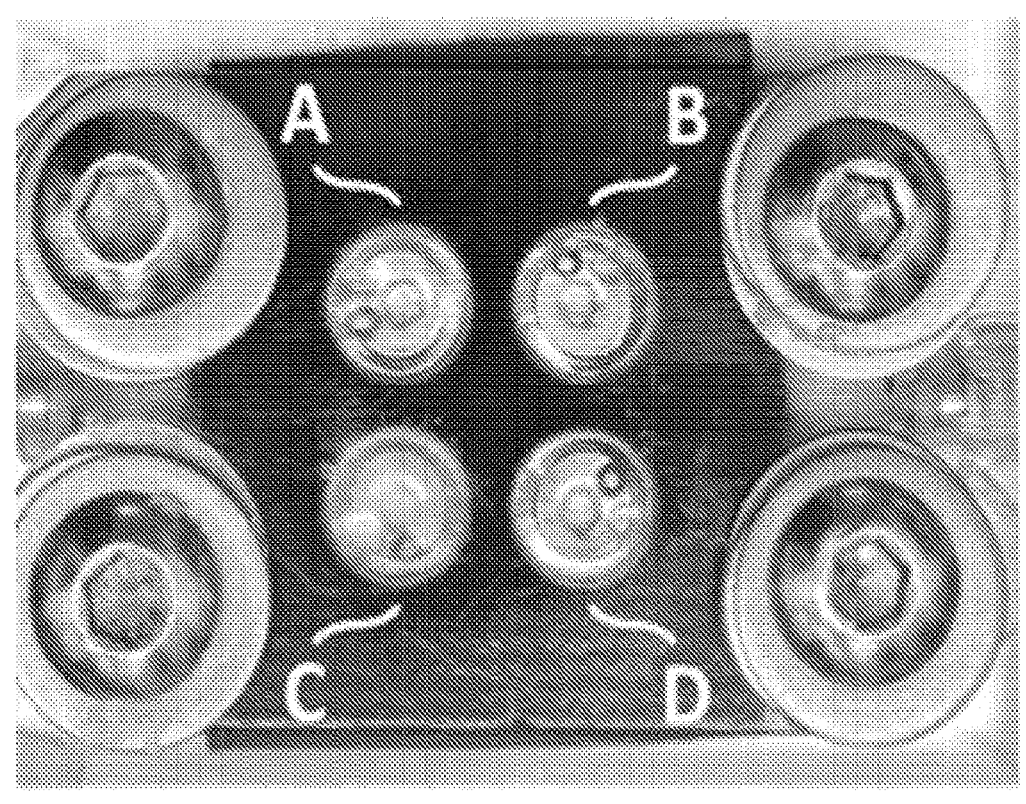
Figure 28E:
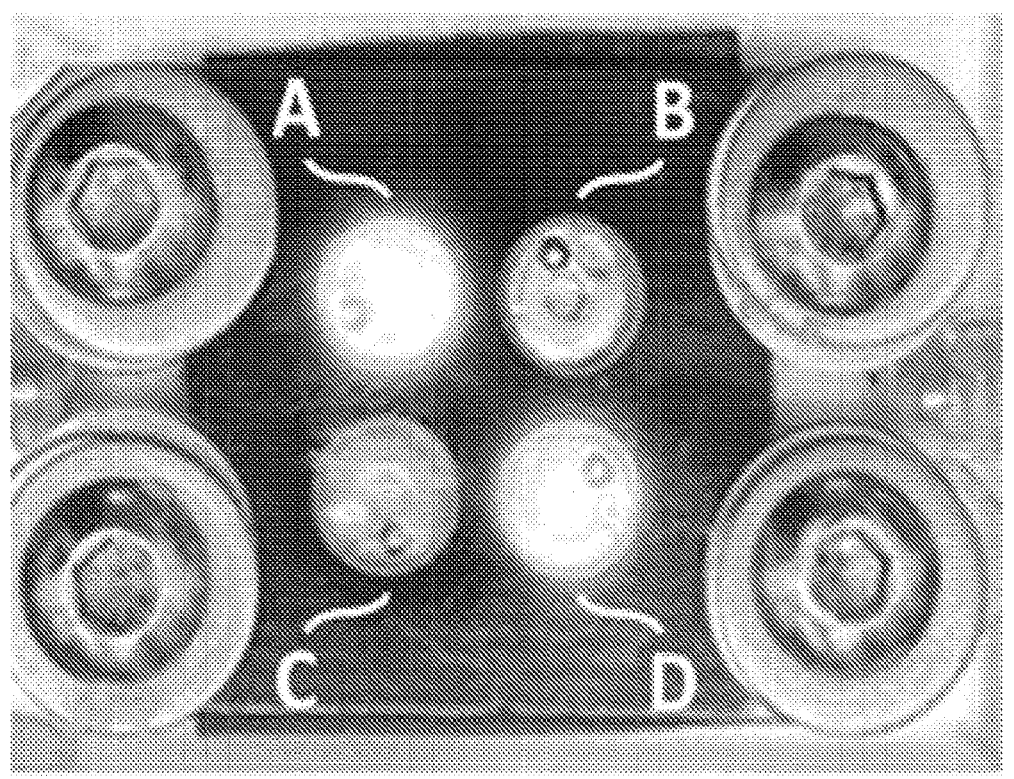
Figure 28F:
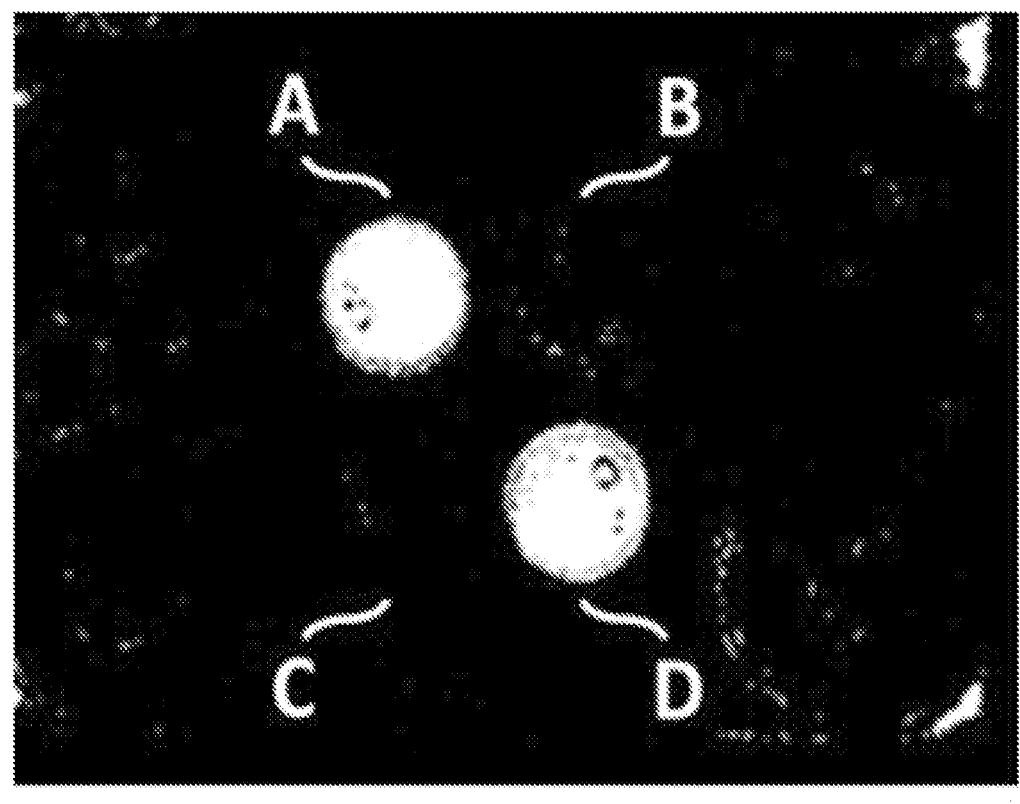

FIG. 28D shows an image of the top surface of an assembled 4-LED flow-cell with the array of four LEDs (A, B, C, and D) visible through the transparent material and their surfaces exposed to the reaction chamber. FIG. 28E shows the same flow-cell but with two of the four LEDs (A and D) activated (20 mA current). The images in FIGS. 28 D and E were obtained using unfiltered ambient light. FIG. 28F shows only the blue channel of the image shown in FIG. 28E to indicate the difference between activated and unactivated LEDs at shorter wavelengths only.

Although all the LEDs in the 4-LED array presented here share a common reaction chamber and therefore a common pool of synthesis reagents, it is important to point out that the synthesis reactions themselves occur independently of each other because activation of each LED is independent and the reactions are physically limited to the surfaces of the LEDs to which the polymers are attached. There is a notable exception to this general principle, however, which becomes particularly relevant as the number of elements in a polymer array increases and the individual elements become smaller and located closer together. Existing methods for the light-directed synthesis of microarrays of polymers on various substrates use light sources that are separated from the substrate and typically require complex systems of lenses and mirrors to focus, split, and otherwise manage the light before it reaches the individual reaction sites. Such arrangements increase the risk of light-scattering and thus the possibility that the independence and fidelity of reactions will become degraded by errant light in the system impacting unintended reaction sites.

A unique and important feature of the present technology is that light from each LED only travels a few nanometers beyond its own surface to control the appropriate polymer synthesis reaction (e.g., and does not need to travel further). This feature is an improvement compared to conventional methods and provides simpler and more robust strategies for reducing and/or eliminating scattered light from the system so that it does not impact other reactions being performed in parallel within the same flow-cell. These include, but are not limited to, simple anti-reflective coatings on flow-cell components and the inclusion of light-absorbing molecules in the flow-cell during reactions.

CONCLUSION

The experiments described and data provided herein indicate that embodiments of the technology provided herein may find use in synthesizing heteropolymers on the surface of an LED using the LED as a substrate and that light from the same LED can simultaneously be used to determine the structure of the polymer synthesized on its surface. The data collected further indicate that embodiments of the synthesis system described herein are feasible, including the fluidics and electrical elements, to conduct that synthesis. Finally, in some embodiments, experiments comprised constructing a 4-LED array and flow-cell to demonstrate how the capabilities demonstrated using an individual LED can be applied to an array of LEDs. It can be logically inferred that the principles of the technology are applicable to include the use of more complex LED arrays, containing millions of individual LED elements mere microns in size.

All publications and patents mentioned in the above specification are herein incorporated by reference in their entirety for all purposes. Various modifications and variations of the described compositions, methods, and uses of the technology will be apparent to those skilled in the art without departing from the scope and spirit of the technology as described. Although the technology has been described in connection with specific exemplary embodiments, it should be understood that the technology as claimed should not be unduly limited to such specific embodiments. Indeed, various modifications of the described modes for carrying out the technology that are obvious to those skilled in the art are intended to be within the scope of the following claims.

I claim:

1. A method of preparing a microarray comprising steps of:
   a) providing a micro-LED array light source comprising an integrated substrate, wherein the substrate comprises an array of reaction sites, wherein each reaction site comprises an anchored functional group and is associated with a micro-LED of the array;
   b) providing a reaction chamber in fluid communication with the array of reaction sites;
   c) synthesizing a plurality of polymers on the reaction sites by iterative cycles of:
      i) introducing a light quencher molecule to the reaction chamber;
      ii) activating the micro-LED associated with one or more of the reaction sites to deprotect the anchored functional group;
      iii) introducing a subunit comprising a non-anchored functional group protected by a photolabile group to the reaction chamber such that the deprotected anchored functional group binds the subunit and anchors it to the polymer; and
      iv) removing unbound subunits.

2. The method of claim 1, wherein the substrate comprises a functional layer to provide the anchored functional group of step a).

3. The method of claim 1, wherein a linker is bound to the substrate to provide the anchored functional group of step a).

4. The method of claim 1, wherein a subunit comprising an acid labile group is bound to the substrate and an acid is introduced to the reaction chamber to provide the anchored functional group of step a).

5. The method of claim 1, wherein the subunits comprise nucleic acids, nucleotides, oligonucleotides, polynucleotides, amino acids, oligopeptides, nucleomimetics, ribonucleotides, deoxyribonucleotides, peptide nucleic acids, peptides, peptidomimetics, glycopeptides, heteroglycans, proteins, or combinations thereof.

6. The method of claim 1, wherein the photolabile group is NPPOC, NBOC, NPEOC, MeNPPOC, MeNPOC, benzoyl-NPPOC, DMBOC, NPES, NPPS or derivatives of the foregoing.

7. The method of claim 1, wherein the reaction chamber comprises a flow cell apparatus.

8. The method of claim 1, wherein the number of iterative cycles is at least 10, at least 25, at least 50, at least 100, or at least 500.

9. The method of claim 1, wherein the method comprises a step of evaluating the micro-LED array light source by activating all pixels of the array and visualizing the array to determine coordinates of functional pixels.

10. The method of claim 9, wherein the method comprises proceeding with step c) using only reaction sites associated with functional pixels of the micro-LED array light source.

11. The method of claim 1, wherein the method results in an error rate in the polymers that is reduced relative to a method wherein a light quencher molecule is not introduced to the reaction chamber.

12. The method of claim 1, wherein the number of sequence errors is less than 10% of the number of errors that occur in a method wherein a light quencher molecule is not introduced to the reaction chamber.

13. The method of claim 12, wherein the number of sequence errors is less than 1% of the number of errors that occur in a method wherein a light quencher molecule is not introduced to the reaction chamber.

14. The method of claim 1, wherein the light-quenching molecules are aromatic hydrocarbons.

15. The method of claim 1, wherein the light-quenching molecules inhibit the transmission of light be absorbing light of a designated wavelength.

16. The method of claim 15, wherein the light-quenching molecules absorb light at a wavelength between approximately 300 to 400 nm.

17. The method of claim 16, wherein the light-quenching molecules absorb light at a wavelength that is approximately 365 nm.

* * * * *